US009583046B2

(12) United States Patent
Shimizu

(10) Patent No.: US 9,583,046 B2
(45) Date of Patent: Feb. 28, 2017

(54) LIGHTING DEVICE, DISPLAY DEVICE, AND TELEVISION DEVICE

(71) Applicant: Sharp Kabushiki Kaisha, Osaka-shi, Osaka (JP)

(72) Inventor: Takaharu Shimizu, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 74 days.

(21) Appl. No.: 14/413,718

(22) PCT Filed: Jul. 19, 2013

(86) PCT No.: PCT/JP2013/069612
§ 371 (c)(1),
(2) Date: Jan. 9, 2015

(87) PCT Pub. No.: WO2014/017391
PCT Pub. Date: Jan. 30, 2014

(65) Prior Publication Data
US 2015/0170582 A1    Jun. 18, 2015

(30) Foreign Application Priority Data

Jul. 27, 2012  (JP) ................................ 2012-166583

(51) Int. Cl.
G09G 3/34 (2006.01)
F21V 8/00 (2006.01)
G02F 1/1333 (2006.01)

(52) U.S. Cl.
CPC ......... *G09G 3/3406* (2013.01); *G02B 6/0043* (2013.01); *G02B 6/0068* (2013.01);
(Continued)

(58) Field of Classification Search
CPC ... G02F 1/133308; G02F 2001/133317; G02B 6/0091; G02B 6/0068; G02B 6/0043;
(Continued)

(56) References Cited

U.S. PATENT DOCUMENTS 8,905,615 B2 * 12/2014 Chen ................. G02F 1/133308
362/600
2008/0304288 A1 * 12/2008 Iwasaki ................... F21V 29/02
362/632
(Continued)

FOREIGN PATENT DOCUMENTS

JP    2011-216270 A    10/2011

*Primary Examiner* — Christopher E Leiby
(74) *Attorney, Agent, or Firm* — Keating & Bennett, LLP

(57) ABSTRACT

A backlight unit 12 includes a light guide plate 16, first LEDs 17A, second LEDs 17B, first support members 28, and second support members 29. The first LEDs 17A are opposed to a first light entrance surface 16nA that is a first edge surface 16E1 of the light guide plate 16. The second LEDs 17B are opposed to a second light entrance surface 16bB that is a second edge surface 16E2 of the light guide plate 16. The second LEDs 17B are arranged to be away from the second light entrance surface 16bB with a distance B relatively greater than a distance A between the first LEDs 17A and the first light entrance surface 16bA. The first support members 28 are in contact with the first edge surface 16E1 of the light guide plate 16 to support the light guide plate 16 from a first LED 17A side. The second support members 29 are arranged on a same side as the second LEDs 17B with respect to the light guide plate 16 to be away from the light guide plate 16. The second support members 29 are to be in contact with the second edge surface 16E2 according to thermal expansion of the light guide plate 16 to support the light guide plate 16 from a second light source side. The second support members 29 are made of an elastic material softer than a material of the first support members 28.

15 Claims, 22 Drawing Sheets

(52) U.S. Cl.
CPC ..... *G02B 6/0091* (2013.01); *G02F 1/133308* (2013.01); *G02B 6/0055* (2013.01); *G02B 6/0085* (2013.01)

(58) Field of Classification Search
CPC ....... G02B 6/0085; G02B 6/0055; F21S 8/00; F21V 17/10; F21V 17/12; G09G 3/3406
See application file for complete search history.

(56) References Cited

U.S. PATENT DOCUMENTS

| | | | | |
|---|---|---|---|---|
| 2009/0097277 | A1* | 4/2009 | Iwasaki | G02B 6/0091 362/628 |
| 2011/0001900 | A1* | 1/2011 | Watanabe | G02B 6/0068 349/62 |
| 2011/0235308 | A1* | 9/2011 | Kang | G02B 6/0068 362/97.2 |
| 2011/0273631 | A1* | 11/2011 | Hayashi | G02B 6/0091 348/790 |
| 2012/0257107 | A1* | 10/2012 | Itoh | G02B 6/0085 348/553 |
| 2012/0287677 | A1* | 11/2012 | Wheatley | G02B 6/0051 362/627 |
| 2013/0094241 | A1* | 4/2013 | Yu | G02B 6/0091 362/602 |
| 2014/0347884 | A1* | 11/2014 | Fujiuchi | F21V 7/005 362/609 |
| 2015/0177453 | A1* | 6/2015 | Ikuta | G02B 6/0073 348/794 |

\* cited by examiner

DISTANCE A BETWEEN FIRST LEDS AND FIRST LIGHT ENTRANCE SURFACE
(DISTANCE B BETWEEN SECOND LEDS AND SECOND LIGHT ENTRANCE SURFACE)

FIG.18
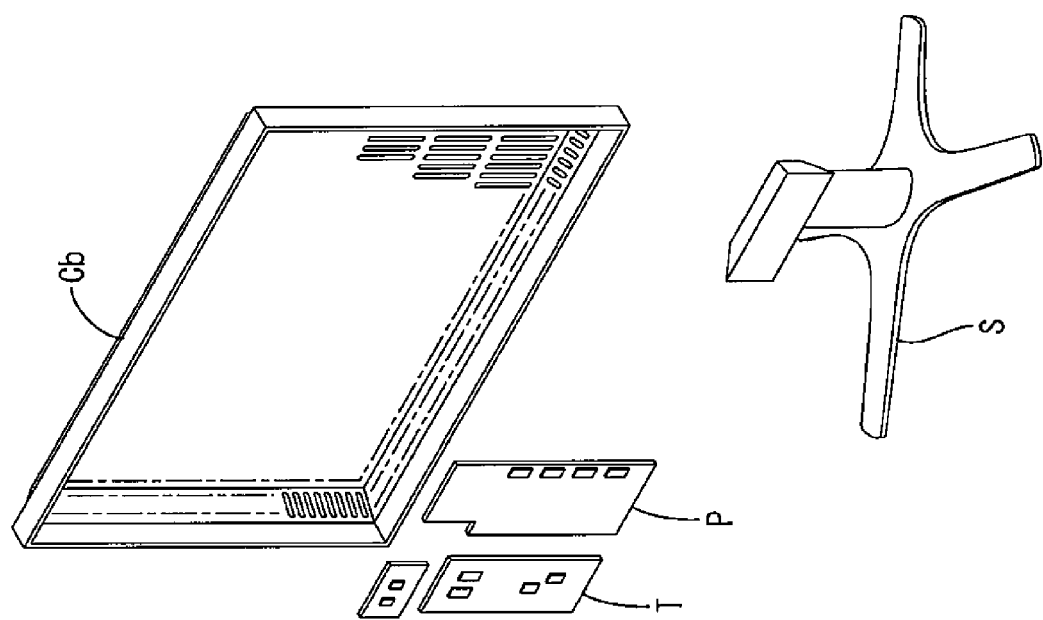
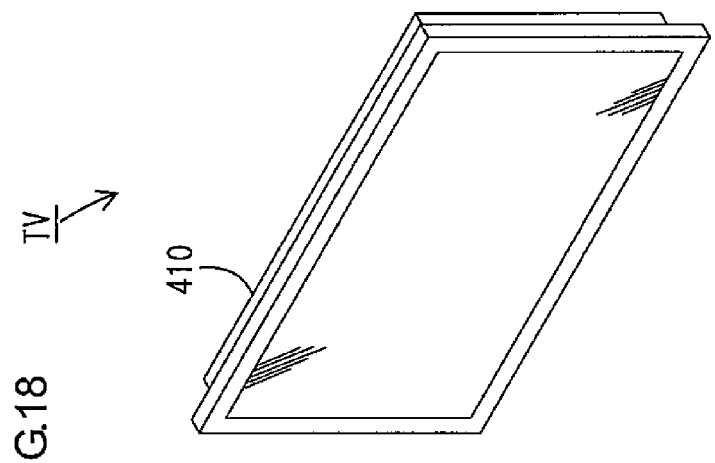
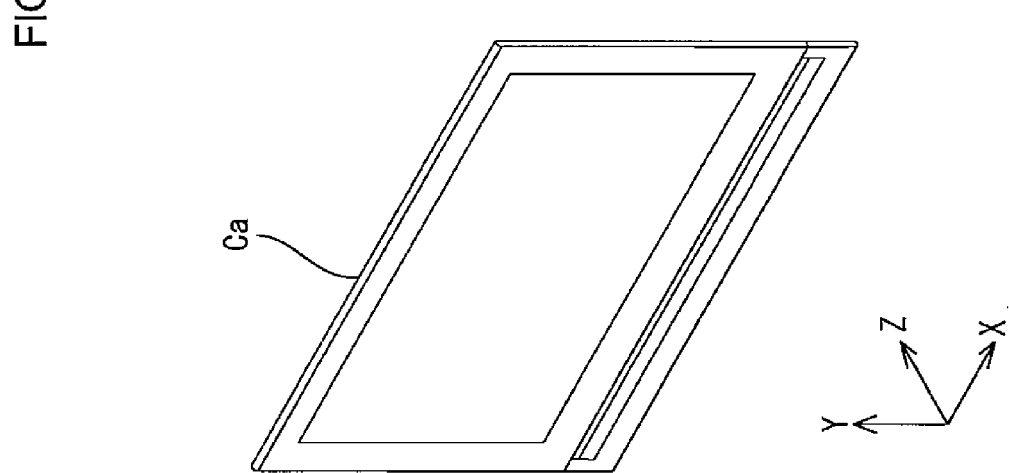

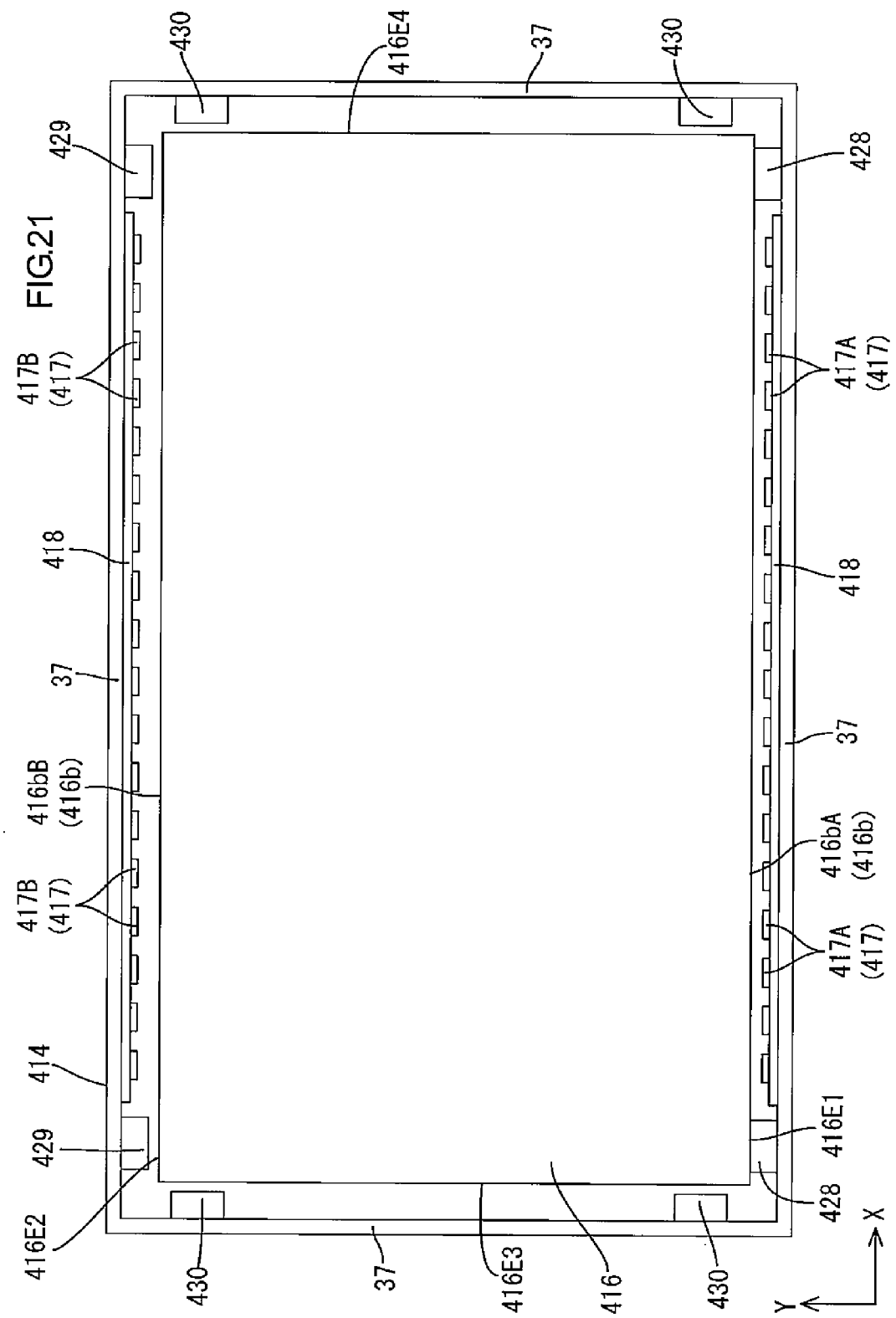

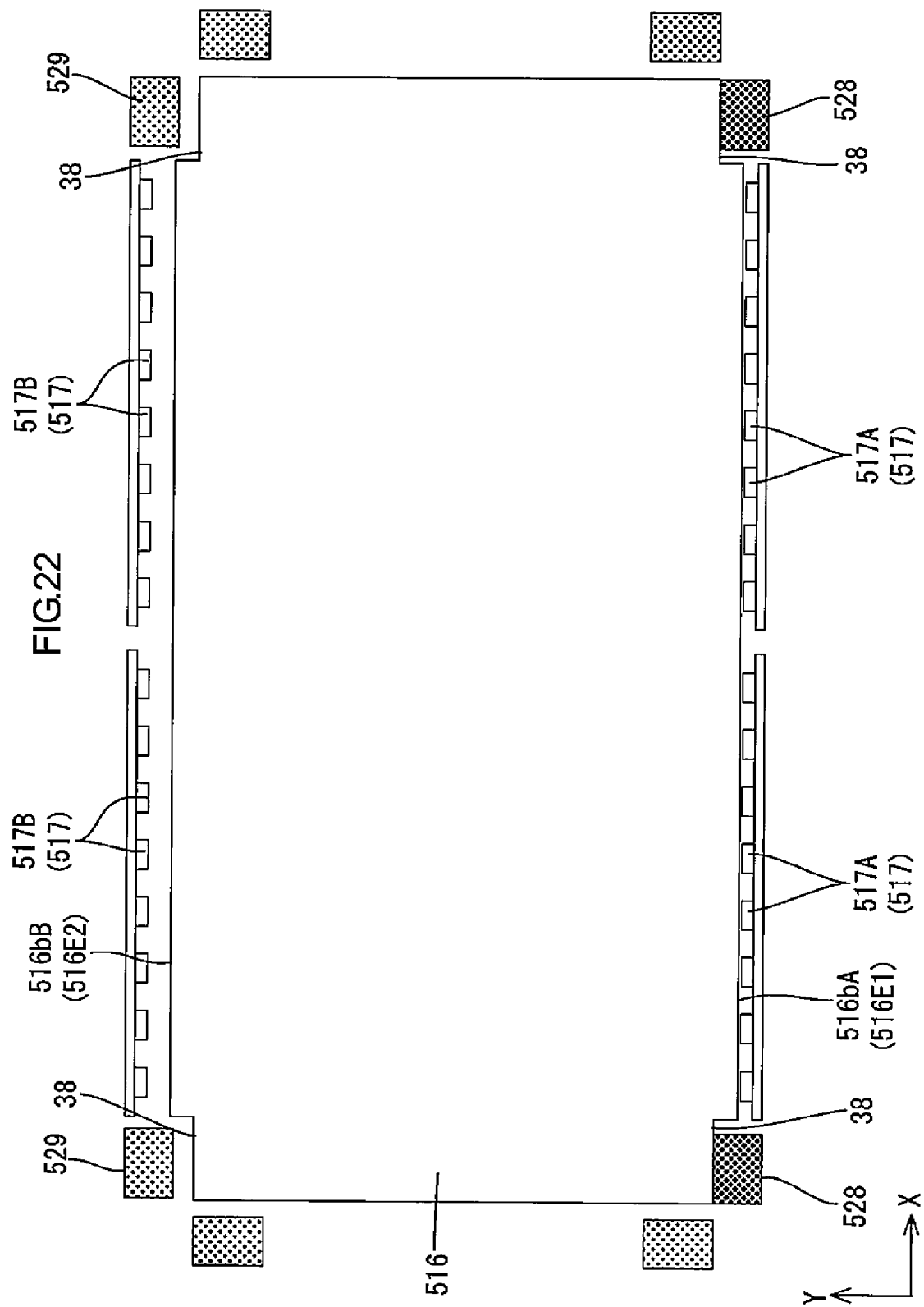

LIGHTING DEVICE, DISPLAY DEVICE, AND TELEVISION DEVICE

TECHNICAL FIELD

The present invention relates to a lighting device, a display device, and a television device.

BACKGROUND ART

In recent years, displays in image display devices, such as television devices, are being shifted from conventional cathode-ray tube displays to thin displays, such as liquid crystal displays and plasma displays. With the thin displays, thicknesses of the image display devices can be decreased. Liquid crystal panels do not emit light. Therefore, liquid crystal display devices including liquid crystal panels require backlight devices. The backlight devices are classified broadly into a direct type and an edge-light type based on mechanisms. For further reduction in thicknesses of the liquid crystal display devices, the edge-light type backlight devices are more preferable. A backlight device disclosed in Patent Document 1 is known as an example of the kind.

RELATED ART DOCUMENT

Patent Document

Patent Document 1: Japanese Unexamined Patent Publication No. 2011-216270

Problem to be Solved by the Invention

In the edge-light type backlight device, as a distance between a light source and a light entrance surface of a light guide plate is decreased, the light entrance efficiency is improved, and as the distance is increased, the light entrance efficiency is lowered. The light guide plate expands due to heat from the lighted light source, and therefore, a space is necessarily provided between the light source and the light entrance surface of the light guide plate so that the light guide plate that is increased in size due to thermal expansion does not contact the light source. This requirement limits the improvement of the entrance efficiency of light emitted from the light source and entering the light guide plate through the light entrance surface.

Disclosure of the Present Invention

The technology disclosed herein was made in view of the above circumstances. An object is to improve light use efficiency.

Means for Solving the Problem

A lighting device according to this invention includes a light guide plate having an edge surface as a light entrance surface and one plate surface as a light exit surface, a first light source, a second light source, a first support member, and a second support member. The first light source is opposed to a first light entrance surface that is a first edge surface of the light guide plate. The second light source is opposed to a second light entrance surface that is a second edge surface of the light guide plate and the second edge surface is opposite to the first edge surface. The second light source is arranged to be away from the second light entrance surface with a distance relatively greater than a distance between the first light source and the first light entrance surface. The first support member is arranged on a same side as the first light source with respect to the light guide plate, and the first support member is in contact with the first edge surface of the light guide plate to support the light guide plate from a first light source side. The second support member is arranged on a same side as the second light source with respect to the light guide plate to be away from the light guide plate. The second support member is to be in contact with the second edge surface according to thermal expansion of the light guide plate to support the light guide plate from a second light source side. The second support member is made of an elastic material softer than a material of the first support member.

According to such a configuration, light emitted from the first light source enters the light guide plate through the first light entrance surface and light emitted from the second light source enters the light guide plate through the second light entrance surface and then, the light entering the light guide plate travels within the light guide plate and exits the light guide plate through the light exit surface. The distance between the first light source and the first light entrance surface of the light guide plate is relatively small and the distance between the second light source and the second light entrance surface of the light guide plate is relatively great. Therefore, the light entrance efficiency of the light emitted from the first light source and entering the light guide plate through the first light entrance surface is relatively high and the light entrance efficiency of the light emitted from the second light source and entering the light guide plate through the second light entrance surface is relatively low. According to the inventor's studies, it is found that if the distance between the respective light sources and the respective light entrance surfaces becomes a certain value or more, the light entrance efficiency of light is less likely to be decreased even if the distance is increased and the light entrance efficiency does not change. Therefore, the light entrance efficiency of the light emitted from the second light source and entering the light guide plate through the second light entrance surface becomes lower than the light entrance efficiency of the light emitted from the first light source and entering the light guide plate through the first light entrance surface. However, the light entrance efficiency of the light emitted from the second light source and entering the light guide plate through the second light entrance surface is not further decreased from the certain value because the light entrance efficiency of light is less likely to be decreased even with the increase of the distance. Therefore, the light entrance efficiency is not decreased from a certain value. The light entrance efficiency of light with the distances between the respective light sources and the respective light entrance surfaces being equal to each other is referred to as a reference value. A plus difference value between the reference value and the light entrance efficiency of light emitted from the first light source and entering the light guide plate through the first light entrance surface (the light entrance efficiency is higher than the reference value) is greater than a minus difference value between the reference value and the light entrance efficiency of light emitted from the second light source and entering the light guide plate through the second light entrance surface (the light entrance efficiency is lower than the reference value). Thus, the light use efficiency as a whole is improved compared to the light use efficiency in the configuration in which the distances between the respective light sources and the respective light entrance surfaces are equal to each other.

The first support member arranged on the same side as the first light source is in contact with the first edge surface so as to support the light guide plate from the first light source side. The first support member that is made of a material harder than the material of the second support member stably support the light guide plate and a support position of the light guide plate is less likely to be changed. Accordingly, the positional relation between the first light source and the first light entrance surface is maintained stably and the distance between the first light source and the first light entrance surface is set to be smallest. Therefore, the light entrance efficiency of light emitted from the first light source and entering the light guide plate through the first light entrance surface is greatly improved.

The second support member is arranged on the same side as the second light source and spaced from the light guide plate. However, the second support member comes in contact with the second edge surface if the light guide plate thermally expands, and the light guide plate is supported from the second light source side. The second support member is made of an elastic material that is softer than the material of the first support member. Therefore, compared to a configuration including the second support member made of a material having same hardness as the material of the first support member, the distance between the second support member and the second edge surface of the light guide plate can be decreased. If the second support member is made of a material having same hardness as the material of the first support member, the second support member is necessary to be arranged to have a sufficient distance including an extra space from the second edge surface of the light guide plate with considering the dimension error that may be caused in the light guide plate. The second support member made of the elastic material that is softer than the material of the first support member elastically deforms when the second edge surface of the light guide plate that thermally expands comes in contact with the second support member. Therefore, even if the light guide plate is greater in size than a standard size due to the dimension error, the error amount can be absorbed by the elastic deformation. Accordingly, the second support member is arranged much closer to the light guide plate and the thermally expanded light guide plate is supported further stably.

The following configurations may be preferably employed as embodiments of the present invention.

(1) The first light source, the light guide plate, and the second light source may be arranged in a vertical direction. The first light source and the first support member may be arranged on a lower side in the vertical direction with respect to the light guide plate. The second light source and the second support member may be arranged on an upper side in the vertical direction with respect to the light guide plate. According to such a configuration, the light guide plate is supported from the lower side in the vertical direction by the first support member having hardness greater than the second support member. Therefore, the first edge surface of the light guide plate is kept in closely contact with the first support member due to the weight of the light guide plate. Accordingly, the positional relation between the first light source and the first light entrance surface is maintained more stable. Thus, the light guide plate is positioned precisely in the vertical direction by the first support member. Therefore, the second support member arranged on the upper side in the vertical direction with respect to the light guide plate is arranged much closer to the light guide plate. Accordingly, the thermally expanded light guide plate is stably supported.

(2) The lighting device may further include a horizontal side second support member arranged to be away from the light guide plate in a horizontal direction that is perpendicular to the vertical direction. The horizontal second support member may be in contact with an edge surface of the light guide plate adjacent to the first edge surface and the second edge surface of the light guide plate according to thermal expansion of the light guide plate along the horizontal direction to support the light guide plate from an outer side in the horizontal direction, and the horizontal side second support member may be made of a material softer than the material of the first support member. According to such a configuration, the light guide plate is supported by the horizontal side second support member from the outer side with respect to the horizontal direction when the light guide plate increases its size in the vertical direction and the horizontal direction according to the thermal expansion thereof. The horizontal side second support member is made of the elastic material that is softer than the material of the first support member. Therefore, the distance between the horizontal side second support member and each of the edge surfaces of the light guide plate is set to be smaller compared to the configuration including the horizontal side second support member made of a material having hardness same as that of the first support member. According to such a configuration, the horizontal side second support member is arranged close to the light guide plate and the thermally expanded light guide plate is supported more stably.

(3) The second support member and the horizontal side second support member may be made of a same elastic material. Accordingly, a material cost for the second support member and the horizontal side second support member is reduced. The elastic coefficient of the second support member and that of the horizontal side second support member are same. Therefore, a distance between the second support member and the corresponding edge surface of the light guide plate and a distance between the horizontal side second support member and the corresponding edge surface of the light guide plate are easily set.

(4) The first support member may be made of a material having plasticity. Accordingly, the light guide plate is supported by the first support member made of the material having plasticity more stably compared to the configuration including the first support member made of an elastic material. Therefore, variations in support position of the light guide plate are less likely to be caused.

(5) The first support member may be made of the material having plasticity that is metal or a thermoplastic resin, and the second support member may be made of rubber. According to such a configuration, the first support member made of the metal or the thermoplastic resin support the light guide plate more stably. The second support member that is made of the rubber become in contact with the second edge surface of the light guide plate and elastically deform if the light guide plate thermally expands. Accordingly, even if a size of the light guide plate becomes greater than a normal size thereof due to the dimension errors, the dimension errors are effectively absorbed by the elastic deformation.

(6) The first edge surface that is the first light entrance surface and the second edge surface that is the second light entrance surface may extend linearly over an entire length of the light guide plate. The light guide plate may be processed to have a step between the first light entrance surface and a portion of the first edge surface that is in contact with the first support member or between the second light entrance surface and the second edge surface that is in contact with the second support member. However, in such a configuration, the light guide plate is necessary to be processed to have the above configuration. In the configuration of the present embodiment, the above processing is not necessary for the light guide plate and therefore, the size precision of the first edge surface and the second edge surface of the light guide plate is improved. The first light entrance surface of the light guide plate is positioned with high precision relative to the first light source by the contact between the first support member and the first edge surface of the light guide plate. Further, the second support member is arranged much closer to the second edge surface of the light guide plate and therefore, the thermally expanded light guide plate is supported more stably.

(7) The first support member may include first support members in a pair that are arranged on two end portions of the light guide plate, respectively, and the second support member may include second support members in a pair that are arranged on two end portions of the light guide plate, respectively. Accordingly, the light guide plate is supported more stably at its edge positions by the first support member and the second support member.

(8) The first light source and the second light source may be same type of parts. Accordingly, a manufacturing cost for the first light source and the second light source is reduced and a cost for parts control is also reduced.

(9) The first light source and the second light source may represent a lambertian light intensity distribution. The first light source and the second light source represent a lambertian light intensity distribution. The light intensity distribution of light from the first light source and the second light source represents the lambertian light intensity distribution. In such a light intensity distribution, the rays of light traveling along the optical axis have a peak light intensity and the light emission intensity tends to decrease with a curved line in the graph as the angle with respect to the optical axis increases. In the lambertian light intensity distribution, the light entrance efficiency of light emitted from the respective light source and being incident on the respective light entrance surface is improved as the distance between the respective light sources and the respective light entrance surfaces of the light guide plate is decreased, and the light entrance efficiency is decreased as the distance is increased. However, if the distance is greater than a certain value, the lowering rate of the light entrance efficiency becomes less likely to be decreased and does not change from a certain value. The distance between the first light entrance surface and the first light source representing the lambertian light intensity distribution is relatively decreased to improve the light entrance efficiency, and the distance between the second light entrance surface and the second light source representing the lambertian light intensity distribution is relatively increased to keep the light entrance efficiency to be the lowest certain value with allowing the size increase of the light guide plate. Accordingly, the whole light use efficiency is improved.

(10) Each of the first light source and the second light source may include LEDs that are mounted on a base board. The LEDs generally represent a lambertian light intensity distribution. In such a light intensity distribution, the rays of light traveling along the optical axis have a peak light intensity and the light emission intensity tends to decrease with a curved line in the graph as the angle with respect to the optical axis increases. In the lambertian light intensity distribution, the light entrance efficiency of light emitted from the light sources including the LEDs and being incident on the respective light entrance surfaces is improved as the distance between the light sources including the LEDs and the respective light entrance surfaces is decreased, and the light entrance efficiency is decreased as the distance is increased. However, if the distance is greater than a certain value, the lowering rate of the light entrance efficiency is less likely to be decreased and does not change from a certain value. The distance between the first light entrance surface and the first light source including the LED representing the lambertian light intensity distribution is relatively decreased to improve the light entrance efficiency, and the distance between the second light entrance surface and the second light source including the LED representing the lambertian light intensity distribution is relatively increased to keep the light entrance efficiency to be the lowest certain value with allowing the size increase of the light guide plate. Accordingly, the whole light use efficiency is improved.

(11) The light guide plate may be rectangular and further include a third light source, a fourth light source, a third support member, and a fourth support member. The third light source may be opposed to a third light entrance surface that is a third edge surface adjacent to the first edge surface and the second edge surface of the light guide plate. The fourth light source may be opposed to a fourth light entrance surface that is a fourth edge surface of the light guide plate opposite to the third edge surface, and the fourth light source may be arranged to be away from the fourth light entrance surface with a distance that is relatively greater than a distance between the third light source and the third light entrance surface. The third support member may be arranged on a same side as the third light source with respect to the light guide plate, and the third support member may be in contact with the third edge surface of the light guide plate to support the light guide plate from a third light source side. The fourth support member may be arranged on a same side as the fourth light source with respect to the light guide plate to be away from the light guide plate. The fourth support member may be in contact with the fourth edge surface according to thermal expansion of the light guide plate to support the light guide plate from a fourth light source side, and the fourth support member may be made of an elastic material softer than a material of the third support member. According to such a configuration, the edge surfaces included in the rectangular light guide plate are the first light entrance surface, the second light entrance surface, the third light entrance surface, and the fourth light entrance surface, respectively. Light from the first light source, the second light source, the third light source, and the fourth light source is incident on the first light entrance surface, the second light entrance surface, the third light entrance surface, and the fourth light entrance surface, respectively. Accordingly, the amount of light entering the light guide plate is sufficiently obtained and such a configuration is effective for increase in size of the backlight unit. The distance between the third light source and the third light entrance surface is relatively decreased so that the light entrance efficiency of light from the third light source is increased. The distance between the fourth light source and the fourth light entrance surface is relatively increased and the light entrance efficiency of light from the fourth light source is not decreased from the lowest value. Accordingly, the whole light use efficiency is further improved.

The third support member that supports the light guide plate from the third light source side is made of a material harder than that of the fourth support member. Therefore, the first support member and the third support member stably support the light guide plate and variations in the support position of the light guide plate are less likely to occur. Accordingly, the position of the third light entrance surface relative to the third light source is stably maintained and therefore, the distance between the third light source and the third light entrance surface is set to be shortest as possible. Therefore, the light entrance efficiency of light emitted from the third light source and being incident on the third light entrance surface is highly improved. Further, the fourth support member that supports the thermally expanded light guide plate from the fourth light source side is made of the elastic material softer than the material of the third support member. Therefore, the distance between the fourth support member and the fourth edge surface of the light guide plate is decreased compared to the configuration in which the fourth support member is made of a material having same hardness as the material of the third support member. Accordingly, the fourth support member is arranged much closer to the light guide plate and the thermally expanded light guide plate is supported more stably.

To resolve the problem described earlier, a display device according to the technology includes the lighting device described above and a display panel configured to provide a display using light from the lighting device.

According to such a display device, the lighting device configured to provide light to the display panel has improved light use efficiency. Therefore, the display device can perform high quality image display with high brightness.

Examples of the display panel include a liquid crystal display panel. The display device may be adapted to various purposes such as television devices and display devices of personal computers. Preferable purposes include large screen display devices.

Advantageous Effect of the Invention

According to the technology, light use efficiency is improved.

BRIEF DESCRIPTION OF THE DRAWINGS

FIG. 18 is an exploded perspective view illustrating a general configuration of a television device according to a fifth embodiment of the present invention.

FIG. 21 is a plan view illustrating an arrangement configuration of LEDs, a light guide plate, and support members in a chassis.

FIG. 22 is a plan view illustrating a general arrangement configuration of LEDs, a light guide plate, and support members according to a sixth embodiment of the present invention.

MODE FOR CARRYING OUT THE INVENTION

First Embodiment

The first embodiment of this technology will be described with reference to FIGS. 1 to 13. In the following description, a liquid crystal display device 10 will be described. An X-axis, a Y-axis, and a Z-axis are present in some drawings. The axes in each drawing correspond to the respective axes in other drawings. Without any special notes, the description of upper and lower is made regarding a vertical direction (FIGS. 8 and 10) as a reference. In the following description, the upper side and the lower side in FIG. 4 correspond to the front and the rear of the liquid crystal display device, respectively, and the left side and the right side in FIG. 4 correspond to the lower side and the upper side in the vertical direction, respectively.

Figure 1:
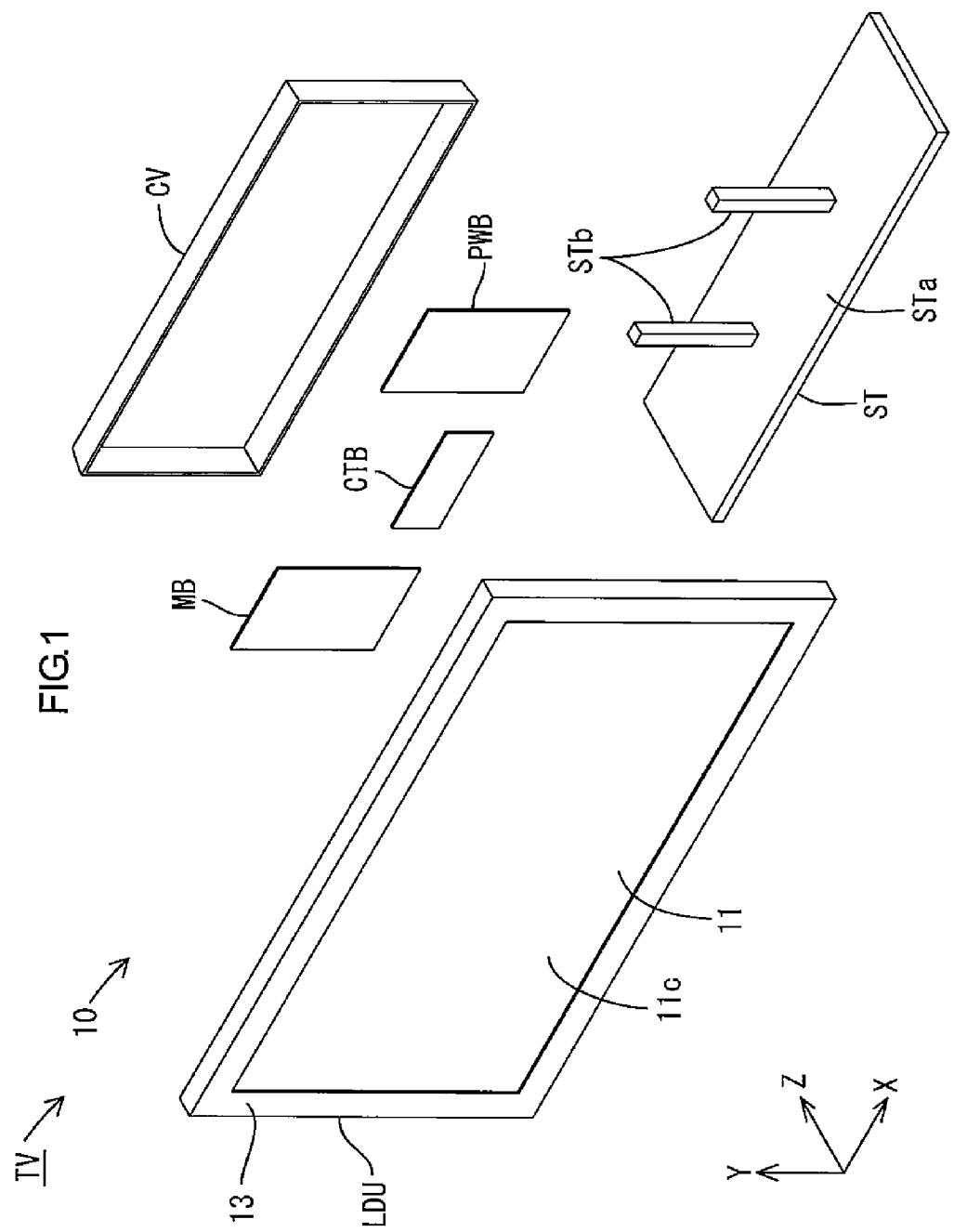
FIG. 1 is an exploded perspective view illustrating a general configuration of a television device and a liquid crystal display device according to a first embodiment of the present invention.
Figure 3:
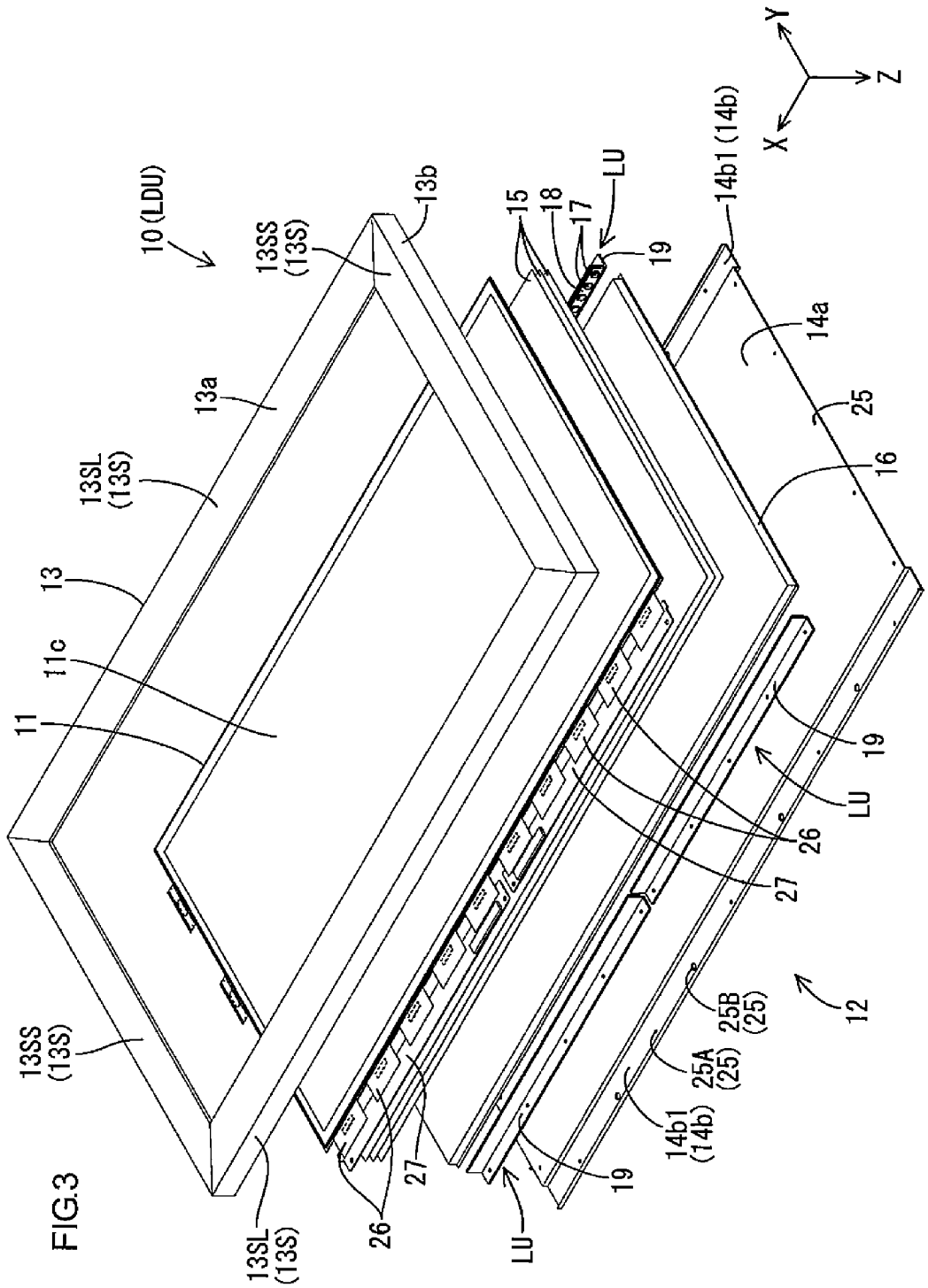
FIG. 3 is an exploded perspective view illustrating a general configuration of a liquid crystal display unit included in the liquid crystal display device.

As illustrated in FIG. 1, a television device TV according to this embodiment includes a liquid crystal display unit (a display unit) LDU, boards PWB, MB, and CTB, a cover CV, and a stand ST. The boards PWB, MB, and CTB are attached on a rear surface (a back surface) of the liquid crystal display unit LDU. The cover CV is attached on a rear surface side of the liquid crystal display device 10 so as to cover the boards PWB, MB, and CTB. The stand ST supports the liquid crystal display unit LDU such that a display surface of the liquid crystal display unit LDU extends in the vertical direction (the Y-axis direction). The liquid crystal display device 10 according to this embodiment has the same configuration as the television device TV except for at least a component for receiving television signals (e.g. a tuner included in the main board MB). As illustrated in FIG. 3, the liquid crystal display unit LDU has a landscape rectangular shape (a rectangular shape, a longitudinal shape) as a whole. The liquid crystal display unit LDU includes a liquid crystal panel 11 as a display panel and a backlight unit (a lighting device) 12 as an external light source. The liquid crystal display device 10 includes a frame (a holding portion arranged on the display 11c side, one holding portion) 13 and a chassis (a holding portion on the side opposite to the display 11c side, another holding portion) 14 as exterior members that provide an appearance of the liquid crystal display device 10. The frame 13 and the chassis 14 hold the liquid crystal panel 11 and the backlight unit 12. In other words, the frame 13 and the chassis 14 constitute a holding member. The chassis 14 according to this embodiment is not only a part of the exterior member or the holding member but also a part of the backlight unit 12.

Figure 2:
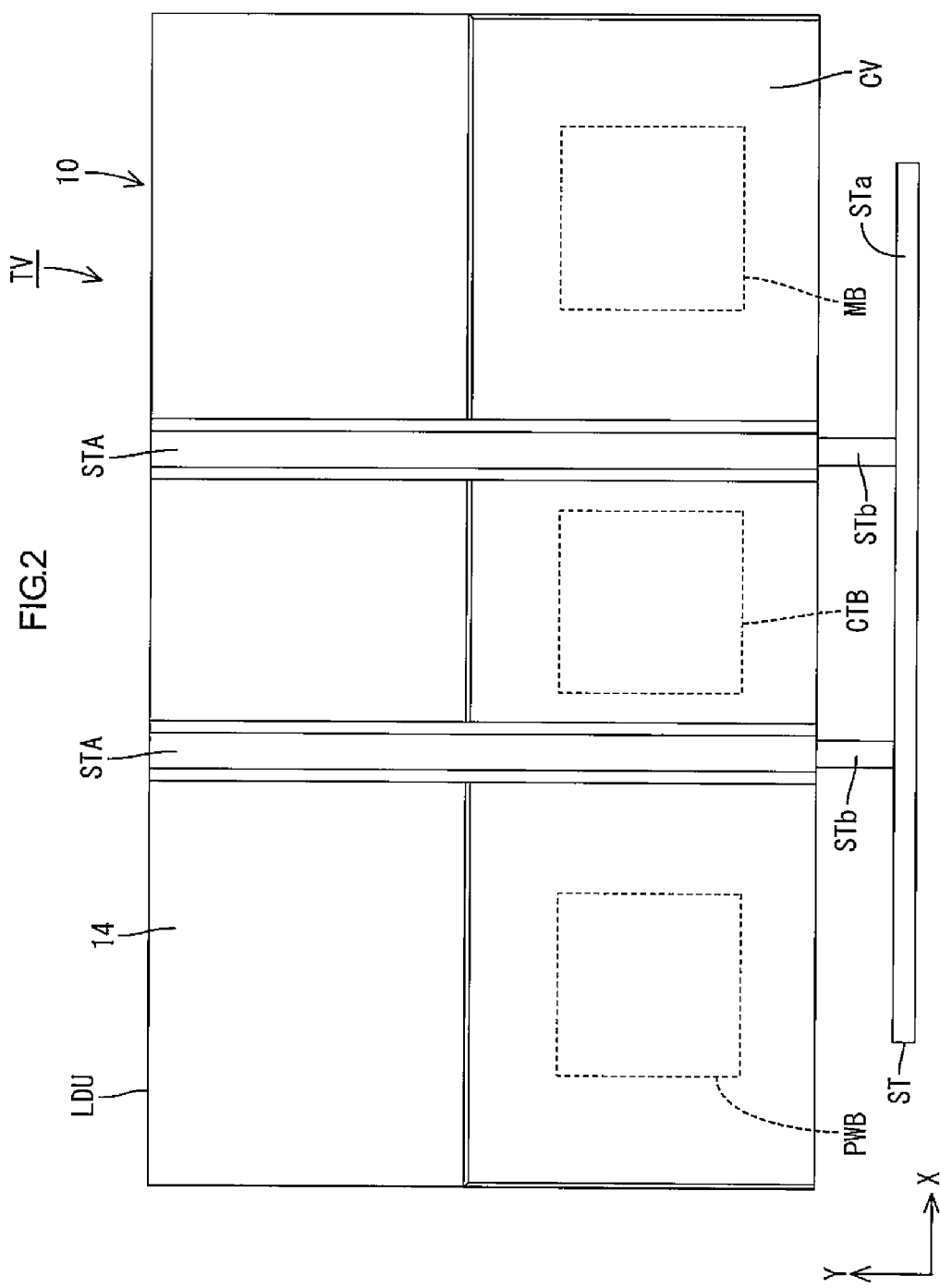
FIG. 2 is a rear view of the television device and the liquid crystal display device.

Configuration of the liquid crystal display device 10 on the rear surface side will be described. As illustrated in FIG. 2, two stand attachments STA are attached to a rear surface of the chassis 14. The rear surface of the chassis 14 provides a rear appearance of the liquid crystal display device 10. The stand attachments STA are away from each other in the X-axis direction and extend along the Y-axis direction on the chassis 14. Each stand attachment STA has a substantially channel-shaped cross section and is open to the chassis 14 so as to form a space with the chassis 14. Support portions STb of the stand ST are each inserted in the space between the respective stand attachments STA and the chassis 14. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand attachments STA in the X-axis direction. A component storage space is provided between the cover CV and the chassis 14 such that the boards PWB, MB, and CTB, which will be described next, are stored therein.

As illustrated in FIG. 2, the boards PWB, MB, and CTB include a power source board PWB, a main board MB, and a control board CTB. The power source board PWB is a power supply source of the liquid crystal display device 10 and thus supplies drive power to the other boards MB and CTB and to LEDs 17 of the backlight unit 12. In other words, the power source board PWB also serves as "an LED drive board (a light source driving board, a power source) that drives the LEDs 17". The main board MB includes at least a tuner and an image processor, which are not illustrated. The tuner is configured to receive television signals. The image processor performs image processing on the received television signals. The main board MB is configured to output the processed image signals to the control board CTB, which will be described later. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which are sent from the main board MB, to driving signals for liquid crystals and to supply the driving signals to the liquid crystal panel 11.

As illustrated in FIG. 3, components of the liquid crystal display unit LDU included in the liquid crystal display device 10 are arranged in a space between the frame (a front frame) 13, which provides a front appearance, and the chassis (a rear chassis) 14, which provides a rear appearance. The main components housed in the space between the frame 13 and the chassis 14 at least include the liquid crystal panel 11, an optical member 15, a light guide plate 16, and LED units (light source units) LU. The liquid crystal panel 11, the optical member 15, and the light guide plate 16 are placed on top of one another and held between the frame 13 on the front side and the chassis 14 on the rear side. The backlight unit 12 includes the optical member 15, the light guide plate 16, the LED units LU, and the chassis 14. In other words, the liquid crystal display unit LDU without the liquid crystal panel 11 and the frame 13 is the backlight unit 12. The LED units LU of the backlight unit 12 are arranged in the space between the frame 13 and the chassis 14 so as to hold the light guide plate 16 from two edges in the short-side direction (the Y-axis direction, the vertical direction). Two sets of the LED units LU are arranged in the long-side direction (the X-axis direction, the horizontal direction) and a total of four LED units LU are arranged. The LED units LU and the light guide plate 16 are arranged in the vertical direction (the Y-axis direction). The LED unit LU includes LEDs 17 as light sources, the LED board (a light source board) 18 on which the LEDs 17 are mounted, and a heat dissipation member (heat spreader, alight source mounting member) 19 to which the LED board 18 is mounted. Each component will be described next.

As illustrated in FIG. 3, the liquid crystal panel 11 has a landscape rectangular shape (a rectangular shape, a longitudinal shape) in a plan view, and the liquid crystal panel 11 includes a pair of glass substrates 11a and 11b and liquid crystals. The substrates 11a and 11b each having high light transmission properties are bonded together with a predetermined gap therebetween. The liquid crystals are sealed between the substrates 11a and 11b. One of the substrates 11a and 11b that is on the front side is a CF substrate 11a and the other one of the substrates 11a and 11b that is on the rear side (on the backside) is an array substrate 11b. On the array substrate 11b, switching elements (e.g. TFTs), pixel electrodes, and an alignment film are arranged. The switching elements are connected to gate lines and source lines that are arranged perpendicular to each other. The pixel electrodes are connected to the switching elements. On the CF substrate 11a, color filters, a counter electrode, and an alignment film are arranged. The color filters include red (R), green (G), and blue (B) color portions that are arranged in a predetermined arrangement. Polarizing plates, which are not illustrated, are arranged on outer sides of the substrates 11a and 11b.

Figure 4:
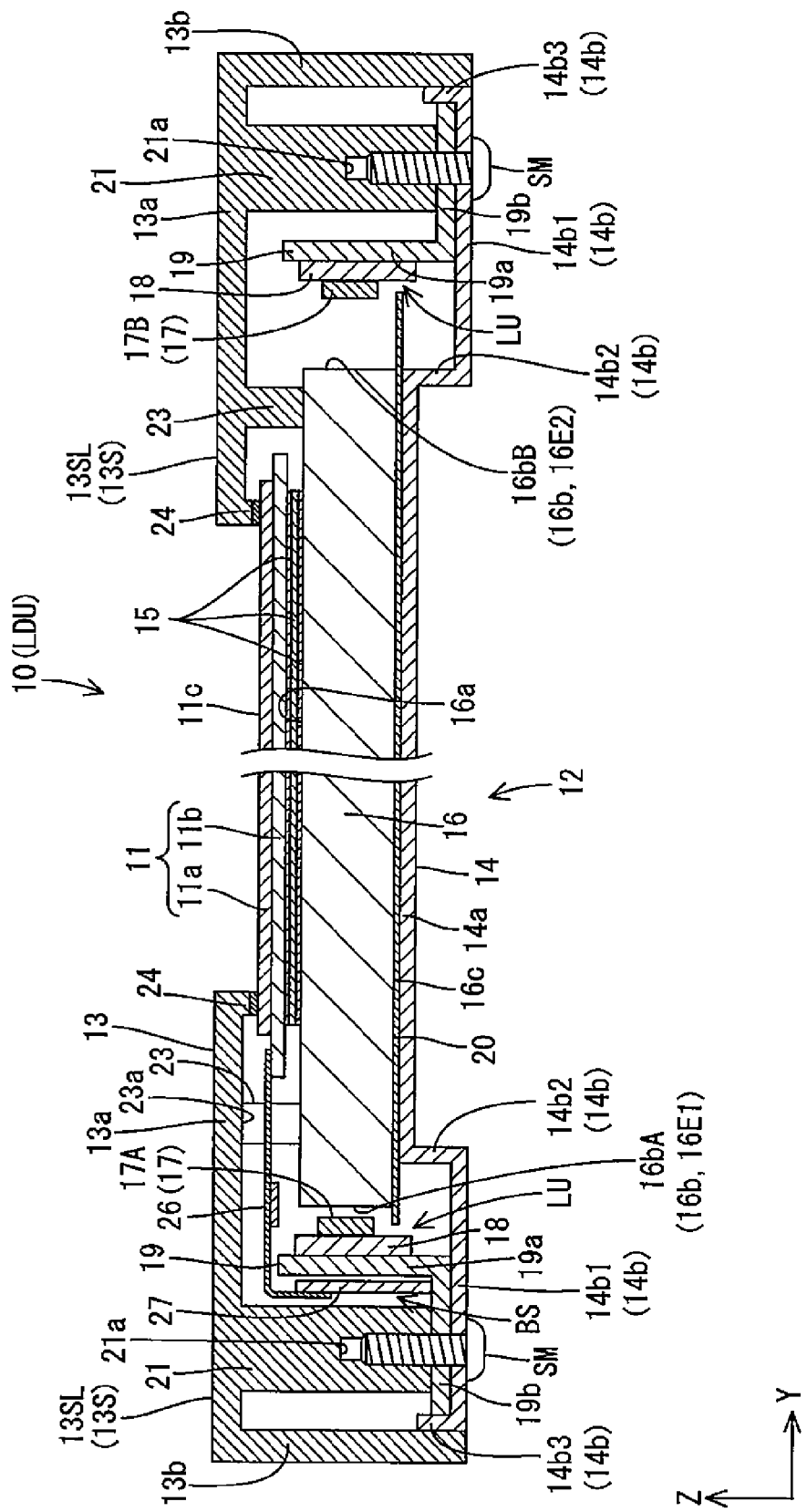
FIG. 4 is a cross-sectional view of the liquid crystal display device taken in a short-side direction thereof.
Figure 5:
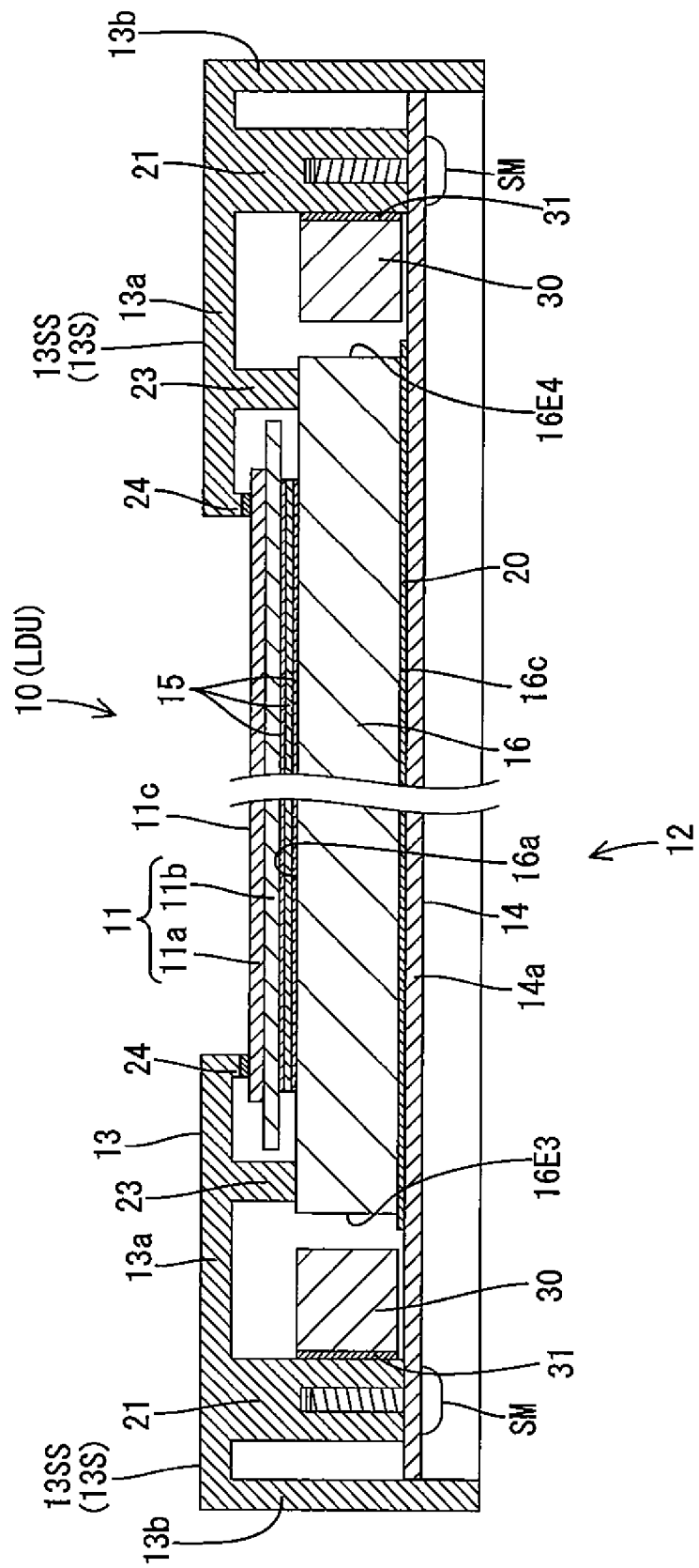
FIG. 5 is a cross-sectional view of the liquid crystal display device taken in a long-side direction thereof.

As illustrated in FIGS. 4 and 5, the array substrate 11b, which is one of the substrates 11a and 11b of the liquid crystal panel 11, has a larger size in a plan view than the CF substrate 11a and is arranged such that ends of the array substrate 11b are farther out than respective peripheral portions of the CF substrate 11a. Specifically, the array substrate 11b is slightly larger than the CF substrates 11a such that the entire peripheral portions of the array board 11b are farther out than the peripheral portions of the CF substrate 11a. The outer peripheral edge of the array substrate 11b includes a pair of long-side edge portions. In one of long-side edge portions of the array substrate 11b that is close to the control board CTB with respect to the Y-axis direction (in a left-side edge portion in FIG. 4), terminals extended from the gate lines and the source lines are arranged. As illustrated in FIGS. 2 and 4, flexible boards (FPC boards) 26 where drivers DR for liquid crystal driving are connected to the respective terminals. The flexible boards 26 are arranged apart from each other in the X-axis direction, i.e., a direction along the long-side end of the array substrate 11b. A part of each source flexible board 26 protrudes outwardly from the long-side end of the array substrate 11b in the Y-axis direction. Each of the flexible boards 26 includes a film-like base made of synthetic resin (for example polyimide resin) that has an insulation property and flexibility. Each flexible board 26 includes traces (not illustrated) arranged on the base and a driver DR on about a middle of the base. The traces are connected to the driver DR. One end of each flexible board 26 is pressed and connected to each terminal of the array substrate 11b via an anisotropic conductive film (ACF). Another end of each flexible board 26 is pressed and connected to each terminal of a printed circuit board 27, which will be described later, via another anisotropic conductive film. The printed circuit board 27 is connected to the control board CTB via a wiring member, which is not illustrated, and thus signals from the control board CTB are transmitted to the source flexible boards 26. The liquid crystal panel 11 thus displays images on the display surface 11c according to the signals from the control board CTB.

As illustrated in FIG. 4 and FIG. 5, the liquid crystal panel 11 is placed on a front side (a light exit side) of the optical member 15, which will be described later. A rear surface of the liquid crystal panel 11 (a rear surface of the polarizing plate) is fitted to the optical member 15 with minimal gaps therebetween. Therefore, dust is less likely to enter between the liquid crystal panel 11 and the optical member 15. The display surface 11c of the liquid crystal panel 11 includes a display area and a non-display area. The display area is an inner area of a screen in which images are displayed. The non-display area is an outer area of the screen around the display area with a frame-like shape. The terminals and the flexible board 26 are arranged in the non-display area.

As illustrated in FIG. 3, the optical member 15 has a landscape rectangular shape in a plan view like the liquid crystal panel 11 and has about the same size (a short dimension and a long dimension) as the liquid crystal panel 11. The optical member 15 is placed on the front side (the light exit side) of the light guide plate 16, which will be described later, and sandwiched between the light guide plate 16 and the liquid crystal panel 11. The optical member 15 includes three sheets that are placed on top of one another. Each sheet of the optical member 15 may be any one selected from a diffuser sheet, a lens sheet, and a reflecting type polarizing sheet.

The light guide plate 16 is made of a substantially transparent (high light transmissivity) synthetic resin (e.g. acrylic resin or polycarbonate such as PMMA) which has a refractive index considerably higher than that of the air. As illustrated in FIG. 3, the light guide plate 16 has a landscape rectangular shape in a plan view similar to the liquid crystal panel 11 and the optical member 15. A thickness of the light guide plate 16 is larger than a thickness of the optical member 15. A long-side direction and a short-side direction of a plate surface of the light guide plate 16 correspond to the X-axis direction and the Y-axis direction, respectively. A thickness direction of the light guide plate 16 that is perpendicular to the plate surface corresponds to the Z-axis direction (an overlapping direction of the liquid crystal panel 11 and the light guide plate 16). The light guide plate 16 is arranged on the rear side of the optical member 15 and sandwiched between the optical member 15 and the chassis 14. As illustrated in FIGS. 4 and 5, a short dimension and a long dimension of the light guide plate 16 are larger than those of the liquid crystal panel 11 and the optical member 15. The light guide plate 16 is arranged such that four sides of the light guide plate 16 are farther out than four sides of the liquid crystal panel 11 and four sides of the optical member 15 (so as not to overlap each other in a plan view). With this configuration, the light from the LED 17 can travel proper distance inside the light guide plate 16. The ends of the light guide plate 16 from which the light may unevenly exit compared to the middle section thereof can be located outside the display area of the liquid crystal panel 11. The LED units LU are arranged on each side in the short-side direction so as to have the light guide plate 16 therebetween in the Y-axis direction. The light rays from the LEDs 17 enter the light guide plate 16 through the ends of the short dimension of the light guide plate 16. The light guide plate 16 is configured such that light rays, which are from the LEDs 17 and enter through the ends of the short dimension of the light guide plate 16, travel through the light guide plate 16 and exit toward the optical member 15 (the front side).

As illustrated in FIG. 4, one of the plate surfaces of the light guide plate 16 facing the front is a light exit surface 16a (a surface facing the optical member 15). Light exits the light guide plate 16 through the light exit surface 16a toward the optical member 15 and the liquid crystal panel 11. Peripheral edge surfaces 16E1 to 16E4 of the light guide plate 16 that are adjacent to the plate surfaces of the light guide plate 16 include elongated long-side edge surfaces (first peripheral edge surface and a second peripheral edge surface) 16E1, 16E2 that extend in the X-axis direction. The long-side edge surfaces 16E1, 16E2 are opposite the LEDs 17 (the LED boards 18) with a predetermined distance therebetween and serves as a pair of light entrance surfaces 16b through which light from LEDs 17 enters. The light entrance surface 16b is parallel to the X-Z plane (plate surfaces of the LED boards 18) and substantially perpendicular to the light exit surface 16a. The long-side edge surfaces 16E1, 16E2 that are light entrance surfaces 16b have a linear shape along an entire long side length of the light guide plate 16. The light entrance surface 16b is a portion included in each of the long-side edge surfaces 16E1, 16E2 of the light guide plate 16 where light from the LEDs 17 reaches (an illumination area). Therefore, a portion of each of the long-side edge surfaces 16E1, 16E2 of the light guide plate 16 where light from the LEDs 17 does not reach (a non-illumination area) is not included in the light entrance surface 16b. According to this embodiment, most of a middle part of each long-side edge surface 16E1, 16E2 of the light guide plate 16 in the longitudinal direction (the X-axis direction) thereof is the illumination area (the light entrance surface 16b) and two end portions of each long-side edge surface in the longitudinal direction are the non-illumination areas. Among the outer peripheral edge surfaces 16E1 to 16E4 of the light guide plate 16, short-side edge surfaces 16E3, 16E4 that extend along the Y-axis direction and are adjacent to the light entrance surfaces 16b (edge surfaces adjacent to the first edge surface and the second edge surface) are LED non-opposed edge surfaces (light source non-opposed edge surfaces) that are not opposed to the LEDs 17. The LEDs 17 and the light entrance surfaces 16b are arranged in the Y-axis direction and parallel to the light exit surface 16a.

Figure 10:
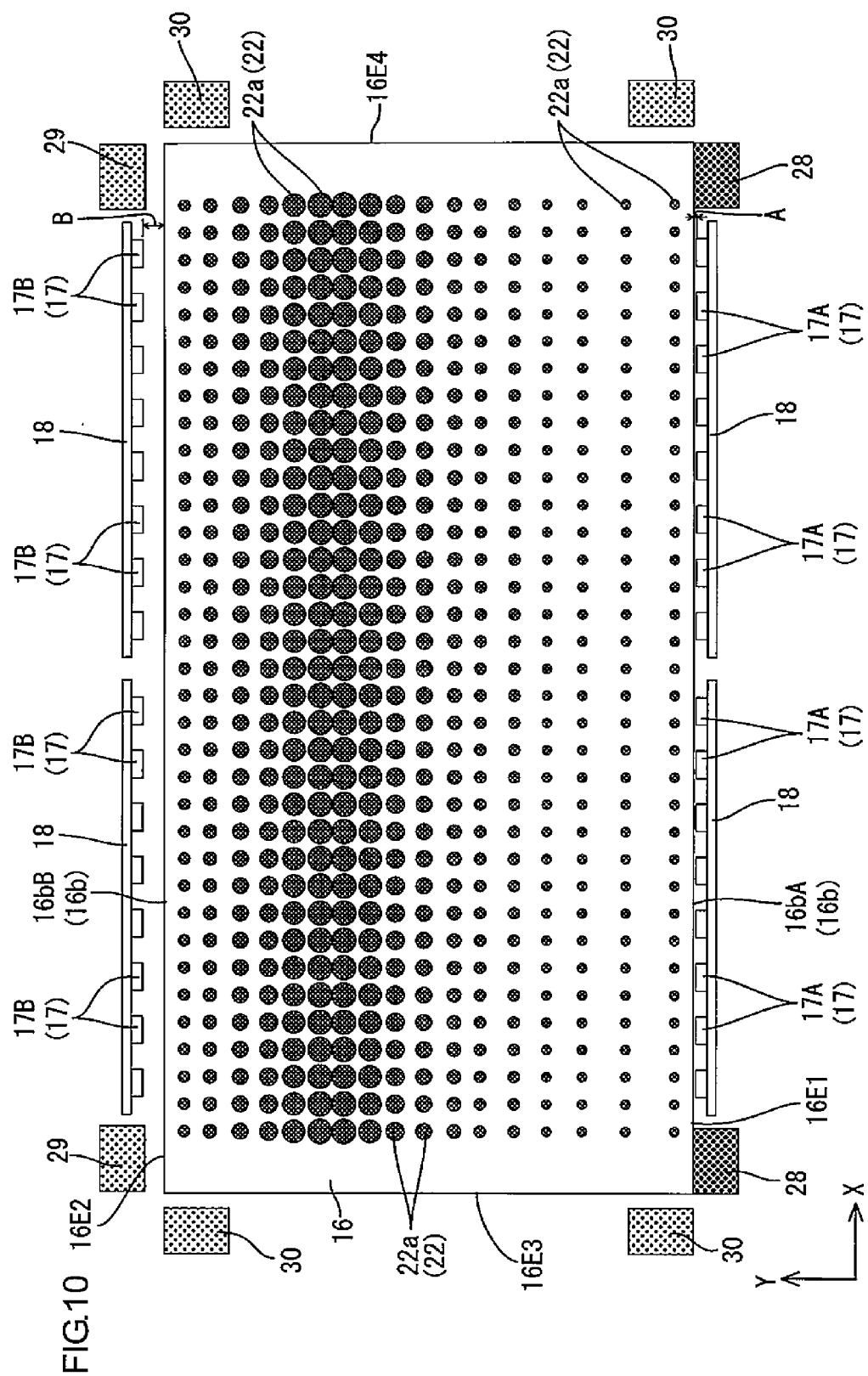
FIG. 10 is a plan view illustrating a general arrangement configuration of LEDs, the light guide plate, and support members.

As illustrated in FIGS. 4 and 5, a light guide reflection sheet (a reflection member) 20 is arranged on a rear side of the light guide plate 16, that is, a plate surface 16c opposite to the light exit surface 16a (a surface opposed to the chassis 14). Light that travels through the plate surface 16c toward the rear is reflected by the light guide reflection sheet 20 toward the front. The light guide reflection sheet 20 is arranged to cover an entire area of the plate surface 16c. In other words, the light guide reflection sheet 20 is arranged between the chassis 14 and the light guide plate 16. The light guide reflection sheet 20 is made of synthetic resin and has a white surface having high light reflectivity. As illustrated in FIGS. 4 and 5, the light guide reflection sheet 20 has a short-side dimension and a long-side dimension larger than those of the light guide plate 16. The light guide reflection sheet 20 is arranged such that four sides of the light guide reflection sheet 20 are farther out than the respective four sides of the light guide plate 16. Particularly, as illustrated in FIG. 4, long-side edge portions of the light guide reflection sheet 20 are farther out than the light entrance surfaces 16b of the light guide plate 16. Namely, the long-side portions of the light guide reflection sheet 20 protrude toward the LEDs 17, and the protruded portions (the long-side edge portions) of the light guide reflection sheet 20 effectively reflect light traveling from the LEDs 17 obliquely toward the chassis 14 so that the refection light is directed toward the light exit surface 16b of the light guide plate 16. The plate surface 16c opposite from the light exit surface 16a of the light guide plate 16 has a light reflection portion 22. The light reflection portion 22 is configured to reflect the light inside the light guide plate 16 toward the light exit surface 16a to accelerate exiting of light through the light exit surface 16a (FIG. 10). The light reflection portion 22 is arranged between the plate surface 16c opposite to the light exit surface 16a of the light guide plate 16 and the light guide reflection sheet 20.

As illustrated in FIG. 10, the light reflection portion 22 is formed by printing a light reflective material on the plate surface 16c of the light guide plate 16 away from the light exit surface 16a. Namely, the light reflection portion 22 may be referred to as light reflective prints. The light reflective material used for the light reflection portion 22 is a white ink (or a paste) containing metal oxide such as titanium oxide. The light reflection portion 22 is configured to diffusely reflect the rays of light entering the light guide plate 16 and reaching the plate surface 16c away from the light exit surface 16a toward the light exit surface 16a. The light reflection portion 22 is further configured to vary an angle of incidence at the light exit surface 16a compared with an angle of incidence of light that is fully reflected at the plate surface 16c. Accordingly, more rays of light have the angles of incidence which do not exceed the critical angle and thus the amount of light that exits through the light exit surface 16a increases. The light reflection portion 22 may be formed on the light guide plate 16 by printing methods including silk printing (screen printing) and inkjet printing. With the silk printing, production cost is reduced when the light guide plates are mass-produced. With the inkjet printing, the light reflection portion 22 can be formed with high accuracy even if the light reflection portion 22 is formed in a complex pattern. A dot pattern of the light reflection portion 22 will be described in detail below.

Next, a configuration of each of the LEDs 17, the LED board 18, and the heat dissipation member 19, which are included in the LED unit LU, will be described. As illustrated in FIGS. 3 and 4, each LED 17, which is included in the LED unit LU, include an LED chip that is sealed with resin on a board fixed on the LED board 18. The LED chip mounted on the board has one main light emission wavelength. Specifically, the LED chip that emits light in a single color of blue is used. On the other hand, the resin that seals the LED chip contains phosphors dispersed therein. The phosphors emit light in a predetermined color when excited by blue light emitted from the LED chip. Overall color of light emitted from the LED 17 is white. The phosphors may be selected, as appropriate, from yellow phosphors that emit yellow light, green phosphors that emit green light, and red phosphors that emit red light. The phosphors may be used alone or in combination of the above phosphors. The LED 17 includes a main light-emitting-surface 17a that is opposite to a surface on which the LED board 18 is mounted (a surface facing the light entrance surface 16b of the light guide plate 16). Namely, the LED 17 is a top-surface-emitting type LED. The LED 17 has a shape that the main light-emitting surface 17a has a substantially landscape square shape with a front view (elongated in the X-axis direction).

As illustrated in FIGS. 3 and 4, each LED board 18 included in the LED unit LU has an elongated plate-like shape and extends in the long-side direction of the light guide plate 16 (the X-axis direction, the long-side direction of the light entrance surface 16b). The LED board 18 is placed in the space between the frame 13 and the chassis 14 such that a board surface of each LED board 18 is parallel to the X-Z plane, namely, parallel to the light entrance surface 16b of the light guide plate 16. The LED board 18 has a long-side dimension that is smaller than a half of the long-side dimension of the light guide plate 16. Therefore, when the two LED boards 18 are arranged adjacent to each other so as to be opposed to the light entrance surface 16b, two end portions of each of the long-side edge surfaces 16E1, 16E2 of the light guide plate 16 are not opposed to the LED boards 18 (refer to FIG. 8). The LED board 18 is made of metal such as aluminum. Traces (not illustrated) are formed on the surface of the LED board via an insulating layer. The LED board 18 may be made of an insulating material such as ceramic.

Figure 6:
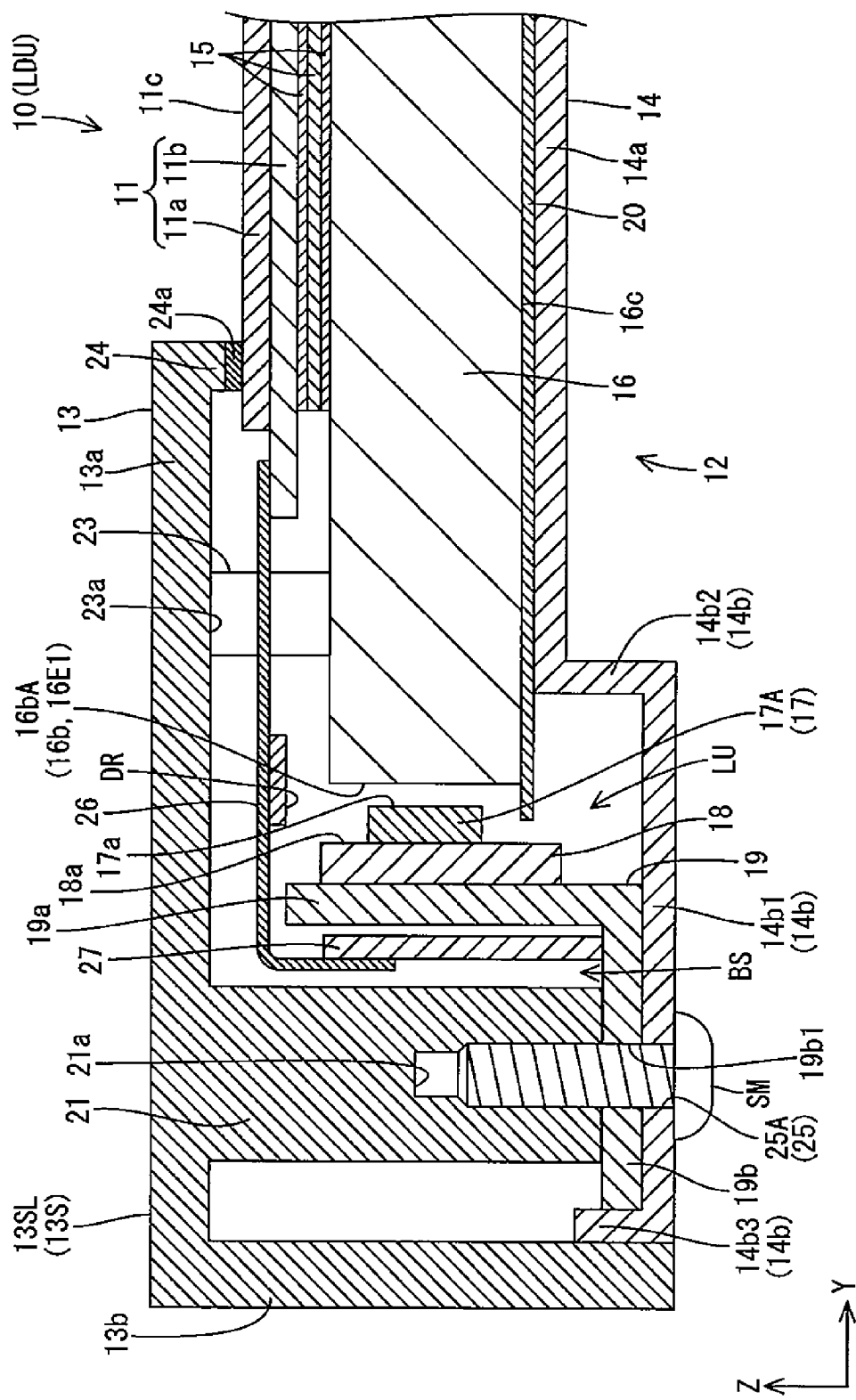
FIG. 6 is a magnified cross-sectional view of the liquid crystal display device. The liquid crystal display device is taken in the short-side direction thereof along a line passing a flexible board (a joint screw hole).
Figure 8:
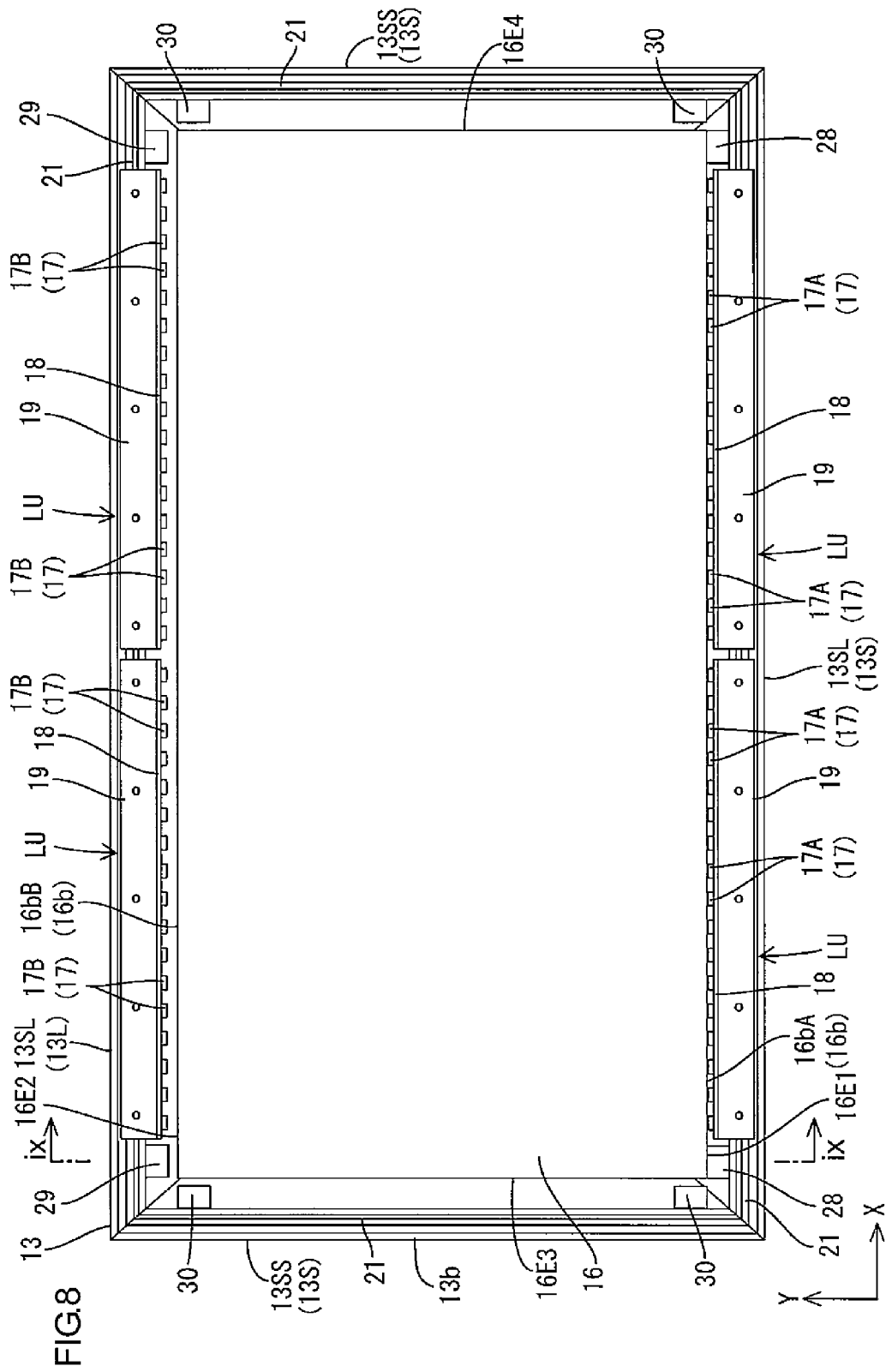
FIG. 8 is a rear view of the liquid crystal display device without the chassis.

As illustrated in FIGS. 4 and 6, the LED board 18 includes amount surface 18a on which the LEDs 17 are mounted. The mount surface 18a is a main board surface that faces inward, namely, a surface that faces the light guide plate 16 (the surface opposed to the light guide plate 16). As illustrated in FIG. 8, the LEDs 17 are arranged in a line (i.e., linearly) at intervals on the mount surface 18a of the LED board 18 along the long-side direction of the LED board 18 (the X-axis direction). In other words, multiple LEDs 17 are arranged apart from each other along the long-side direction in the two long-side edge portions of the backlight unit 12. Distances between the adjacent LEDs 17 in the X-axis direction are substantially equal, that is, the LEDs 17 are arranged at substantially equal intervals. Traces (not illustrated) that are metal films (such as copper foil) are formed on the mount surface 18a of the LED board 18. Each trace extends in the X-axis direction and connects in series the adjacent LEDs 17 each of which is included in different LED 17 groups. Terminals formed at ends of the respective traces are connected to an external LED drive circuit to supply driving power to the LEDs 17. The LEDs 17 are arranged in the longitudinal direction of the LED board 18 (the X-axis direction). The LED boards 18 in a pair sandwiching the light guide plate 16 therebetween are arranged in the frame 13 and the chassis 14 such that the mount surfaces 18a having the LEDs 17 thereon are opposed to each other. With such a configuration, the main light emission surfaces 17a of the respective LEDs 17 mounted on each of the LED boards 18 are opposed to each other. Optical axes of the respective LEDs 17 substantially match the Y-axis direction, that is an arrangement direction in which the light guide plate 16 and the LED boards 18 (the LEDs 17) are arranged.

As illustrated in FIGS. 3 and 4, the heat dissipation member 19 of each LED unit LU is made of metal having high thermal conductivity, such as aluminum. The heat dissipation member 19 includes an LED mounting portion (a light source mounting portion) 19a and a heat dissipation portion 19b. The LED board 18 is mounted on the LED mounting portion 19a. The heat dissipation portion 19b is in surface-contact with a plate surface of the chassis 14. The LED mounting portion 19a and the heat dissipation portion 19b form an angle therebetween so as to have an L-like shape in a cross-section. The heat dissipation member 19 has a long-side dimension substantially equal to the long-side dimension of the LED board 18. The LED mounting portion 19a of the heat dissipation member 19 has a plate-like shape and is parallel to the plate surface of the LED board 18 and the light entrance surface 16b of the light guide plate 16. A long-side direction, a short-side direction, and a thickness direction of the LED mounting portion 19a correspond to the X-axis direction, the Z-axis direction, and the Y-axis direction, respectively. The LED board 18 is mounted on an inner surface of the LED mounting portion 19a, that is, a plate surface that faces the light guide plate 16. The LED mounting portion 19a has a long-side dimension that is substantially equal to that of the LED board 18, whereas a short-side dimension of the LED mounting portion 19a is larger than that of the LED board 18. Namely, ends of the LED mounting portion 19a in the short-side dimension are farther out than the ends of the LED board 18 in the Z-axis direction. An outer plate surface of the LED attachment portion 19a, that is, a plate surface opposite to the plate surface on which the LED board 18 is attached, faces a screw attachment portion 21 (a fixing member attachment portion) included in the frame 13, which will be described later. The LED attachment portion 19a is located between the screw attachment portion 21 of the frame 13 and the light guide plate 16. The LED attachment portion 19a extends from an inner end of the heat dissipation portion 19b, i.e., an end of the heat dissipation portion 19b on the LEDs 17 (the light guide plate 16) side, toward the front side in the Z-axis direction (a direction in which the liquid crystal panel 11, the optical member 15, and the light guide plate 16 overlap each other), i.e., toward the frame 13.

As illustrated in FIGS. 3 and 4, the heat dissipation portion 19b has a plate-like shape and is parallel to the plate surface of the chassis 14. A long-side direction, a short-side direction, and a thickness direction of the heat dissipation portion 19b match the X-axis direction, the Y-axis direction, and the Z-axis direction, respectively. The heat dissipation portion 19b extends from a rear-side end of the LED attachment portion 19a toward the outer side in the Y-axis direction. In other words, the heat dissipation portion 19b extends from an end of the LED attachment portion 19a closer to the chassis 14 toward a counter direction from the light guide plate 16. The heat dissipation portion 19b has a long-side dimension substantially equal to the long-side dimension of the LED attachment portion 19a. An entire rear plate surface of the heat dissipation portion 19b, i.e., a plate surface of the heat dissipation portion 19b facing the chassis 14, is in contact with the plate surface of the chassis 14. A front plate surface of the heat dissipation portion 19b, i.e., a plate surface opposite from the surface in contact with the chassis 14, faces the screw attachment portion 21 of the frame 13, which will be described later. Specifically, the front plate surface of the heat dissipation portion 19b is in contact with a projected end surface of the screw attachment portion 21. The heat dissipation portion 19b is sandwiched (disposed) between the screw attachment portion 21 of the frame 13 and the chassis 14. With this configuration, heat generated by the lightened LEDs 17 is transferred to the chassis 14 and the frame 13 including the screw attachment portion 21 via the LED board 18, the LED attachment portion 19a, and the heat dissipation portion 19b. Therefore, heat is effectively released to the outside of the liquid crystal display device 10 and thus the heat is less likely to stay therein. The heat dissipation portion 19b includes through holes 19b1 through which screw members (fixing members) SM are passed. The heat dissipation portion 19b is fixed to the screw attachment portion 21 with the screw members SM.

Next, configurations of the frame 13 and the chassis 14 that constitute the external members and the holding member will be described. The frame 13 and the chassis 14 are made of metal such as aluminum so as to have mechanical strength (rigidity) and thermal conductivity compared to a frame 13 and a chassis 14 made of synthetic resin. As illustrated in FIG. 3, while the frame 13 and the chassis 14 have the LED units LU in each edge portion of the frame 13 and the chassis 14 with respect to the short-side direction (the long-side edge portions), the frame 13 and the chassis 14 hold the liquid crystal panel 11, the optical member 15, and the light guide plate 16, which are placed on top of the other, from the front side and the rear side.

As illustrated in FIG. 3, the frame 13 has a landscape rectangular shape so as to surround the display area in the display surface 11c of the liquid crystal panel 11. The frame 13 includes a panel holding portion 13a and a sidewall 13b. The panel holding portion 13a is parallel to the display surface 11c of the liquid crystal panel 11 and presses the liquid crystal panel 11 from the front side. The sidewall 13b protrudes from an outer peripheral portion of the panel holding portion 13a toward the rear side. The panel holding portion 13a and the sidewall 13b form an L-like shape in a cross-section. The panel holding portion 13a has a landscape-rectangular and frame-like shape as a whole that corresponds to an outer peripheral portion (the non-display area, a frame-like portion) of the liquid crystal panel 11. The panel holding portion 13a presses a substantially entire area of the outer peripheral portion of the liquid crystal panel 11 from the front side. The panel holding portion 13a has a width that is large enough to cover not only the outer peripheral portion of the liquid crystal panel 11 but also the outer peripheral portions of the light guide plate 16 and the LED units LU from the front side. The outer peripheral portions of the optical members 15 and the light guide plate 16 and the LED units LU are located out from the outer peripheral portion of the liquid crystal panel 11 in a radiation direction. Similar to the display surface 11c of the liquid crystal panel 11, a front exterior surface (a surface opposite to the surface facing the liquid crystal panel 11) of the panel holding portion 13a is seen from the front side of the liquid crystal display device 10. The panel holding portion 13a constitutes a front exterior of the liquid crystal display device 10 together with the display surface 11c of the liquid crystal panel 11. The sidewall 13b has a substantially rectangular hollow shape and protrudes from the outer peripheral portion (specifically, an outer peripheral edge) of the panel holding portion 13a toward the rear side. The sidewall 13b entirely surrounds the liquid crystal panel 11, the optical member 15, the light guide plate 16, and the LED units LU, which are arranged in the space between the frame 13 and the chassis 14, in a peripheral direction thereof. The sidewall 13b also entirely surrounds the chassis 14, which is on the rear side, in a peripheral direction thereof. Outer surfaces of the sidewall 13b that extend in the peripheral direction of the liquid crystal display device 10 face outside of the liquid crystal display device 10. Therefore, the outer surfaces of the sidewall 13b constitute a top surface, a bottom surface, and side surfaces of the liquid crystal display device 10.

As illustrated in FIGS. 3 and 8, the frame 13 formed in a frame-like shape having the above configuration includes four frame pieces 13S that are assembled together. The frame pieces 13S (long-side portions and short-side portions) each correspond to each side of the frame 13. Specifically, the frame pieces 13S include long-side frame pieces 13SL and short-side frame pieces 13SS that constitute the long-side portions and the short-side portions of the frame 13 (the panel holding portions 13a and the side walls 13b), respectively. Each long-side frame piece 13SL is a block member that extends in the X-axis direction and has an L-like cross section. Each short-side frame piece 13SS is a block member that extends in the Y-axis direction and has an L-like cross section. With this configuration, in the production process, the frame pieces 13S can be formed by extruding metal material, for example. Thus, the production cost can be reduced compared to the frame 13 formed by cutting metal material. The long-side frame pieces 13SL and the short-side frame pieces 13SS that are adjacent to each other form the frame 13 by joining the respective edges thereof in the respective extending directions. The edges of the long-side frame pieces 13SL and the edges of the short-side frame pieces 13SS, which are the joint portions of the frame pieces 13SL and 13SS (joints in the frame 13), are angled against the X-axis and Y-axis directions in a plan view. Specifically, each edge extends along a line connecting an inner edge and an outer edge of each corner of the panel holding portion 13a. The long-side frame pieces 13SL (refer to FIG. 4) cover not only the liquid crystal panel 11, the optical member 15, and the light guide plate 16 but also the LED units LU. The short-side frame pieces 13SS (refer to FIG. 5) do not cover the LED units LU. Therefore, the long-side frame piece 13SL has a relatively larger width than the short-side frame piece 13SS.

As illustrated in FIGS. 4 and 5, the panel holding portion 13a includes the screw attachment portions (fixing member attachment portions) 21 at a further interior position than the sidewall 13b of the panel holding portion 13a (a position away from the sidewall 13b toward the light guide plate 16). The screw member (the fixing member) SM is attached to the screw attachment portion 21. The screw attachment portions 21 each protrude from an inner surface of the panel holding portion 13a toward the rear side in the Z-axis direction and each have an elongated block-like shape that extends along a side of the panel holding portion 13a (in the X-axis direction and the Y-axis direction). The screw attachment portions 21 each extend on each side of the panel holding portion 13a with a length equal to the length of each side of the panel holding portion 13a. As illustrated in FIG. 8, the screw attachment portions 21 are each arranged on each frame piece 13S included in the frame 13. If the frame pieces 13S are connected with each other, the screw attachment portions 21 form a frame-like shape that continues to inner surfaces of the sidewall 13b having a rectangular hollow shape over its entire length. As illustrated in FIG. 4 and FIG. 5, each screw attachment portion 21 includes a groove 21a that opens to the rear side and to which the screw member SM can be fastened. The groove 21a extends in the longitudinal direction of the screw attachment portion 21 over substantially the entire length thereof. The groove 21a has a width that is slightly smaller than that of a shaft portion of the screw member SM. The screw attachment portion 21 is positioned between the panel holding portion 13a of the frame 13 and the chassis 14 in the Z-axis direction.

Figure 7:
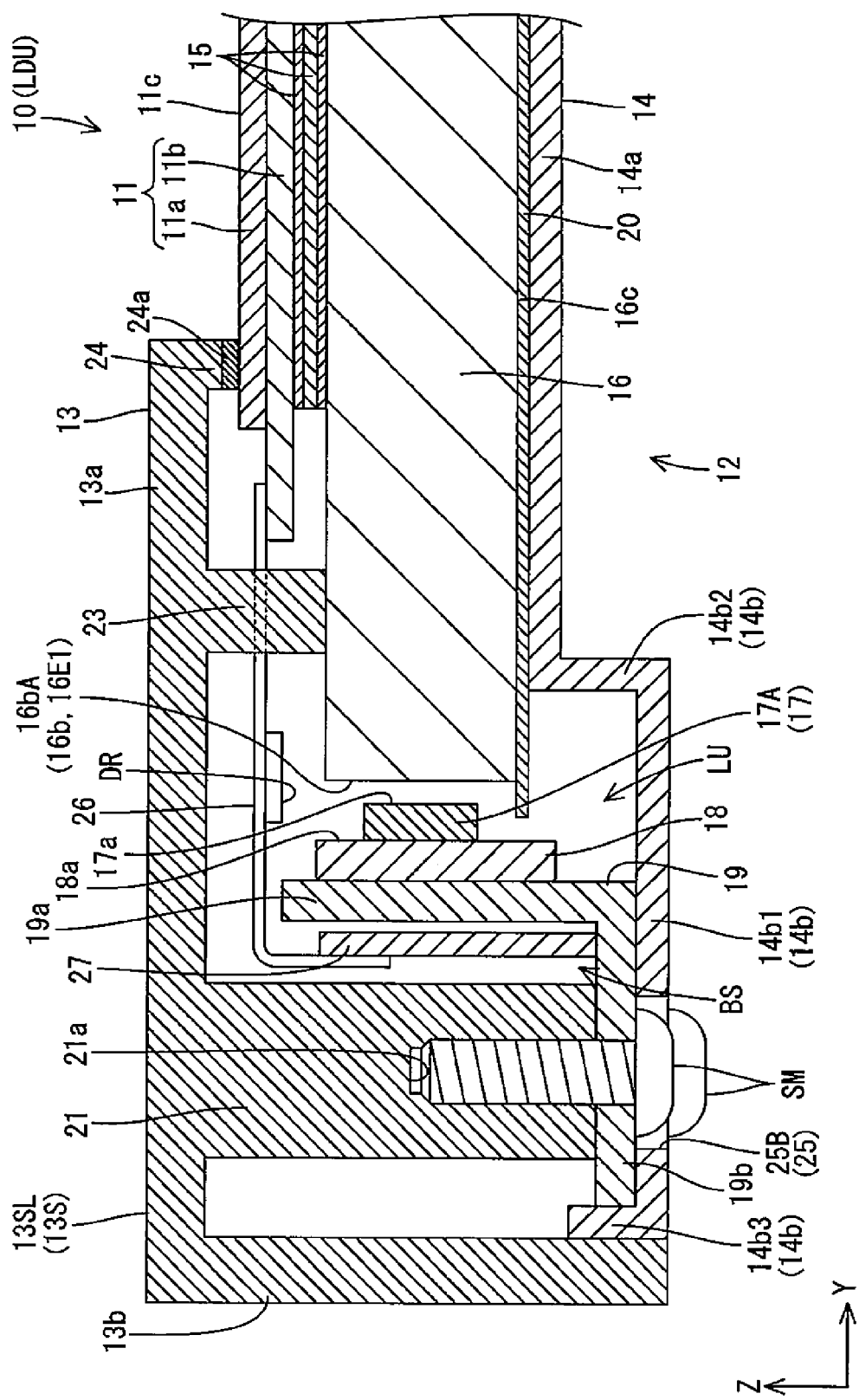
FIG. 7 is a magnified cross-sectional view of the liquid crystal display device. The liquid crystal display device is taken in the short-side direction along a line passing a light guide plate holder (a heat dissipation member screw hole).

As illustrated in FIG. 4, the screw attachment portions 21 that extend along the long sides are each positioned between the sidewall 13b of the frame 13 and the LED attachment portion 19a of the heat dissipation member 19, which is included in the LED unit LU, in the Y-axis direction. The screw attachment portion 21 is away from the LED attachment portion 19a by a predetermined distance. As illustrated in FIGS. 6 and 7, a board space BS in which the printed circuit board 27 is arranged is provided between one of the heat dissipation members 19 that overlaps the source flexible board 26 in a plan view and the screw attachment portion 21, to which the heat dissipation member 19 is attached. In other words, the printed circuit board 27 is arranged between the screw attachment portion 21 and the LED attachment portion 19a. The printed circuit board 27 is made of synthetic resin and has an elongated plate-like shape that extends in the longitudinal direction of the screw attachment portion 21 and the LED attachment portion 19a (in the X-axis direction). The printed circuit board 27 is arranged in the board space BS such that a plate surface of the printed circuit board 27 extends parallel to an outer plate surface of the LED attachment portion 19a (a surface opposite to the LED board 18 side). On the printed circuit board 27, multiple source flexible boards 26 are arranged away from each other in the long-side direction of the printed circuit board 27 and connected to the printed circuit board 27 at the other end thereof. The source flexible boards 26 that are connected to the printed circuit board 27 and the array board 11b of the liquid crystal panel 11 extend over the LED attachment portion 19a, the LED board 18, and the LEDs 17 in the Y-axis direction. The printed circuit board 27 includes a connecter (not illustrated) to which an end of an FPC (not illustrated) is connected. The other end of the FPC extends to the rear side of the chassis 14 through an FPC hole (not illustrated) in the chassis 14 and is connected to the control board CTB.

As illustrated in FIGS. 4 and 5, the panel holding portion 13a integrally includes a light guide plate support portion 23 at a portion inner than the screw attachment portion 21. The light guide plate support portion 23 supports the light guide plate 16 from the front side (a display surface 11c side). The light guide plate support portion 23 projects from an inner surface of the panel holding portion 13a toward the rear side (the light guide plate 16) along the Z-axis direction (a direction in which the screw attachment portion 21 projects). The light guide plate support portion 23 has a substantially thin elongated block shape extending along a side of each of the panel holding portion 13a. The light guide plate support portion 23 is provided at a side of each panel holding portion 13a and has a length dimension extending over an entire length of each side. The light guide plate support portion 23 is provided separately on each of the frame pieces 13S included in the frame 13 similar to the screw attachment portion 21. The frame pieces 13S are mounted together to form a frame-shaped light guide plate support portion 23 that extends along an entire periphery of the panel holding portion 13a (the light guide plate 16) as a whole. The light guide plate support portion 23 has a projected distal end surface that is in contact with a front-side surface of an edge portion of the light guide plate 16, i.e., the light exit surface 16a. The edge portion of the light guide plate 16 projects to an outer side than the liquid crystal panel 11. Therefore, the light guide plate support portion 23 and the chassis 14 hold the light guide plate 16 therebetween such that the light guide plate support portion 23 supports the light guide plate 16 from the front side (the display surface 11c side) and has a light guide plate supporting function.

A pair of long-side light guide plate support portions 23 is provided on the long-side frame pieces 13SL and extends along the long sides of the panel holding portions 13a. As illustrated in FIG. 4, the long-side light guide plate support portions 23 support the long-side edge portions of the light guide plate 16 having the light entrance surfaces 16b so that a positional relation between the LEDs 17 and the light entrance surface 16b with respect to the Z-axis direction is maintained stably. Further, the long-side light guide plate support portions 23 are arranged between the liquid crystal panel 11 and the LEDs 17. Specifically, each of the long-side light guide plate support portions 23 is located in and divides a space between the LEDs 17 and the LED 17 side end surfaces of the liquid crystal panel 11 and the optical member 15 and close a divided space. Accordingly, light from the LEDs 17 is less likely to enter the liquid crystal panel 11 and the optical member 15 through the edge surfaces thereof without passing through the light guide plate 16. Namely, the long-side light guide plate support portions 23 have a light blocking property and function as a light blocking member. As illustrated in FIGS. 6 and 7, one of the long-side light guide plate support potions 23 overlaps the flexible boards 26 with a plan view and the one of the long-side light guide plate support potions 23 has flexible board insertion recesses 23a that are arranged at intervals along the X-axis direction. The flexible boards 26 are inserted through the respective flexible board insertion recesses 23a. The arrangement of the flexible board insertion recesses 23a is same as that of the flexible boards 26.

As illustrated in FIGS. 4 and 5, the panel holding portion 13a integrally includes a holding protrusion 24 that protrudes from an inner edge of the panel holding portion 13a toward the rear-surface side, i.e., toward the liquid crystal panel 11. The holding protrusion 24 includes a shock absorber 24a at its protruded end. The holding protrusion 24 can press the liquid crystal panel 11 from the front side via the shock absorber 24a in between. Similar to the screw mounting portion 21, the holding protrusion 24 and the shock absorber 24a extend along a side of each of the frame pieces 13S, which form the frame 13, and each holding protrusion 24 and each shock absorber 24a are provided on each of the sides of the frame pieces 13S, separately. The frame pieces 13S are mounted together to form a frame-like shape as a whole at an entire inner peripheral edge of the panel holding portion 13a.

As illustrated in FIG. 3, the chassis 14 has a substantially longitudinal shallow tray shape as a whole and covers overall areas of the light guide plate 16 and the LED units LU from the rear side. A rear outer surface of the chassis 14 (a surface of the chassis 14 opposite from a surface that faces the light guide plate 16 and the LED units LU) is seen from the rear side and constitutes a back surface of the liquid crystal display device 10. The chassis 14 includes a light guide plate receiving portion 14a and housings 14b. The light guide plate receiving portion 14a has a landscape rectangular shape similar to the light guide plate 16. Each of the housings 14b protrudes from an outer peripheral end of the light guide plate receiving portion 14a toward the rear side to form a step and holds the LED unit LU.

As illustrated in FIGS. 3 to 5, the light guide plate receiving portion 14a has a flat plate shape to receive a most of a middle portion of the light guide plate 16 from the rear side. The holding portion 14b is recessed from the long-side portion of the light guide plate receiving portion 14a toward the rear side to provide a space for holding the LED units LU therein. As illustrated in FIG. 4, the holding portion 14b includes a bottom plate 14b1, which extends parallel to the light guide plate receiving portion 14a, and sidewalls 14b2 and 14b3, which extend upward from respective ends of the bottom plate 14b1 toward the front side. An inner sidewall 14b2 of the sidewalls 14b2, 14b3 continues to the light guide plate receiving portion 14a. On the bottom plate 14b1, the heat dissipation portion 19b of the heat dissipation member 19, which is included in the LED unit LU, is disposed such that a surface of the heat dissipation portion 19b is in contact with the inner surface of the bottom plate 14b1. The screw members (fixing members) SM are mounted to the bottom plate 14b1 from the outside to fix the frame 13 and the chassis 14 together.

As illustrated in FIGS. 3, 6, and 7, the light guide plate receiving portion 14a and the bottom plate 14b1 of the holding portion 14b include multiple screw holes 25 in which the screw members SM are inserted. The screw holes 25 of light guide plate receiving portion 14a and the screw holes 25 of the bottom plate 14b1 of the holding portion 14b are arranged corresponding to the screw mounting portions 21 of the frame 13 in a plan view. Each screw hole 25 is communicated with the groove 21a of the corresponding screw mounting portion 21. Accordingly, the screw member SM is passed through the screw hole 25 in the Z-axis direction (the overlapping direction of the liquid crystal panel 11, the optical member 15, and the light guide plate 16) from the rear side of the chassis 14 (the side opposite to the display surface 11c side). The screw member SM is inserted in the groove 21a and fastened to the screw mounting portion 21 with the bottom plate 14b1 disposed therebetween. When the screw member SM is fastened, thread grooves are formed in the groove 21a by the threads formed on the shaft of the screw member SM. The screw holes 25 in the bottom plate 14b1 of the holding portion 14b include a joint screw hole 25A and a heat dissipation member screw hole 25B. As illustrated in FIG. 6, the joint screw hole 25A has a size through which only the shaft of the screw member SM passes. As illustrated in FIG. 7, the heat dissipation member screw hole 25B has a size through which both of a head and the shaft of the screw member SM pass. The screw member SM is passed through the joint screw hole 25A to fasten the heat dissipation portion 19b and the bottom plate 14b1 together to the screw mounting portion 21. The screw member SM is passed through the heat dissipation member screw hole 25B to fasten only the heat dissipation portion 19b to the screw mounting portion 21.

Figure 11:
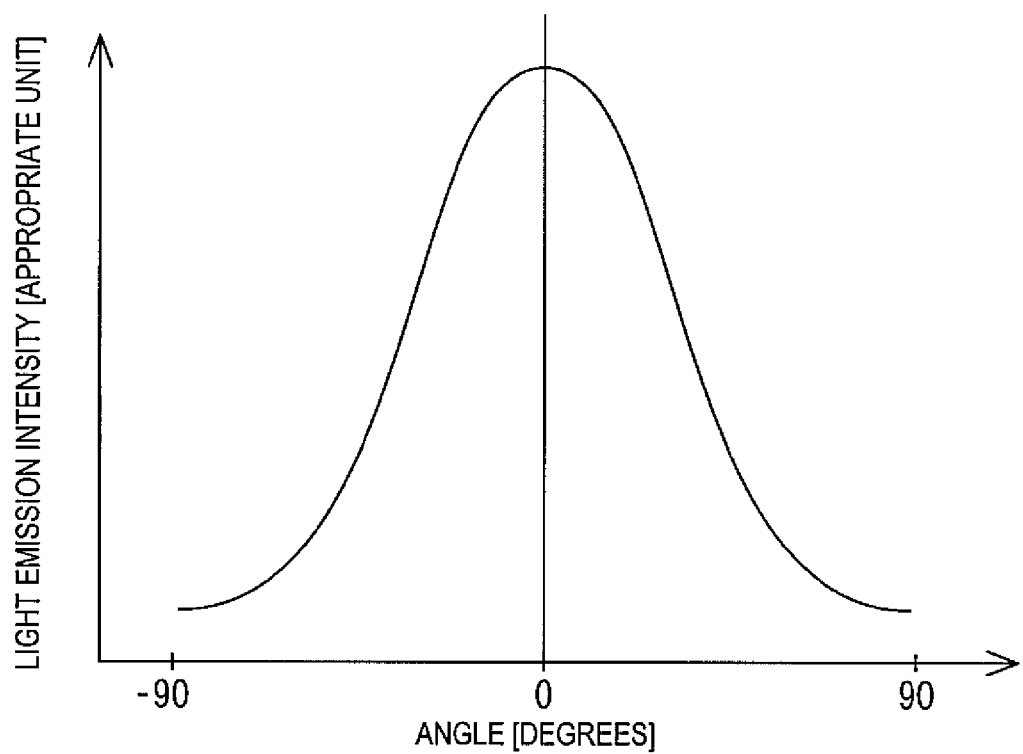
FIG. 11 is a graph illustrating a light intensity distribution of a LED.

Next, a light intensity distribution of the LEDs 17 that are the light source will be described with reference to FIG. 11. In FIG. 11, a lateral axis represents an angle (degrees) with respect to an optical axis (a front direction) of light from the LED 17 and a vertical axis represents light emission intensity (appropriate unit). Herein, a specific unit of the light intensity includes a radiant intensity (W/sr·m2), a radiant flux (W), and irradiance (W/m2). Any other physical quantities relating to quantity of radiation may be used as the specific unit of the light intensity. In the light intensity distribution of light from the LED 17, the rays of light traveling toward a front direction of the main light emission surface 17a, i.e., along the optical axis have a peak light intensity and the light emission intensity tends to decrease with a curved line in the graph as the angle with respect to the optical axis increases. Namely, the light intensity distribution is represented by the curved graph having an angle range with certain light emission intensity or more or having a width continuously increasing and decreasing. Thus, the LED 17 represents a lambertian light intensity distribution. Such a light intensity distribution represents a graph having a shape similar to a normal distribution and a substantially symmetrical shape with respect to an optical axis. In the lambertian light intensity distribution, the light entrance efficiency is improved as the distance between the LED 17 and the light entrance surface 16b of the light guide plate 16 is decreased, and the light entrance efficiency is decreased as the distance is increased. On the other hand, the light guide plate 16 thermally expands due to heat generated by light emission from the LED 17 and increases its size. Therefore, a clearance is required to be provided between the LEDs 17 and the light entrance surface 16b to allow the size increase of the light guide plate 16 due to the thermal expansion. This limits improvement of the light entrance efficiency of light entering the light guide plate 16.

Figure 12:
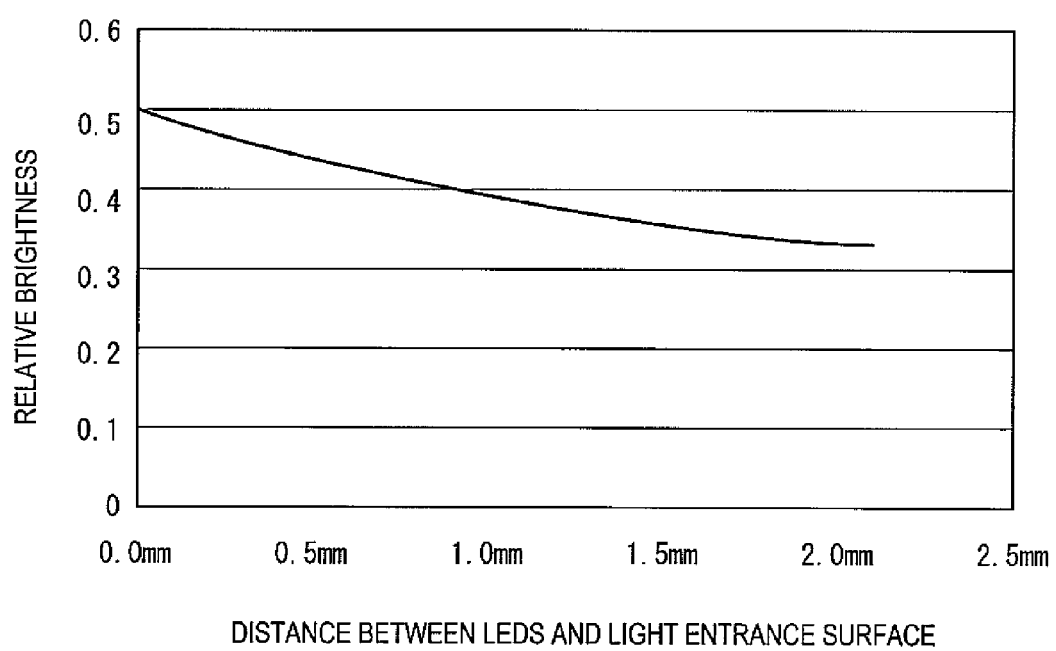
FIG. 12 is a graph illustrating a relationship between relative brightness and a distance between the LEDs and the light entrance surface.

As a result of enthusiastic studies, the inventor found that if the distance between the LED 17 having the lambertian light intensity distribution and the light entrance surface 16b of the light guide plate 16 is a certain value or more, the light entrance efficiency is unlikely to be decreased according to the increase of the distance and the light entrance efficiency becomes constant. Hereinafter, relation between the distance between the LED 17 and the light entrance surface 16b of the light guide plate 16 and the light entrance efficiency will be described with reference to FIG. 12. In FIG. 12, a lateral axis represents a distance between the LED 17 and the light entrance surface 16b of the light guide plate 16, and a vertical axis represents relative brightness of light exiting the light guide plate 16 through the light exit surface 16a. Herein, the relative brightness represents a relative brightness value with a total flux of rays of emission light from the LED 17 as a reference value. According to the graph in FIG. 12, when the distance between the LED 17 and the light entrance surface 16b of the light guide plate 16 is substantially zero, the maximum relative brightness is approximately 0.5, and the relative brightness decreases gradually as the distance increases. When the distance is between 1.0 mm and 1.5 mm, the relative brightness decreases more moderately, and when the distance is between 1.5 mm and 2 mm, the relative brightness decreases much more moderately. Thus, the relative brightness, i.e., the decreasing rate of light entrance efficiency of the light emitted from the LED 17 and entering the light guide plate 16 through the light entrance surface 16b (a rate of the decreasing amount in the relative brightness with respect to the increase amount of the distance (entrance efficiency)) is unlikely to be decreased when the distance between the LED 17 and the light entrance surface 16b of the light guide plate 16 exceeds 1.0 mm. When the distance reaches 2 mm, the relative brightness substantially remains a certain value and becomes constant.

According to the result of the studies, the inventor arranges the light guide plate 16 and the LEDs 17 as follows. The LEDs 17 are mounted on the LED boards 18 that sandwich the light guide plate 16 therebetween. One of the light entrance surfaces 16b of the light guide plate 16 is a first light entrance surface 16bA and the LEDs 17 opposed to the first light entrance surface 16bA are first LEDs 17A. The other light entrance surface 16b that is on an opposite side from the first light entrance surface 16bA is a second light entrance surface 16bB and the LEDs 17 opposed to the second light entrance surface 16bA are second LEDs 17B. As illustrated in FIG. 10, the first LEDs 17A are arranged to have a relatively small distance A from the first light entrance surface 16bA, and the second LEDs 17B are arranged to have a relatively great distance B from the second light entrance surface 16bB. A total dimension of the distance A and the distance B substantially equal to a maximum size increase amount of the light guide plate 16 that increases its size in the vertical direction (the Y-axis direction, the direction in which the LEDs 17A, 17B and the light guide plate 16 are arranged) due to its thermal expansion. The first LEDs 17A are arranged on a lower side of the light guide plate 16 with respect to the vertical direction and the first light entrance surface 16bA is a lower long-side edge surface 16E1 in the vertical direction. The second LEDs 17B are arranged on an upper side of the light guide plate 16 with respect to the vertical direction and the second light entrance surface 16bB is an upper long-side edge surface 16E2 of the light guide plate in the vertical direction. Hereinafter, the LEDs 17 arranged on the lower side of FIG. 10 are referred to as the first LEDs and the light entrance surface 16b arranged on the lower side in FIG. 10 is referred to as the first light entrance surface, and "A" is added to the respective reference numerals and symbols. The LEDs 17 arranged on the upper side in FIG. 10 are referred to as the second LEDs and the light entrance surface 16b arranged on the upper side in FIG. 10 is referred to as the second light entrance surface, and "B" is added to the respective reference numerals and symbols. No additional character is added to the reference numerals and symbols when the LEDs 17 or the light entrance surface 16b is generally referred to. FIG. 10 generally illustrates a plan-view arrangement configuration of the LEDs 17, the light guide plate 16, and the positioning portions 34 and a dot pattern of the light reflection portion 22.

Figure 13:
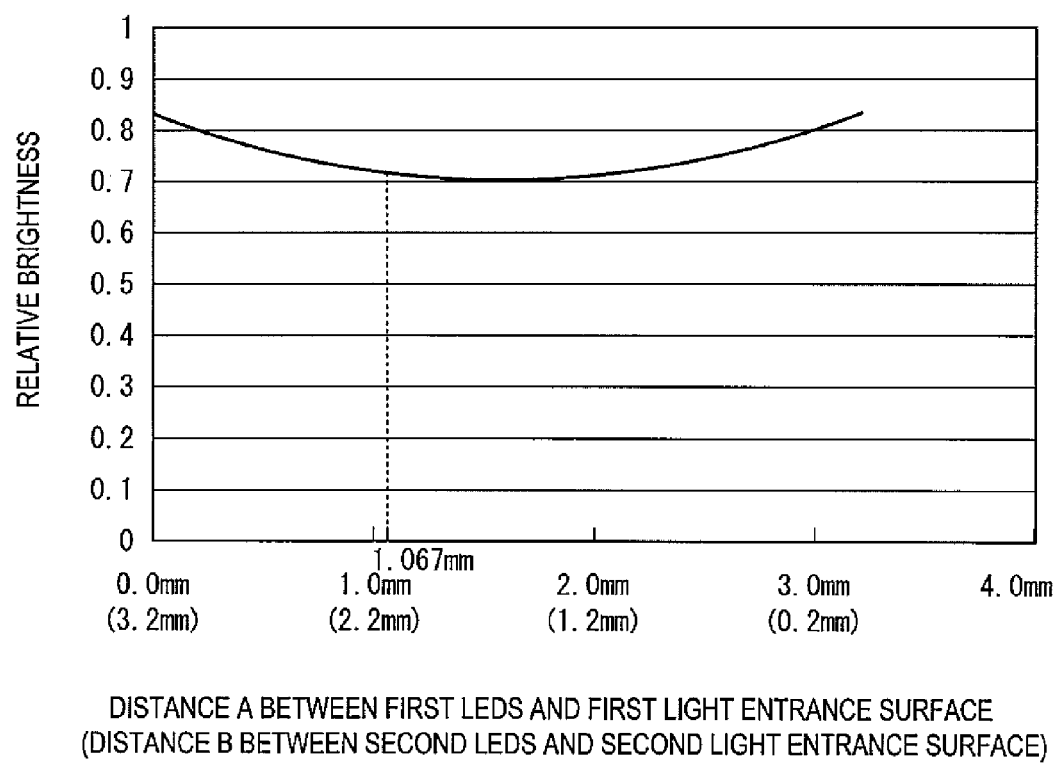
FIG. 13 is a graph illustrating a relationship between the relative brightness and a distance A between a first LED and a first light entrance surface (a distance B between a second LED and a second light entrance surface).

With the above positional relation between the LEDs 17A, 17B and the light entrance surfaces 15bA, 16bB, the light entrance efficiency of light emitted from the first LED 17A and entering the light guide plate 16 through the first light entrance surface 16bA becomes relatively high and the light entrance efficiency of light emitted from the second LED 17B and entering the light guide plate 16 through the second light entrance surface 16bB becomes relatively low. However, the light entrance efficiency is unlikely to be decreased according to the increase of the distance and therefore, the light entrance efficiency stops decreasing from a certain value. Hereinafter, the relation between the respective distances A, B and the respective light entrance surfaces 16bA, 16bB and the brightness of light exiting the light guide plate 16 will be described with reference to FIG. 13. In FIG. 13, a lateral axis represents the distance A between the first LEDs 17A and the first light entrance surface 16bA of the light guide plate 16 (the distance B between the second LEDs 17B and the second light entrance surface 16bB of the light guide plate 16) and a vertical axis represents relative brightness of light exiting the light guide plate 16 through the light exit surface 16a. Herein, the relative brightness represents a relative brightness value regarding a total flux of rays of emission light from the first LED 17A and the second LED 17B as a reference value. In FIG. 13, a total value of the distance A and the distance B is 3.2 mm. Therefore, the distance A is equal to a value obtained by subtracting the distance B from 3.2 mm and the distance B is equal to a value obtained by subtracting the distance A from 3.2 mm. According to the graph in FIG. 13, when both of the distance A and the distance B are same and approximately 1.6 mm, the relative brightness is lowest and the relative brightness tends to increase as difference between the distance A and the distance B increases. If the distance A is equal to the distance B, the light entrance efficiency of light emitted from each LED 17 and entering the light guide plate 16 through each light entrance surface 16b is low and the light use efficiency is low as a whole. The light entrance efficiency of light with the distance A being equal to the distance B is referred to as a reference value and with the above-described positional relation between the respective LEDs 17A, 17B and the respective light entrance surfaces 16bA, 16bB, a plus difference value between the reference value and the light entrance efficiency of light emitted from the first LED 17A and entering the light guide plate 16 through the first light entrance surface 16bA (the light entrance efficiency is higher than the reference value) is greater than a minus difference value between the reference value and the light entrance efficiency of light emitted from the second LED 17B and entering the light guide plate 16 through the second light entrance surface 16bB (the light entrance efficiency is lower than the reference value). Thus, with the arrangement configuration in which the distance A differs from the distance B, the light use efficiency as a whole is improved compared to the configuration in which the distance A is equal to the distance B.

According to the present invention, the LEDs 17A, 17B and the light guide plate 16 are arranged such that the distance A between the first LEDs 17A and the first light entrance surface 16bA is ⅓ of or less than the total of the distance A and the distance B (the maximum size increase amount of the light guide plate 16 in the vertical direction), for example, 1.067 mm or less. According to this configuration, as illustrated in FIG. 13, the distance A between the first LEDs 17A and the first light entrance surface 16bA of the light guide plate 16 is sufficiently small, and the light entrance efficiency of light emitted from the first LEDs 17A and entering the light guide plate 16 through the first light entrance surface 16bA is further improved. On the other hand, the light entrance efficiency of light emitted from the second LEDs 17B and entering the light guide plate 16 through the second light entrance surface 16bB already has a lowest value, and therefore the light entrance efficiency is less likely to be further decreased even if the distance B increases. Accordingly, the light use efficiency becomes high as a whole.

Further, according to the present embodiment, the liquid crystal display device 10 includes support members 28-30 that support the light guide plate 16 to maintain a positional relation between the light entrance surface 16bA of the light guide plate 16 and the LEDs 17A and a positional relation between the light entrance surface 16bB of the light guide plate 16 and the LEDs 17B. As illustrated in FIG. 8, the support members 28-30 include first support members 28, second support members 29 and horizontal side second support members 30. The first support members 28 are arranged on the same side as the first LEDs 17A are arranged with respect to the light guide plate 16 in a vertical direction. The second support members 29 are arranged on the same side as the second LEDs 17B are arranged with respect to the light guide plate 16 in the vertical direction to be spaced from the light guide plate 16. The horizontal side second support members 30 are arranged to be spaced from the light guide plate 16 with respect to a horizontal direction. The support members 28-30 are attached to the frame 13 that holds the light guide plate 16 and the liquid crystal panel 11 with the chassis 14 that is arranged on the rear side. Configurations of the respective support members 28-30 will be described in detail.

Figure 9:
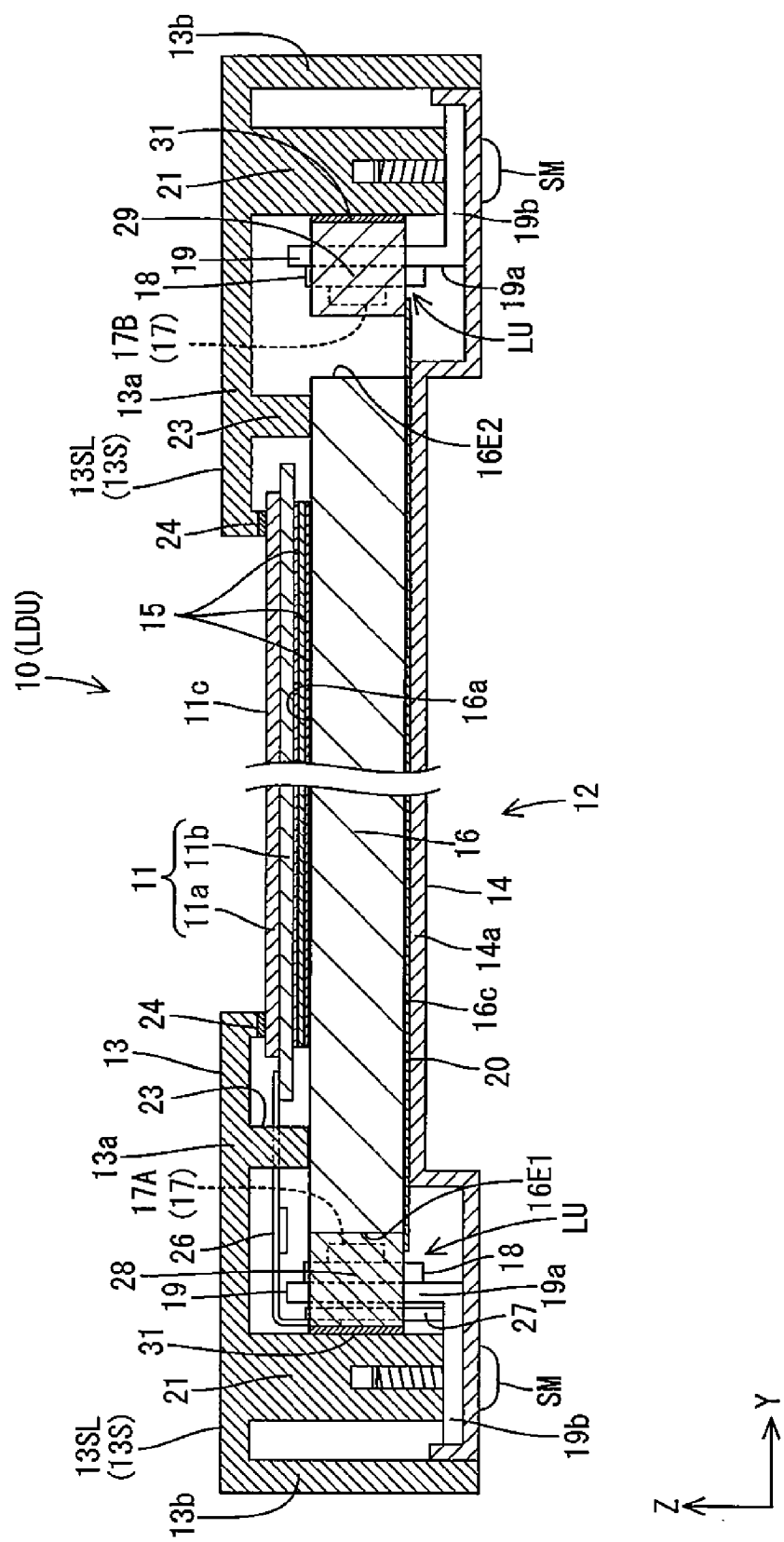
FIG. 9 is a cross-sectional view of FIG. 8 taken along ix-ix line.

As illustrated in FIGS. 8 and 9, the first support members 28 are arranged on the same side as the first LEDs 17A are arranged with respect to the light guide plate 16, namely, on a lower side in the vertical direction. The first support members 28 are attached to the ling-side screw mounting portion 21 that is located on a lower side with respect to the vertical direction. The screw mounting portion 21 is included in the frame 13. The first support members 28 are arranged between the screw mounting portion 21 and the light guide plate 16 with respect to the vertical direction. The first support members 28 are mounted on a side surface of the screw mounting portion 21 that faces upwardly (faces the light guide plate 16) with respect to the vertical direction with a fixing member 31 such as a double-sided adhesive tape or an adhesive. The first support member 28 is mounted on each of two end portions of the screw mounting portion 21, which are end portions with respect to the longitudinal direction (the horizontal direction). Namely, two first support members 28 are arranged to sandwich a group of the first LEDs 17A, which is arranged in a middle portion with respect to the horizontal direction. Each first support member 28 has a substantially horizontally long (elongated in the horizontal direction) block shape in a plan view. The first support members 28 are in contact with the long-side edge surface 16E1 of the light guide plate 16 that is opposed to the screw mounting portion 21. The long-side edge surface 16E1 is located on the lower side with respect to the vertical direction. Specifically, the two first support members 28 are in contact with two end portions of the long-side edge surface 16E1 of the light guide plate 16, respectively. The long-side edge surface 16E1 includes the two end portions with respect to the longitudinal direction (the horizontal direction) thereof. The long-side edge surface 16E1 of the light guide plate 16 has portions where the first support members 28 are in contact with. Such portions are non-illumination areas where light from the first LEDs 17A is less likely to reach and are located besides the first light entrance surface 16bA that is an illumination area. An area where the first support member 28 is provided substantially matches the non-illumination area with respect to the X-axis direction.

As illustrated in FIGS. 8 and 10, the first support members 28 are made of a material that has plasticity (a non-elastic material) and is harder than a material of the second support members 29, which will be described later. The first support members 28 are made of a material having plasticity such as metal or thermoplastic resins (hard resins). The metal includes iron (Fe) and aluminum (Al), for example. The thermoplastic resins include polyethylene terephthalate (PET) and polycarbonate (PC), for example. The light guide plate 16 is placed on the first support members 28 from the upper side with respect to the vertical direction. The lower long-side edge surface 16E1 of the light guide plate 16 with respect to the vertical direction is kept in close contact with the first support members 28 due to its own weight. Since the first support members 28 are made of the hard resin as described before, the first support members 28 are less likely to be deformed even if receiving the weight of the light guide plate 16. Accordingly, the positional relation with respect to the vertical direction between the lower long-side edge surface 16E1 of the light guide plate 16, that is the first light entrance surface 16bA, and the first LEDs 17A is kept stable and the positional relation is less likely to change. In other words, a distance between the first light entrance surface 16bA and the first LEDs 17A is always kept constant. Therefore, a quite small value that is close to zero can be set for the distance (an interval) between the first light entrance surface 16bA and the first LEDs 17A. Accordingly, light entrance efficiency of light emitted from the first LEDs 17A and being incident on the first light entrance surface 16bA becomes extremely high and such high light entrance efficiency is stably maintained without being varied according to each product.

As illustrated in FIGS. 8 and 9, the second support members 29 are arranged on the same side as the second LEDs 17B are arranged with respect to the light guide plate 16, namely, on an upper side in the vertical direction. The second support members 29 are attached to the long-side screw mounting portion 21 that is located on an upper side with respect to the vertical direction. The screw mounting portion 21 is included in the frame 13. The second support members 29 are arranged between the screw mounting portion 21 and the light guide plate 16 with respect to the vertical direction. The second support members 29 are mounted on a side surface of the screw mounting portion 21 that faces downwardly (faces the light guide plate 16) with respect to the vertical direction. The second support members 29 are integrally mounted on the side surface with the fixing member 31 such as a double-sided adhesive tape or an adhesive. The second support member 29 is mounted on each of two end portions of the screw mounting portion 21, which are end portions with respect to the longitudinal direction (the horizontal direction). Namely, two second support members 29 are arranged to sandwich a group of the second LEDs 17B, which is arranged in a middle portion with respect to the horizontal direction. Each second support member 29 has a substantially horizontally long (elongated in the horizontal direction) block shape in a plan view. The second support members 29 are arranged to have a predetermined distance from the long-side edge surface 16E2 of the light guide plate 16 that is opposed to the screw mounting portion 21. The long-side edge surface 16E2 is located on the upper side with respect to the vertical direction. Specifically, the two second support members 29 are arranged to be opposed to and spaced from two end portions of the long-side edge surface 16E2 of the light guide plate 16. The long-side edge surface 16E2 includes the two end portions with respect to the longitudinal direction thereof (the horizontal direction). The long-side edge surface 16E2 of the light guide plate 16 has portions where the respective second support members 29 are opposed to. Such portions are non-illumination areas where light from the second LEDs 17B is less likely to reach and are located besides the second light entrance surface 16bB that is an illumination area. An area where the second support member 29 is provided substantially matches the non-illumination area with respect to the X-axis direction.

As illustrated in FIGS. 8 and 10, the second support members 29 are made of an elastic material that is softer than the material of the first support members 28. The second support members 29 are made of rubber that is an elastic material, for example, natural rubber or synthetic rubber (such as butyl rubber, urethane rubber, silicon rubber). At normal temperature (for example, from 5° C. to 35° C.), the second support members 29 and the upper long-side edge surface 16E2 of the light guide plate 16 in the vertical direction have a certain distance therebetween to be maintained in a non-contact state. If the temperature increases from the normal temperature to 35° C. or higher, for example, the light guide plate 16 increases its size in a direction along its plate surface (in the X-axis direction and the Y-axis direction) according to the thermal expansion and moves relative to the frame 13, since the light guide plate 16 made of a synthetic resin has a rate of thermal expansion higher than the metal frame 13. The distance between the second support members 29 and the edge surface 16E2 of the light guide plate 16 is set to be substantially equal to a maximum expansion amount of the light guide plate 16 in the vertical direction. The maximum expansion amount is predicted according to the environment where the liquid crystal display device 10 is used and calculated based on the design dimension of the short side of the light guide plate 16. A positive dimension error may be caused in the mass-produced light guide plates 16 within a tolerance range, that is, the short-side dimension of the light guide plate 16 may become greater than the predetermined dimension. If the light guide plate 16 having such a dimension error expands to a maximum extent in the vertical direction according to the thermal expansion, the upper long-side edge surface 16E2 in the vertical direction moves to be closer to the second LEDs 17B from the state being in contact with the second support members 29. Even if the light guide plate 16 expands as is in the above, the second support members 29 that are made of the elastic material elastically deform and support the light guide plate 16 stably from the upper side in the vertical direction. Namely, even if a positive dimension error is caused in the light guide plate 16, the second support members 29 that are in contact with the edge surface 16E2 of the light guide plate 16 elastically deform to absorb an amount of the error. If the second support members are made of the same material as the first support members 28, the second support members are necessary to be arranged to have a sufficient great distance from the light guide plate 16 with considering the dimension error that may be caused in the light guide plate 16. Compared to such a configuration of the second support members, the second support members 29 are arranged much closer to the light guide plate 16. Accordingly, the thermally expanded light guide plate 16 is supported further stably.

As illustrated in FIGS. 5 and 8, the horizontal side second support members 30 are arranged to be spaced from the light guide plate 16 in the horizontal direction. The horizontal side second support members 30 are mounted on the two short-side screw mounting portions 21 that are located on a left side and a right side, respectively, with respect to the horizontal direction. The screw mounting portions 21 are included in the frame 13. The horizontal side second support members 30 are arranged between the respective screw mounting portions 21 and the light guide plate 16 with respect to the horizontal direction. The horizontal side second support members 30 are mounted on side surfaces of the respective screw mounting portions 21 facing inwardly (facing the light guide plate 16) with respect to the horizontal direction. The horizontal side second support members 30 are integrally mounted on the side surfaces with the fixing member 31 such as a double-sided adhesive tape or an adhesive. Two horizontal side second support members 30 are mounted on the respective two end portions of each screw mounting portion 21 and a total of four horizontal side second support members 30 are mounted in the device. Each screw mounting portion 21 includes the end portions with respect to the longitudinal direction (the vertical direction) thereof. Each horizontal side second support member 30 has a substantially vertically long (elongated in the vertical direction) block shape in a plan view. The horizontal side second support members 30 are arranged to be opposed to each of the short-side edge surfaces 16E3, 16E4 and to have a predetermined distance therebetween. The short-side edge surfaces 16E3, 16E4 are on a left side and a right side, respectively, in the horizontal direction. Specifically, the two horizontal side second support members 30 are arranged to be opposed to and spaced from the respective two end portions of each short-side edge surface 16E3, 163E4 of the light guide plate 16. Each short-side edge surface 16E3, 16E4 includes the end portions with respect to the longitudinal direction (the vertical direction) thereof.

As illustrated in FIGS. 8 and 10, the horizontal second support members 30 are made of an elastic material that is softer than the material of the first support members 28. The horizontal second support members 30 are made of the same material as that of the second support members 29. The common material is used for the horizontal side second support members 30 and the second support members 29, and this reduces a cost for the components. At a normal temperature, the horizontal side second support members 30 and the respective short-side edge surfaces 16E3, 16E4 of the light guide plate 16 have a certain distance therebetween so as to be maintained in a non-contact state. The distance between the horizontal side second support members 30 and the respective edge surfaces 16E3, 16E4 of the light guide plate 16 is set to be approximately a half of the maximum expansion amount of the light guide plate 16 in the horizontal direction. The maximum expansion amount is predicted according to the environment where the liquid crystal display device 10 is used. If a distance between the second support members 29 and the upper edge surface 16E2 of the light guide plate 16 in the vertical direction is set to "9 (a ratio of the short side dimension of the light guide plate 16)", a distance between the horizontal side second support members 30 and each of the edge surfaces 16E3, 16E4 is set to "8 (a half of a ratio of the long side dimension of the light guide plate 16)". The maximum expansion amount of the light guide plate 16 in the horizontal direction is calculated based on the design dimension of the long side of the light guide plate 16. A positive dimension error may be caused in the mass-produced light guide plates 16 within a tolerance range, that is, the long-side dimension of the light guide plate 16 may be greater than the predetermined dimension. If the light guide plate 16 having such a dimension error expands to a maximum extent in the horizontal direction according to the thermal expansion, the short-side edge surfaces 16E3, 16E4 further move outwardly in the horizontal direction from the state being in contact with the horizontal side second support members 30. Even if the light guide plate 16 expands as is in the above, the horizontal side second support members 30 that are made of the elastic material elastically deform and support the light guide plate 16 stably from the two sides in the horizontal direction. Namely, even if a positive dimension error is caused in the light guide plate 16, the horizontal side second support members 30 that are in contact with the edge surfaces 16E3, 16E4 of the light guide plate 16 elastically deform to absorb an amount of the error. If the horizontal side second support members are made of the same material as the first support members 28, the horizontal side second support members are necessary to be arranged to have a sufficient great distance from the light guide plate 16 with considering the dimension error that may be caused in the light guide plate 16. Compared to such a configuration of the horizontal side second support members, the horizontal side second support members 30 are arranged much closer to the light guide plate 16. Accordingly, the thermally expanded light guide plate 16 is supported further stably. Further, the horizontal side second support members 30 are made of the same material as the material of the second support members 29 and the elastic coefficient of the horizontal side second support members 30 and that of the second support members 29 are same. Therefore, it is easy to set a distance between the horizontal side second support members 30 and the light guide plate 16 and a distance between the second support members 29 and the light guide plate 16.

As is described before, according to the present embodiment, a distance A between the first LEDs 17A and the first light entrance surface 16bA differs from a distance B between the second LEDs 17B and the second light entrance surface 16bB. With this configuration, the amount of rays of light emitted from the first LEDs 17A and entering the light guide plate 16 through the first light entrance surface 16bA is relatively great and the amount of rays of light emitted from the second LEDs 17B and entering the light guide plate 16 through the second light entrance surface 16bB is relatively small. According to the present embodiment, as illustrated in FIG. 10, a light reflection portion 22 that accelerates exit of the light from the light guide plate 16 has an area distribution within a surface plane of a plate surface of the light guide plate 16 as follows. The area distribution of the light reflection portion 22 increases as is farther away from the respective first LEDs 17A and the second LEDs 17B and becomes maximum in a second LED 17B-side portion of the plate surface of the light guide plate 16. With such a distribution, within the plane of the plate surface of the light guide plate 16, the light entering through the first light entrance surface 16bA having a relatively great amount of incident light is less likely to be reflected by the light reflection portion 22 and the light entering through the second light entrance surface 16bB having a relatively small amount of incident light is likely to be reflected by the light reflection portion 22. Accordingly, the amount of light exiting the light guide plate 16 through the light exit surface 16a is averaged within the plane surface and unevenness of the brightness is less likely to occur. Specifically, the light reflection portion 22 includes dots 22a formed with ink and the dots 22a are dispersed in a plate surface 16c on an opposite side from the light exit surface 16a of the light guide plate 16 with a predetermined distribution. An area of each of the dots 22a is increased as is farther away from the first LEDs 17A and the second LEDs 17B and becomes maximum in a portion closer to the second LEDs 17B than the first LEDs 17A.

As is described before, according to the present embodiment, the backlight device (the lighting device) 12 includes the light guide plate 16, the first LEDs (a first light source) 17A, the second LEDs (a second light source) 17B, a first support member 28, and a second support member 29. The light guide plate 16 includes the light entrance surface 16b that is at least one of side surfaces thereof and the light exit surface 16a that is one of plate surfaces thereof. The first LEDs 17A are opposed to the first light entrance surface 16bA that is a first edge surface 16E1 of the light guide plate 16. The second LEDs 17B are opposed to the second light entrance surface 16bB that is a second edge surface 16E2. The second edge surface 16E2 is an opposite surface from the first edge surface 16E1 of the light guide plate 16. The second LEDs 17B are arranged such that the distance B between the second entrance surface 16bB and the second LEDs 17B is relatively greater than the distance A between the first LEDs 17A and the first light entrance surface 16bA. The first support member 28 is arranged on a side where the first LEDs 17A are arranged with respect to the light guide plate 16 and is in contact with the first edge surface 16E1 of the light guide plate 16 to support the light guide plate 16 from the first LED 17A side. The second support member 29 is arranged on a side where the second LEDs 17B are arranged with respect to the light guide plate 16 to be spaced from the light guide plate 16 and comes in contact with the second edge surface 16E2 if the light guide plate 16 thermally expands. According to the contact with the second edge surface 16E2, the second support member 29 supports the light guide plate 16 from a second LED 17B side. The second support member 29 is made of an elastic material that is softer than the material of the first support member 28.

According to such a configuration, the light emitted from the first LEDs 17A enters the light guide plate 16 through the first light entrance surface 16bA and the light emitted from the second LEDs 17B enters the light guide plate 16 through the second light entrance surface 16bB and then, the light entering the light guide plate 16 travels within the light guide plate 16 and exits the light guide plate 16 through the light exit surface 16a. The distance A between the first LEDs 17A and the first light entrance surface 16bA of the light guide plate 16 is relatively small and the distance B between the second LEDs 17B and the second light entrance surface 16bB of the light guide plate 16 is relatively great. Therefore, the light entrance efficiency of the light emitted from the first LEDs 17A and entering the light guide plate 16 through the first light entrance surface 16bA is relatively high and the light entrance efficiency of the light emitted from the second LEDs 17B and entering the light guide plate 16 through the second light entrance surface 16bB is relatively low. According to the inventor's studies, it is found that if the distance A, B between the respective LEDs 17A and 17B and the respective light entrance surfaces 16bA, 16bB becomes a certain value or more, the light entrance efficiency of light is less likely to be decreased even if the distance is increased and the light entrance efficiency does not change. Therefore, the light entrance efficiency of the light emitted from the second LEDs 17B and entering the light guide plate 16 through the second light entrance surface 16bB becomes lower than the light entrance efficiency of the light emitted from the first LEDs 17A and entering the light guide plate through the first light entrance surface 16bA. However, the light entrance efficiency of the light emitted from the second LEDs 17B and entering the light guide plate 16 through the second light entrance surface 16bB is not further decreased from the certain value because the light entrance efficiency of light is less likely to be decreased even with the increase of the distance. Therefore, the light entrance efficiency is not decreased from a certain value. The light entrance efficiency of light with the distance between the LEDs 17A and the light entrance surface 16bA being equal to the distance between the LEDs 17B and the light entrance surface 16bB is referred to as a reference value. A plus difference value between the reference value and the light entrance efficiency of light emitted from the first LED 17A and entering the light guide plate 16 through the first light entrance surface 16bA (the light entrance efficiency is higher than the reference value) is greater than a minus difference value between the reference value and the light entrance efficiency of light emitted from the second LED 17B and entering the light guide plate 16 through the second light entrance surface 16bB (the light entrance efficiency is lower than the reference value). Thus, the light use efficiency as a whole is improved compared to the light use efficiency in the configuration in which the distances between the respective LEDs 17A, 17B and the respective light entrance surfaces 16bA, 16bB are equal to each other.

The first support members 28 arranged on the same side as the first LEDs 17A are in contact with the first edge surface 16E1 so as to support the light guide plate 16 from the first LED 17A side. The first support members 28 that are made of a material harder than the material of the second support members 29 stably support the light guide plate 16 and a support position of the light guide plate 16 is less likely to be changed. Accordingly, the positional relation between the first LEDs 17A and the first light entrance surface 16bA is maintained stably and the distance A between the first LEDs 17A and the first light entrance surface 16bA is set to be smallest. Therefore, the light entrance efficiency of light emitted from the first LED 17A and entering the light guide plate 16 through the first light entrance surface 16bA is greatly improved.

The second support members 29 are arranged on the same side as the second LEDs 17B and spaced from the light guide plate 16. However, the second support members 29 come in contact with the second edge surface 16E2 if the light guide plate 16 thermally expands, and the light guide plate 16 is supported from the second LEDs 17B side. The second support members 29 are made of an elastic material that is softer than the material of the first support members 28. Therefore, compared to a configuration including the second support members made of a material having same hardness as the material of the first support members 28, the distance between the second support members and the second edge surface 16E2 of the light guide plate 16 can be decreased. If the second support members are made of a material having same hardness as the material of the first support members 28, the second support members are necessary to be arranged to have a sufficient distance including an extra space from the second edge surface 16E2 of the light guide plate 16 with considering the dimension error that may be caused in the light guide plate 16. The second support members 29 made of the elastic material that is softer than the material of the first support members 28 elastically deform when the second edge surface 16E2 of the light guide plate 16 that thermally expands comes in contact with the second support members 29. Therefore, even if the light guide plate 16 is greater in size than a standard size due to the dimension error, the error amount can be absorbed by the elastic deformation. Accordingly, the second support members 29 are arranged much closer to the light guide plate 16 and the thermally expanded light guide plate 16 is supported further stably.

The first LEDs 17A, the light guide plate 16, and the second LEDs 17B are arranged in the vertical direction. The first LEDs 17A and the first support members 28 are arranged on the lower side in the vertical direction with respect to the light guide plate 16. The second LEDs 17B and the second support members 29 are arranged on the upper side in the vertical direction with respect to the light guide plate 16. According to such a configuration, the light guide plate 16 is supported from the lower side in the vertical direction by the first support members 28 having hardness greater than the second support members 29. Therefore, the first edge surface 16E1 of the light guide plate 16 is kept in closely contact with the first support members 28 due to the weight of the light guide plate 16. Accordingly, the positional relation between the first LEDs 17A and the first light entrance surface 16bA is maintained more stable. Thus, the light guide plate 16 is positioned precisely in the vertical direction by the first support members 28. Therefore, the second support members 29 arranged on the upper side in the vertical direction with respect to the light guide plate 16 are arranged much closer to the light guide plate 16. Accordingly, the thermally expanded light guide plate 16 is stably supported.

The horizontal side second support members 30 are arranged to be spaced from the light guide plate 16 in the horizontal direction that is perpendicular to the vertical direction. The horizontal side second support members 30 become in contact with the edge surfaces 16E3, 16E4 that are adjacent to the first edge surface 16E1 and the second edge surface 16E2 of the light guide plate 16 when the light guide plate 16 thermally expands in the horizontal direction. Accordingly, the horizontal side second support members 30 support the light guide plate 16 from an outer side with respect to the horizontal direction. The horizontal side second support members 30 are made of an elastic material that is softer than the material of the first support members 28. According to such a configuration, the light guide plate 16 is supported by the horizontal side second support members 30 from the outer side with respect to the horizontal direction when the light guide plate 16 increases its size in the vertical direction and the horizontal direction according to the thermal expansion thereof. The horizontal side second support members 30 are made of the elastic material that is softer than the material of the first support members 28. Therefore, the distance between the horizontal side second support members 30 and each of the edge surfaces 16E3, 16E4 of the light guide plate 16 is set to be smaller compared to the configuration including the horizontal side second support members made of a material having hardness same as that of the first support members 28. According to such a configuration, the horizontal side second support members 30 are arranged close to the light guide plate 16 and the thermally expanded light guide plate 16 is supported more stably.

The second support members 29 and the horizontal side second support members 30 are made of the same elastic material. Accordingly, a material cost for the second support members 29 and the horizontal side second support members 30 is reduced. The elastic coefficient of the second support members 29 and that of the horizontal side second support members 30 are same. Therefore, a distance between the second support members 29 and the corresponding edge surface of the light guide plate 16 and a distance between the horizontal side second support members 30 and the corresponding edge surface of the light guide plate 16 are easily set.

The first support members 28 are made of a material having plasticity. Accordingly, the light guide plate 16 is supported by the first support members 28 made of the material having plasticity more stably compared to the configuration including the first support members made of an elastic material. Therefore, variations in support position of the light guide plate 16 are less likely to be caused.

The first support members 28 are made of the material having plasticity such as metal or thermoplastic resin and the second support members 29 are made of rubber. According to such a configuration, the first support members 29 made of the metal or the thermoplastic resin support the light guide plate 16 more stably. The second support members 29 that are made of the rubber become in contact with the second edge surface 16E2 of the light guide plate 16 and elastically deform if the light guide plate 16 thermally expands. Accordingly, even if a size of the light guide plate 16 becomes greater than a normal size thereof due to the dimension errors, the dimension errors are effectively absorbed by the elastic deformation.

The light guide plate 16 includes the first edge surface 16E1 that is the first light entrance surface 16bA and the second light edge surface 16E2 that is the second light entrance surface 16bB, and each of the first edge surface 16E1 and the second edge surface 16E2 extends linearly along an entire length of the light guide plate 16. The light guide plate may be processed to have a step between the first light entrance surface 16bA and a portion of the first edge surface that is in contact with the first support members 28 or between the second light entrance surface 16bB and the second edge surface that is in contact with the second support members 29. However, in such a configuration, the light guide plate is necessary to be processed to have the above configuration. In the configuration of the present embodiment, the above processing is not necessary for the light guide plate and therefore, the size precision of the first edge surface 16E1 and the second edge surface 16E2 of the light guide plate 16 is improved. The first light entrance surface 16bA of the light guide plate 16 is positioned with high precision relative to the first LEDs 17A by the contact between the first support members 28 and the first edge surface 16E1 of the light guide plate 16. Further, the second support members 29 are arranged much closer to the second edge surface 16E2 of the light guide plate 16 and therefore, the thermally expanded light guide plate 16 is supported more stably.

The first support member 28 and the second support member 29 are arranged at edge positions of the light guide plate 16, respectively, to form a pair. Accordingly, the light guide plate 16 is supported more stably at its edge positions by the first support members 28 and the second support members 29.

The first LEDs 17A and the second LEDs 17B are same type of LEDs. Accordingly, a manufacturing cost for the first LEDs 17A and the second LEDs 17B is reduced and a cost for parts control is also reduced.

The first LEDs 17A and the second LEDs 17B represent a lambertian light intensity distribution. The light intensity distribution of light from the first LEDs 17A and the second LEDs 17B represents the lambertian light intensity distribution. In such a light intensity distribution, the rays of light traveling along the optical axis have a peak light intensity and the light emission intensity tends to decrease with a curved line in the graph as the angle with respect to the optical axis increases. In the lambertian light intensity distribution, the light entrance efficiency of light emitted from the respective LEDs 17A, 17B and being incident on the respective light entrance surface 16bA, 16bB is improved as the distance between the respective LEDs 17A, 17B and the respective light entrance surface 16bA, 16bB of the light guide plate 16 is decreased, and the light entrance efficiency is decreased as the distance is increased. However, if the distance is greater than a certain value, the lowering rate of the light entrance efficiency becomes less likely to be decreased and does not change from a certain value. The distance A between the first light entrance surface 16bA and the first LEDs 17A representing the lambertian light intensity distribution is relatively decreased to improve the light entrance efficiency, and the distance B between the second light entrance surface 16bB and the second LEDs 17B representing the lambertian light intensity distribution is relatively increased to keep the light entrance efficiency to be the lowest certain value with allowing the size increase of the light guide plate 16. Accordingly, the whole light use efficiency is improved.

The first light source corresponds to the LEDs 17A mounted on the LED board (board) 18 and the second light source corresponds to the LEDs 17B mounted on the LED board (board) 18. The LEDs 17 generally represent a lambertian light intensity distribution. In such a light intensity distribution, the rays of light traveling along the optical axis have a peak light intensity and the light emission intensity tends to decrease with a curved line in the graph as the angle with respect to the optical axis increases. In the lambertian light intensity distribution, the light entrance efficiency of light emitted from the LEDs including the LEDs 17A, 17B and being incident on the respective light entrance surface 16bA, 16bB is improved as the distance between the LEDs including the LEDs 17A, 17B and the respective light entrance surface 16bA, 16bB is decreased, and the light entrance efficiency is decreased as the distance is increased. However, if the distance is greater than a certain value, the lowering rate of the light entrance efficiency is less likely to be decreased and does not change from a certain value. The distance A between the first light entrance surface 16bA and the LEDs including the first LEDs 17A representing the lambertian light intensity distribution is relatively decreased to improve the light entrance efficiency, and the distance B between the second light entrance surface 16bB and the LEDs including the second LEDs 17B representing the lambertian light intensity distribution is relatively increased to keep the light entrance efficiency to be the lowest certain value with allowing the size increase of the light guide plate 16. Accordingly, the whole light use efficiency is improved.

Second Embodiment

A second embodiment of this invention will be described with reference to FIG. 14 or FIG. 15. In the second embodiment, a reflection sheet 32 is further included. Configurations, functions, and effects similar to those in the first embodiment will not be described.

Figure 14:
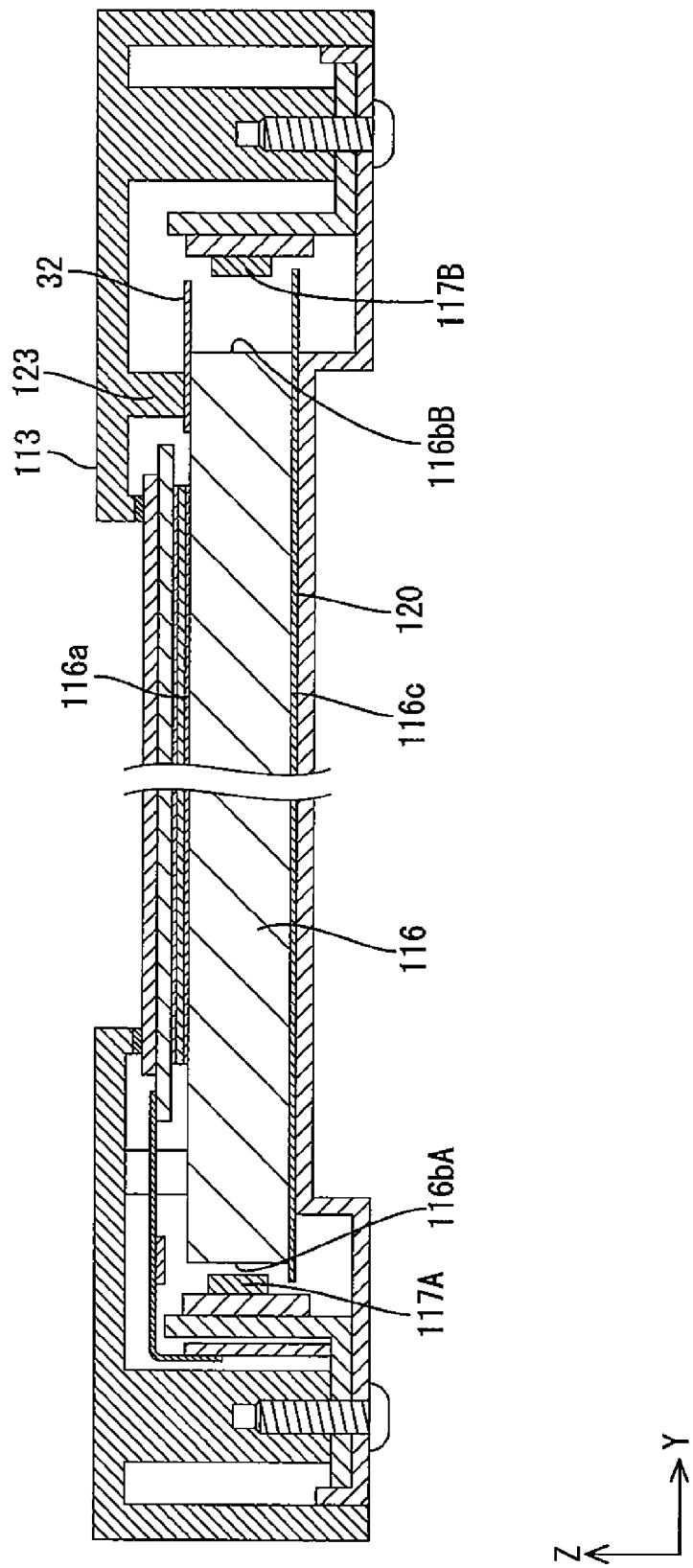
FIG. 14 is a cross-sectional view illustrating a cross-sectional configuration of the liquid crystal display device according to a second embodiment of the present invention taken in the short-side direction.
Figure 15:
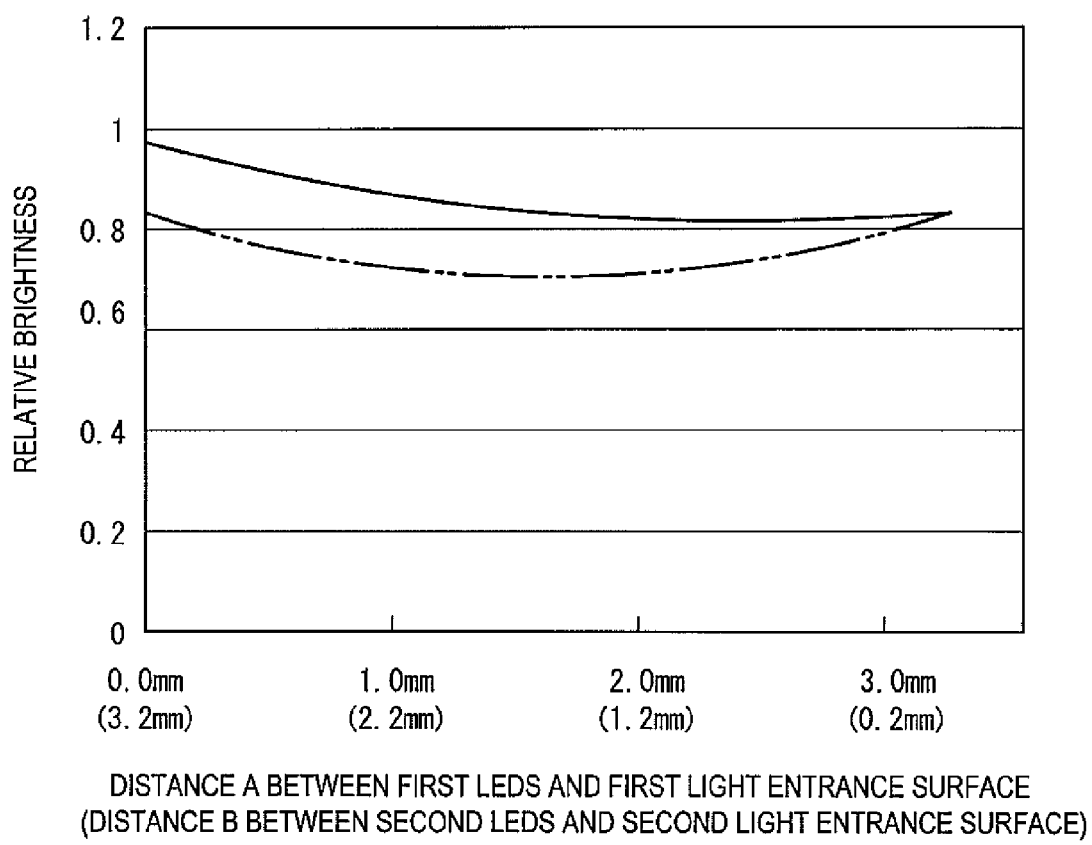
FIG. 15 is a graph illustrating a relationship between the relative brightness and the distance A between the first LED and the first light entrance surface (the distance B between the second LED and the second light entrance surface).

As illustrated in FIG. 14, a reflection sheet 32 is arranged between an edge portion of a light guide plate 116 having a second light entrance surface 116bB and a light guide plate support portion 123 of a frame 113. The reflection sheet 32 covers the edge portion of the light guide plate 116 having the second light entrance surface 116bB and extends further from the second light entrance surface 116bB toward second LEDs 117B to form an extended portion. The extended portion of the reflection sheet 32 defines and covers a space between the second light entrance surface 116bB and the second LEDs 117B from a front-side area. Alight guide reflection sheet 120 is arranged along a rear-side plate surface 116c of the light guide plate 116 and extends further from the second light entrance surface 116bB toward the second LEDs 117 and an extended portion are opposed to the reflection sheet 32. Namely, the reflection sheet 32 and the light guide reflection sheet 120 sandwich a space provided between the second light entrance surface 116bB and the second LEDs 117B. Accordingly, light from the second LEDs 117B reflects off the reflection sheets 32, 120 repeatedly and travels within the space between the second LEDs 117B and the second light entrance surface 116bB and enters the light guide plate 116 through the second light entrance surface 116bB. Therefore, the light is less likely to leak outside the space. Accordingly, the light entrance efficiency of light from the second LEDs 117B and being incident on the second light entrance surface 116bB is improved. No such a reflection sheet 32 is arranged between an edge portion of the light guide plate 116 having a first light entrance surface 116bA and the light guide plate support member 123 of the frame 113.

Relation between brightness of light exiting the light guide plate 116 and each of the distance A and the distance B will be described with reference to FIG. 15. The distance A is between the LEDs 117A and the light entrance surface 116bA and the distance B is between the LEDs 117B and the light entrance surface 116bB. In FIG. 15, a lateral axis represents the distance A between the first LEDs 117A and the first light entrance surface 116bA of the light guide plate 116 (the distance B between the second LEDs 117B and the second light entrance surface 116bB of the light guide plate 116), and a vertical axis represents relative brightness of light exiting the light guide plate 116 through the light exit surface 116a. The relative brightness refers to a relative brightness value regarding total flux of light emitted from each of the first LED 117A and the second LED 117B as a reference value. In FIG. 15, a graph of a solid line represents relation in the configuration according to the present embodiment (including the reflection sheet 32), and a graph of a two-dot chain line represents relation in the configuration according to the first embodiment (without including the reflection sheet 32). Provided with the second reflection sheet 32 as is in the present embodiment, the whole light use efficiency is improved as the distance A between the first LEDs 117A and the first light entrance surface 116bA is decreased and the distance B between the second LEDs 117B and the second light entrance surface 116bB is increased. The whole light use efficiency is thus improved because improvement effects in the light entrance efficiency obtained by using the reflection sheet 32 becomes remarkable as the distance B between the second LEDs 117B and the second light entrance surface 116bB is increased. In such a configuration, the distances A, B are set to have the relation described in the first embodiment and the whole light use efficiency is highly improved.

Third Embodiment

A third embodiment of this invention will be described with reference to FIG. 16. In the third embodiment, LEDs 217 are arranged to be opposed to four sides of a light guide plate 216. Configurations, functions, and effects similar to those in the first embodiment will not be described.

Figure 16:
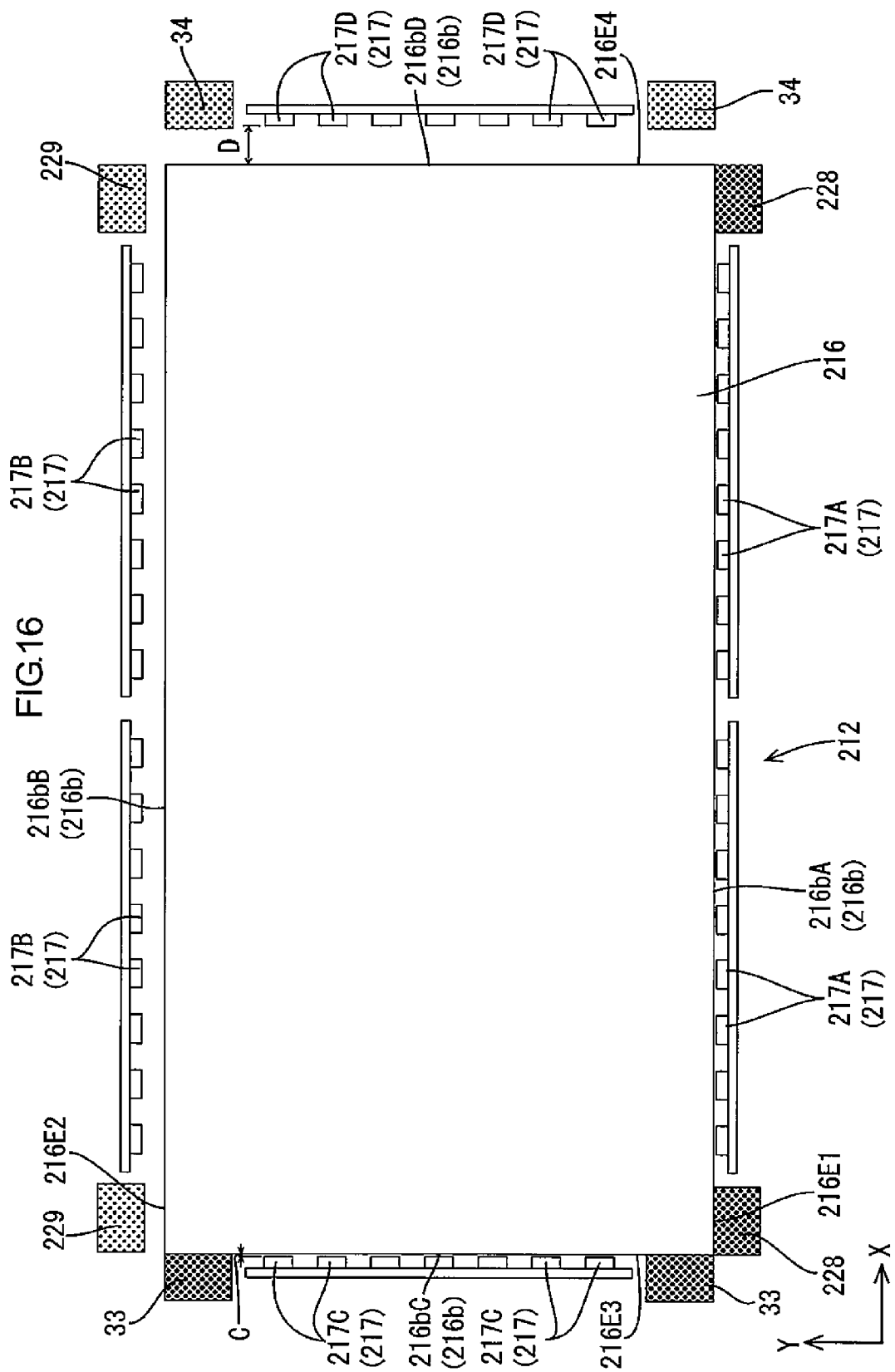
FIG. 16 is a plan view illustrating a general arrangement configuration of LEDs, a light guide plate, and support members according to a third embodiment of the present invention.

According to the present embodiment, as illustrated in FIG. 16, the LEDs 217 are arranged to be opposed to each of four edge surfaces 216E1 to 216E4 included in the light guide plate 216 having a plan view rectangular shape. Specifically, long-side edge surfaces 216E1, 216E2 of the light guide plate 216 are a first light entrance surface 216bA and a second light entrance surface 216bB, respectively. First LEDs 217A and second LEDs 217B are arranged to be opposed to the first light entrance surface 216bA and the second light entrance surface 216bB, respectively. Short-side edge surfaces 216E3, 216E4 of the light guide plate 216 are a third light entrance surface 216bC and a fourth light entrance surface 216bD, respectively. Third LEDs 217C and fourth LEDs 217D are arranged to be opposed to the third light entrance surface 216bC and the fourth light entrance surface 216bD, respectively. The third LEDs 217C are arranged on a left side with respect to the light guide plate 216 in the horizontal direction in FIG. 16. The third light entrance surface 216bC is a left short-side edge surface (a third edge surface) 216E3 of the light guide plate 216 in the horizontal direction in FIG. 16. The fourth LEDs 217D are arranged on a right side with respect to the light guide plate 216 in the horizontal direction in FIG. 16. The fourth light entrance surface 216bD is a right short-side edge surface (a fourth edge surface) 216E4 of the light guide plate 216 in the horizontal direction in FIG. 16. Hereinafter, the left-side LEDs 217 in FIG. 16 are referred to as the third LEDs and the left-side light entrance surface 216b of the light guide plate 216 in FIG. 16 is referred to as the third light entrance surface, and a character C is added to each of the reference numerals. The right-side LEDs 217 in FIG. 16 are referred to as the fourth LEDs and the right-side light entrance surface 216b of the light guide plate 216 in FIG. 16 is referred to as the fourth light entrance surface, and a character D is added to each of the reference numerals. The LEDs 217 and the light entrance surfaces 216b are generally referred to without any additional character.

According to this embodiment, the third LEDs 217C are arranged to have a relatively small distance C from the third light entrance surface 216bC and the fourth LEDs 217D are arranged to have a relatively great distance D from the fourth light entrance surface 216bD. A total of the distance C and the distance D is substantially equal to a maximum size increase amount of the light guide plate 216 that increases its size in the horizontal direction (in a direction in which the third LEDs 217C, the fourth LEDs 217D and the light guide plate 216 are arranged) according to the thermal expansion of the light guide plate 216. Accordingly, light entrance efficiency of light emitted from the third LEDs 217C and entering the light guide plate 216 through the third light entrance surface 216bC is relatively increased and light entrance efficiency of light emitted from the fourth LEDs 217D and entering the light guide plate 216 through the fourth light entrance surface 216bD is relatively decreased. However, the light entrance efficiency is less likely to be decreased according to the increase of the distance, and therefore, the light entrance efficiency does not decrease from a certain value. If the light entrance efficiency in case of that the distance C is equal to the distance D is regarded as a reference value, the light entrance efficiency of light from the third LEDs 217C and being incident on the third light entrance surface 216bC is higher than the reference value and the light entrance efficiency of light from the fourth LEDs 217D and being incident on the fourth light entrance surface 216bD is lower than the reference value. A difference value between the reference value and the light efficiency of light from the third LEDs 217C and being incident on the third light entrance surface 216bC is greater than a difference value between the reference value and the light efficiency of light from the fourth LEDs 217D and being incident on the fourth light entrance surface 216D. Accordingly, in the configuration having the distance C different from the distance D, the whole light use efficiency is improved compared to the configuration having the distance C equal to the distance D.

According to the present embodiment, third support members 33 are arranged on the same side as the third LEDs 217C in the horizontal direction with respect to the light guide plate 216 and fourth support members 34 are arranged on the same side as the fourth LEDs 217D in the horizontal direction with respect to the light guide plate 216 so as to have a distance from the light guide plate 216. According to such a configuration, the light guide plate 216 is supported in the horizontal direction. As illustrated in FIG. 16, the third support members 22 are arranged on the same side as the third LEDs 217C with respect to the light guide plate 216, that is, on the left side in the horizontal direction in FIG. 16. The third support members 33 are mounted on a short-side screw mount portion included in a frame, which is not illustrated. The short-side screw mount portion is arranged on a left side in the horizontal direction in FIG. 16. The third support members 33 are arranged between the screw mount portion and the light guide plate 216 in the horizontal direction. The third support members 33 are integrally mounted on a right side surface (facing the light guide plate 216) of the screw mount portion in the horizontal direction in FIG. 16 by a fixing member such as a double-sided tape and adhesive. The two third support members 33 are mounted on two end portions of the screw mount portion in its longitudinal direction (the vertical direction), respectively. Namely, the two third support members 33 sandwich a group of the third LEDs 217C arranged in a middle portion in the vertical direction therebetween. Each of the third support members 33 has a substantially elongated block shape (elongated in the vertical direction) in a plan view. The third support members 33 are in contact with the left short-side edge surface 216E3 of the light guide plate 216 in the horizontal direction. Specifically, the two third support members 33 are in contact with two end portions of the short-side edge surface 216E3 of the light guide plate in the longitudinal direction (the vertical direction), respectively. Portions of the short-side edge surface 216E3 of the light guide plate 216 in contact with the respective third support members 33 are non-illumination areas that are less likely to be illuminated with light from the third LEDs 217C and differ from the third light entrance surface 216bC that is an illumination area. A dimension of the third support member 33 in the X-axis direction substantially matches a range of the non-illumination area.

The third support members 33 are made of a material having plasticity (non-elastic material) that is harder than a material of the fourth support members 34, which will be described next. The third support members 33 are made of a material same as that of first support members 228. The third support members 33 are in contact with the edge surface 216E3 of the light guide plate 216 on their right side in the horizontal direction in FIG. 16. The third support members 33 are made of the hard material having plasticity as described before. Therefore, the third support members 33 are less likely to be deformed even if receiving stress from the light guide plate 216 side. Accordingly, the position of the third light entrance surface 216bC relative to the third LEDs 217C in the horizontal direction is kept stable and the positional relation is less likely to be changed. The third light entrance surface 236bC is the left short-side edge surface 216E3 of the light guide plate 216 in the horizontal direction in FIG. 16. Namely, the distance between the third light entrance surface 216bC and the third LEDs 217C is always kept constant. Therefore, the distance between the third light entrance surface 216bC and the third LEDs 217C is set to a quite small value close to zero. Accordingly, the light entrance efficiency of light emitted from the third LEDs 217C and being incident on the third light entrance surface 216bC is highly improved and the high light entrance efficiency is maintained stable without depending on each product.

The fourth support members 34 are arranged on the same side as the fourth LEDs 217D in the horizontal direction with respect to the light guide plate 216, that is, on the right side in the horizontal direction in FIG. 16. The fourth support members 34 are integrally mounted on a left side surface (facing the light guide plate 216) of the screw mount portion in the horizontal direction in FIG. 16 by a fixing member such as a double-sided tape and adhesive. Two fourth support members 34 are mounted on two end portions of the screw mount portion in its longitudinal direction (the vertical direction), respectively. Namely, the two fourth support members 34 sandwich a group of the fourth LEDs 217D arranged in a middle portion in the vertical direction therebetween. Each of the fourth support members 34 has a substantially elongated block shape (elongated in the vertical direction) in a plan view. The third support members 34 are arranged to have a certain distance from the right short-side edge surface 216E4 of the light guide plate 216 in the horizontal direction in FIG. 16. Specifically, the two fourth support members 34 are opposed to the two end portions of the short-side edge surface 216E4 of the light guide plate 216 in the longitudinal direction (the vertical direction), respectively, to have the certain distance therebetween. Portions of the short-side edge surface 216E4 of the light guide plate 216 opposed to the respective fourth support members 34 are non-illumination areas that are less likely to be illuminated with light from the fourth LEDs 217D and differ from the fourth light entrance surface 216bD that is an illumination area. A dimension of the fourth support member 34 in the X-axis direction substantially matches a range of the non-illumination area.

The fourth support members 34 are made of an elastic material that is softer than the material of the third support members 33. The fourth support members 34 are made of a material same as that of the second support members 229. At normal temperature (for example, from 5° C. to 35° C.), the fourth support members 34 and the right short-side edge surface 216E4 of the light guide plate 216 in the vertical direction in FIG. 16 have a certain distance therebetween so as to be maintained in a non-contact state. If the temperature increases from the normal temperature to a high temperature (such as 35° C. or higher), for example, the light guide plate 216 increases its size in a direction along its plate surface (along the X-Y axis plane) according to the thermal expansion and moves relative to the frame, since the light guide plate 216 made of a synthetic resin has a thermal expansion rate higher than the metal frame. The distance between the fourth support members 34 and the edge surface 216E4 of the light guide plate 216 is set to be substantially equal to a maximum expansion amount of the light guide plate 216 in the horizontal direction. The maximum expansion amount in the horizontal direction is calculated based on the design dimension of the long side of the light guide plate 216. A dimension error may be caused in the mass-produced light guide plates 216 within a tolerance range, that is, the long-side dimension of the light guide plate 216 may become greater than the predetermined dimension. If the light guide plate 216 having such a dimension error expands to a maximum extent in the horizontal direction according to the thermal expansion, the right short-side edge surface 216E4 in the horizontal direction moves to be closer to the fourth LEDs 217D from the state being in contact with the fourth support members 34. Even if the light guide plate 216 further expands as is in the above, the fourth support members 34 that are made of the elastic material elastically deform and support the light guide plate 216 stably from the right side in the horizontal direction in FIG. 16. Namely, even if a positive dimension error is caused in the light guide plate 216, the fourth support members 34 that are in contact with the edge surface 216E4 of the light guide plate 216 elastically deform to absorb an amount of the error. If the fourth support members are made of the same material as the third support members 33, the fourth support members are necessary to be arranged to have a sufficient great distance from the light guide plate 216 with considering the dimension error that may be caused in the light guide plate 216. Compared to such a configuration of the fourth support members, the fourth support members 34 are arranged much closer to the light guide plate 216. Accordingly, the thermally expanded light guide plate 216 is supported further stably. The fourth support members 34 according to the present embodiment have substantially similar functions as those of the horizontal side second support members 30 according to the first embodiment.

As described before, according to the present embodiment, the light guide plate 216 has a rectangular shape and has the first edge surface 216E1, the second edge surface 216E2, and the third edge surface 216E3 that is adjacent to the first edge surface 216E1 and the second edge surface 216E2. The third edge surface 216E3 is the third light entrance surface 216bC and the third LEDs (third light source) 217C are arranged to be opposed to the third light entrance surface 216bC. The light guide plate 216 has the fourth edge surface 216E4 that is opposite to the third edge surface 216E3 and the fourth edge surface 216E4 is the fourth light entrance surface 216bD. The fourth LEDs (fourth light source) 217D are arranged to be opposed to the fourth light entrance surface 216bD and a distance D between the fourth LEDs 217D and the fourth light entrance surface 216bD is relatively greater than a distance C between the third LEDs 217C and the third light entrance surface 216bC. The third support members 33 are arranged on a same side as the third LEDs 217C with respect to the light guide plate 216. The third support members 33 are in contact with the third edge surface 216E3 of the light guide plate 216 so as to support the light guide plate 216 from the third LEDs 217C side. The fourth support members 34 are arranged on a same side as the fourth LEDs 217D with respect to the light guide plate 216 to have a distance from the light guide plate 216. The fourth support members 34 are in contact with the fourth edge surface 216E4 to support the light guide plate 216 from the fourth LEDs 217D side when the light guide plate 216 thermally expands. The fourth support members 34 are made of an elastic material that is softer than the material of the third support members 33. According to such a configuration, the edge surfaces 216E1 to 216E4 included in the rectangular light guide plate 216 are the first light entrance surface 216bA, the second light entrance surface 216bB, the third light entrance surface 216bC, and the fourth light entrance surface 216bD, respectively. Light from the first LEDs 217A, the second LEDs 217B, the third LEDs 217C, and the fourth LEDs 217D is incident on the first light entrance surface 216bA, the second light entrance surface 216bB, the third light entrance surface 216bC, and the fourth light entrance surface 216bD, respectively. Accordingly, the amount of light entering the light guide plate 216 is sufficiently obtained and such a configuration is effective for increase in size of the backlight unit 212. The distance C between the third LEDs 217C and the third light entrance surface 216bC is relatively decreased so that the light entrance efficiency of light from the third LEDs 217C is increased. The distance D between the fourth LEDs 217D and the fourth light entrance surface 216bD is relatively increased and the light entrance efficiency of light from the fourth LEDs 217D is not decreased from the lowest value. Accordingly, the whole light use efficiency is further improved.

The third support members 33 that support the light guide plate 216 from the third LED 217C side are made of a material harder than that of the fourth support members 34. Therefore, the first support members 228 and the third support members 33 stably support the light guide plate 216 and variations in the support position of the light guide plate 216 are less likely to occur. Accordingly, the position of the third light entrance surface 216bC relative to the third LEDs 217C is stably maintained and therefore, the distance C between the third LEDs 217C and the third light entrance surface 216bC is set to be shortest as possible. Therefore, the light entrance efficiency of light emitted from the third LEDs 217C and being incident on the third light entrance surface 216bC is highly improved. Further, the fourth support members 34 that support the thermally expanded light guide plate 216 from the fourth LEDs 217D side are made of the elastic material softer than the material of the third support members 33. Therefore, the distance between the fourth support members 34 and the fourth edge surface 216E4 of the light guide plate 216 is decreased compared to the configuration in which the fourth support members are made of a material having same hardness as the material of the third support members 33. Accordingly, the fourth support members 34 are arranged much closer to the light guide plate 216 and the thermally expanded light guide plate 216 is supported more stably.

Fourth Embodiment

A fourth embodiment of this invention will be described with reference to FIG. 17. In the fourth embodiment, a posture of a light guide plate 316 differs from that in the third embodiment. Configurations, functions, and effects similar to the third embodiment will not be described.

Figure 17:
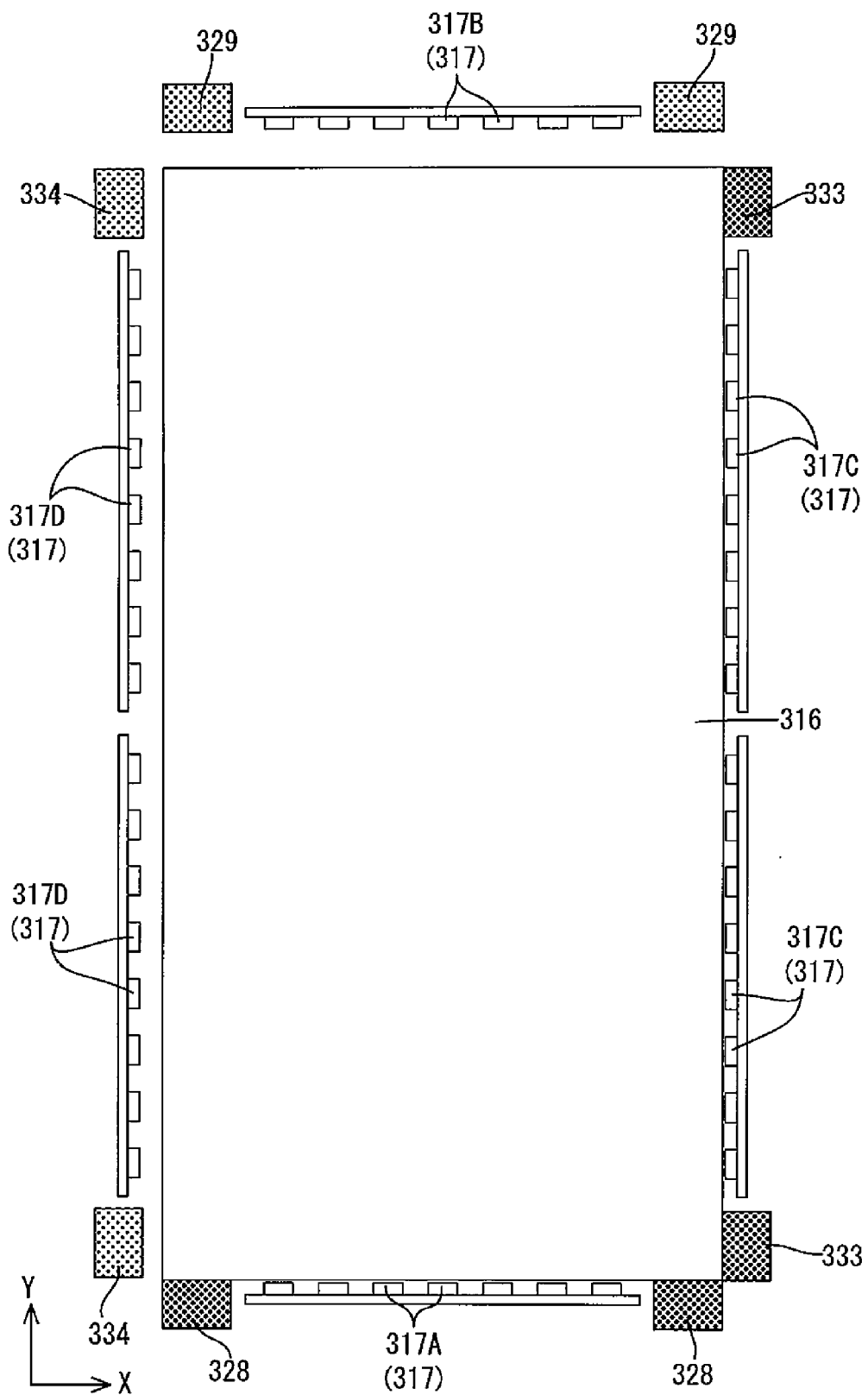
FIG. 17 is a plan view illustrating a general arrangement configuration of LEDs, a light guide plate, and support members according to a fourth embodiment of the present invention.

According to the present embodiment, as illustrated in FIG. 17, the light guide plate 316 is postured such that the long side matches the vertical direction and the short side matches the horizontal direction. Specifically, the light guide plate 316 is postured such that the light guide plate 316 of the third embodiment (see FIG. 16) is rotated about 90 degrees in the counterclockwise direction. Third LEDs 317C and third support members 333 arranged along the short side of the light guide plate 316 are arranged on a lower side in the vertical direction with respect to the light guide plate 316, and fourth LEDs 317D and fourth support members 334 are arranged on an upper side in the vertical direction with respect to the light guide plate 316. First LEDs 317A and first support members 328 arranged along the short side of the light guide plate 316 are arranged on the right side with respect to the light guide plate 316 in the horizontal direction in FIG. 17. Second LEDs 317B and second support members 329 are arranged on the left side with respect to the light guide plate 316 in the horizontal direction in FIG. 17. In such a configuration, operations and effects similar to those in the third embodiment are obtained. The configuration of the light guide plate 316 in the vertical position is effective for using the liquid crystal display device as an electronic device such as digital signage.

Fifth Embodiment

A fifth embodiment of this invention will be described with reference to FIGS. 18 to 21. In the fifth embodiment, cabinets Ca, Cb that hold a liquid crystal display device 410 from front and rear sides are further included. Configurations, functions, and effects similar to the first embodiment will not be described.

Figure 19:
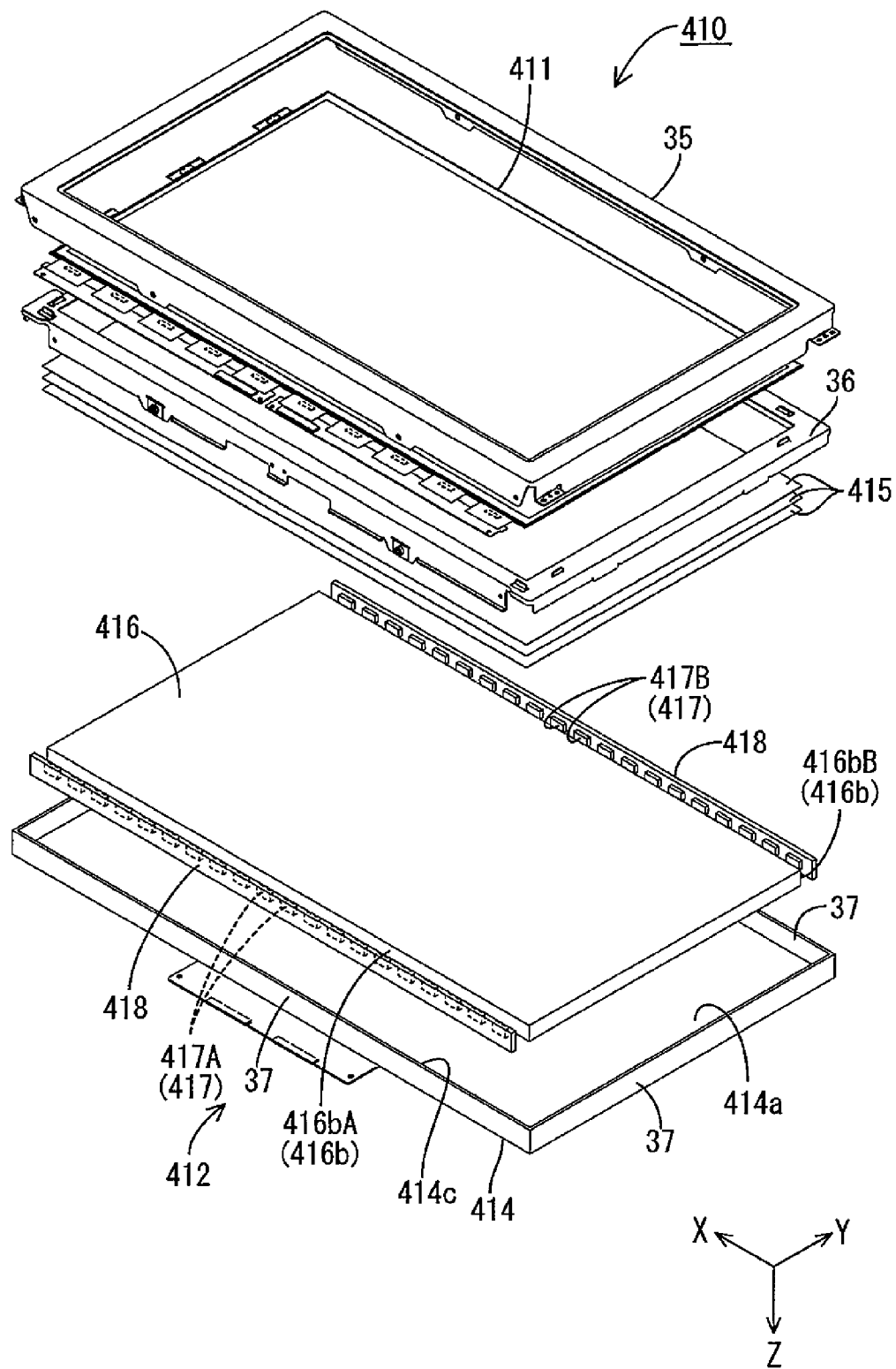
FIG. 19 is an exploded perspective view illustrating a general configuration of the liquid crystal display device included in a television device.

As illustrated in FIG. 18, a television device TV according to this embodiment includes a liquid crystal display device 410, front and rear cabinets Ca and Cb that hold the liquid crystal display device 410 therebetween, a power source P, a tuner T, and a stand S. The liquid crystal display device 410 is held in a vertical position. As illustrated in FIG. 19, the liquid crystal display device 410 includes a liquid crystal panel 411 and a backlight unit 412 as an external light source. The liquid crystal panel 411 and the backlight unit 412 are held with a bezel 35 having a frame-like shape and surrounding a display area in the liquid crystal panel 411. The liquid crystal panel 411 has a configuration similar to that in the first embodiment.

Figure 20:
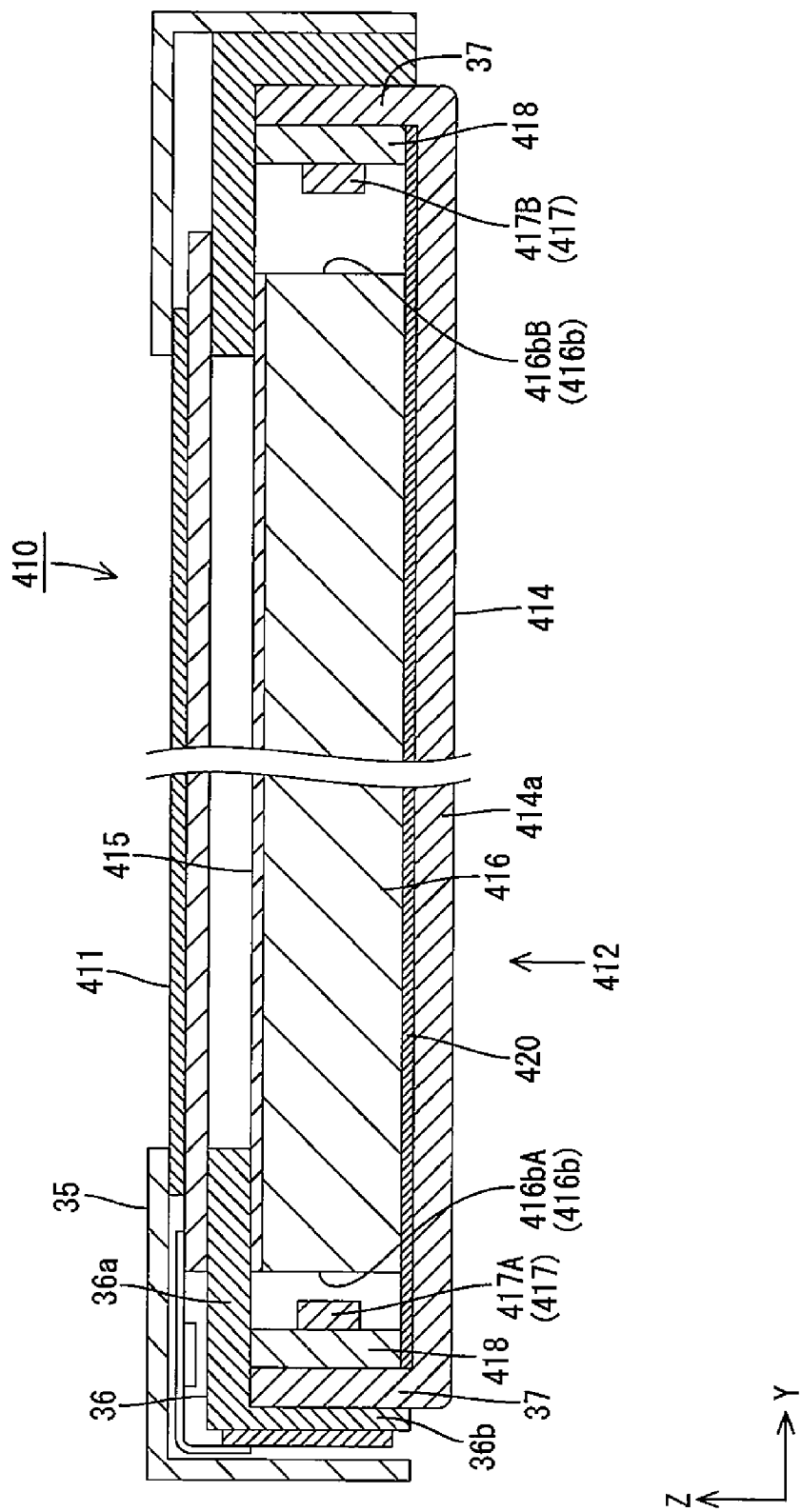
FIG. 20 is a cross-sectional view illustrating a cross-sectional configuration of the liquid crystal display device taken in the short-side direction.

As illustrated in FIGS. 19 and 20, the backlight unit 412 includes a chassis 414 and an optical member 415. The chassis 414 having a substantially tray-like shape includes a light exit portion 414c that opens to the front side. The optical member 15 covers the light exit portion 414c of the chassis 414. A pair of LED boards 418 on which LEDs 417 are mounted, a light guide plate 419, and a frame 36 are arranged in the chassis 414. The frame 36 holds down the light guide plate 416 and the optical member 415 from the front side of the light guide plate 416 and receives the liquid crystal panel 411 from the rear side of the light guide plate 416.

As illustrated in FIGS. 19 and 20, the chassis 414 includes a light guide plate receiving portion 414a and side plates 37. The light guide plate receiving portion 414a has a landscape rectangular shape similar to the liquid crystal panel 411. The side plates 37 extend from respective long-side outer edges and respective short-side outer edges of the light guide plate receiving portion 414a. The light guide plate receiving portion 414a extends along the light guide plate 416 and a light guide reflection sheet 420 arranged in the chassis 414 and supports them from the rear side. A LED board 418 is mounted on an inner surface of each of the long-side side plates 37. The frame 36 and the bezel 35 are fixed to outer surfaces of the side plates 37 with screws.

The frame 36 is made of synthetic resin, and as illustrated in FIGS. 19 and 20, the frame 36 has a frame portion 36a and a wall frame portion 36b. The frame portion 36a extends parallel to the optical member 415 and the light guide plate 416 and has a frame-like plan view shape. The wall frame portion 36b projects from an outer peripheral edge of the frame portion 36a toward the rear side and has a substantially short wall frame shape. The frame portion 36a is opposite the outer edge portions of the optical member 415 and the light guide plate 416 so as to hold down substantially entire edges of the optical member 415 and the light guide plate 416 from the front side. The wall frame portion 36b is mounted to fit to outer surfaces of the side plates 37 of the chassis 414. The frame portion 36a receives outer edge portions of the liquid crystal panel 411 from the rear side.

As illustrated in FIGS. 20 and 21, LED boards 418 in a pair are attached to the respective long-side side plates 37 of the chassis 414. The LEDs 417 mounted on each LED board 418 are arranged to be opposed to the corresponding light entrance surface 416b of the light guide plate 416. The LEDs 417 arranged on a lower side with respect to the light guide plate 416 in FIG. 21 (on the left side in FIG. 20) are first LEDs 417A, and the LEDs 417 arranged on an upper side with respect to the light guide plate 415 in FIG. 21 (on the right side in FIG. 20) are second LEDs 417B. A distance A between the first LEDs 417A and an opposed first light entrance surface 416bA is relatively small and a distance B between the second LEDs 417B and an opposed second light entrance surface 416bB is relatively great.

As illustrated in FIG. 21, first support members 428, second support members 429, and horizontal side second support members 430 hold the light guide plate 416 with the frame 36 and are mounted on the chassis 414 that holds the light guide plate 416 and the liquid crystal panel 411 with the bezel 35. Specifically, the first support members 428 are mounted on an inner surface of a lower side one of the four side plates 37 included in the chassis 414 with a fixing member. The side plate 37 including the first support members 428 is located on a lower side in the vertical direction. The two first support members 428 are mounted on two end portions of the lower side plate 37, respectively, with respect to the longitudinal direction of the side plate 37 (the horizontal direction). The two first support members 428 sandwich the LED board 418 arranged in a middle portion from two sides with respect to the horizontal direction. The second support members 429 are mounted on an inner surface of an upper side plate 37, which is located on an upper side in the vertical direction, with a fixing member.

The two second support members 429 are mounted on two end portions of the upper side plate 37, respectively, with respect to the longitudinal direction of the side plate 37 (the horizontal direction). The two second support members 429 sandwich the LED board 418 arranged in a middle portion from two sides with respect to the horizontal direction. The horizontal side second support members 430 are mounted on inner surfaces of two side plates 37, which are on horizontal ends, with a fixing member. Two horizontal side second support members 430 are mounted on respective two ends of each side plate 37, respectively. The two side plates 37 are on two sides in horizontal direction. The two ends of each side plate 37 are two ends in the longitudinal direction of the side plate 37 (the vertical direction). The first support members 428 are in contact with a lower edge surface 416E1 of the light guide plate 416 in the vertical direction. The second support members 429 and the horizontal side second support members 430 are opposed to and away from a vertically upper edge surface 416E2 and horizontal-side edge surfaces 416E3, 416E4, correspondingly, with a certain distance. In such a configuration, operations and effects similar to those in the first embodiment are obtained.

Sixth Embodiment

A sixth embodiment of this invention will be described with reference to FIG. 22. In the sixth embodiment, a light guide plate 516 has a different shape. Configurations, functions, and effects similar to the first embodiment will not be described.

The light guide plate 516 according to the present embodiment, as illustrated in FIG. 22, includes cutouts 38 at four corners. Specifically, the light guide plate 516 has two cutouts 38 on each of upper and lower edge surfaces 516E1, 516E2 in the vertical direction. The two cutouts 38 are recessed at two end portions of each edge surface 516E1, 516E2, respectively, and the two end portions are on ends in the longitudinal direction of the edge surface. The cutouts 38 are recessed from a first light entrance surface 516bA and a second light entrance surface 516bB to form steps. Each of the edge surfaces 516E1, 516E2 has portions including the cutouts 38 and such portions are non-illumination areas where light from the first LEDs 517A and the second LEDs 517B is less likely to reach. Each of the first support members 528 is in contact with a recessed edge surface of each of the cutouts 38 included on the vertically lower edge surface 516E1. The recessed edge surface is parallel to the first light entrance surface 516bA. Each of the second support members 529 is arranged to be opposed to and away from a recessed edge surface of each of the cutouts 38 on the vertically upper edge surface 516E2 with a certain distance. The recessed edge surface is parallel to the second light entrance surface 516bB. Provided with such cutouts 38, surfaces of the light guide plate 516 opposed to the respective support members 528, 529 are recessed inwardly from the respective light entrance surfaces 516bA, 516bB. Therefore, the first support members 528 and the second support members 529 are arranged close to an inner side (close to a middle portion of the light guide plate 516) with respect to the vertical direction by a recessed amount. Accordingly, a frame portion is effectively decreased in size in the liquid crystal display device.

Other Embodiments

The present invention is not limited to the embodiments described in the above description and the drawings. The scope of the present invention includes the following embodiments.

(1) Other than the above embodiments, a specific ratio (a relative value) and a specific value (an absolute value) of the distance A between the first LEDs and the first light entrance surface and the distance B between the second LEDs and the second light entrance surface may be altered, as appropriate.

(2) An example of the above (1) is as follows. The first support members are in contact with the first light entrance surface to support the light guide plate and the light guide plate thermally expands and shrinks regarding the contact portion (a first edge surface) as an original point. Therefore, a value of the distance A between the first LEDs and the first light entrance surface is substantially zero. The distance B between the second LEDs and the second light entrance surface is substantially equal to a maximum expansion amount of the light guide plate in the vertical direction. According to such a configuration, the light entrance efficiency of light from the first LEDs and being incident on the first light entrance surface is increased to a maximum value and the light entrance efficiency of light from the second LEDs and being incident on the second light entrance surface is decreased to a lowest value and does not change further (see the graph in FIG. 12). The light entrance efficiency of light with the distance A being equal to the distance B is referred to as a reference value and a plus difference value between the reference value and the light entrance efficiency of light emitted from the first LEDs and entering the light guide plate through the first light entrance surface (the light entrance efficiency is higher than the reference value) is greater than a minus difference value between the reference value and the light entrance efficiency of light emitted from the second LEDs and entering the light guide plate through the second light entrance surface (the light entrance efficiency is lower than the reference value), and the plus difference value is maximum (see the graph in FIG. 13). Accordingly, the light use efficiency becomes highest.

(3) Other than the configuration (2), for example, the distance A between the first LEDs and the first light entrance surface may be one third of the total of the distance A and the distance B (the maximum expansion amount of the light guide plate in the vertical direction) or may be one third of the total of the distance A and the distance B or greater and equal to a half of the total or smaller.

(4) The technical matters described in the above (1) to (3) may be applied to a relation between the distance C between the third LEDs and the third light entrance surface and the distance D between the fourth LEDs and the fourth light entrance surface according to the third and fourth embodiments.

(5) According to a modification of the above embodiments, the first support members may be integrally formed with the frame or the chassis. Specifically, the screw mount portion of the frame described in the first embodiment may have projections as the first support members. Each of the projections projects from a part of the screw mount portion. The chassis in the fifth embodiment may have projections on the side plate or the bottom plate of the chassis as the first support members. The projections may be formed by hammering a part of the side plate or the bottom plate.

(6) In the above embodiments, the examples of the material having plasticity for the first support members include Fe, Al, PET, and PC. Other metals or other thermoplastic resins may be used for the first support members.

(7) In the above embodiments, the material having plasticity (metal or thermoplastic resins) is used for the first support members. However, an elastic material may be used for the first support members. In such a configuration, materials harder than the elastic material used for the second support members (for example, elastic materials having relatively high Durometer hardness or relatively high elastic modulus) may be effective for the first support members.

(8) In the above embodiments, natural rubber of synthetic rubber (butyl rubber, urethane rubber, silicone rubber) are included in the examples of the elastic material for the second support members. For example, elastic materials such as urethane foam or gel may be used for the second support members.

(9) In the above embodiments, the elastic material is used for the second support members. However, materials having elasticity (metal or thermoplastic resins) may be used for the second support members. In such a configuration, the material having elasticity that is softer than the material having elasticity used for the first support members (for example, material having plasticity having relatively low Rockwell hardness) may be effective for the second support members.

(10) In the above embodiments, the first support members and the second support members are mounted on the frame or the chassis. However, the first support members and the second support members may be mounted on the LED board. In such a configuration, the LED board extends further to be opposed to respective two edge surfaces of the light guide plate in the vertical direction or the horizontal direction, and the first support members or the second support members may be mounted on the extended end portions of the LED board (opposed to two end portions of each of the edge surfaces).

(11) In the configuration of (10), the LED board may include connectors that supply power to the LEDs and the connectors may be used as the first support members. In such a configuration, the second support member may be mounted on a surface of each connector facing the edge surface of the light guide plate.

(12) In the above embodiments, portions of the edge surfaces of the light guide plate being contact with the respective support members (the first support members, the second support members, the third support members, the fourth support members, the horizontal side second support members) are parallel to the vertical direction or the horizontal direction. However, the edge surfaces that are in contact with the respective support members may be inclined with respect to the vertical direction and the horizontal direction.

(13) Other than the above embodiments, specific mounting methods of mounting the respective support members (the first support members, the second support members, the third support members, the fourth support members, the horizontal side second support members) on the frame or the chassis may be altered, if necessary. Examples of the mounting methods of mounting the support members may include fixing with screws, rivets, and clips.

(14) In the first, second, fifth, and sixth embodiments, the light guide plate is in the horizontal position. However, as is described in the fourth embodiment, the light guide plate may be in the vertical position. In such a configuration, it may be effective that the first support members and the second support members are arranged to be contact with short-side edge surfaces of the light guide plate.

(15) In the second embodiment, the reflection sheet is arranged to define the space between the second LEDs and the second light entrance surface. However, in addition to the reflection sheet on the second LEDs side, a reflection sheet may be arranged to define a space between the first LEDs and the first light entrance surface.

(16) In the above embodiments, the liquid crystal display device is used such that the display surface of the liquid crystal panel is substantially parallel to the vertical direction. However, the present invention may be applied to a liquid crystal display device that is used with the display surface of the liquid crystal panel substantially parallel to the horizontal direction.

(17) Other than the above embodiments, a planar shape, a cross-sectional shape, the arrangement number, and a planar arrangement of the respective support members (the first support members, the second support members, the third support members, the fourth support members, the horizontal side second support members) may be altered, if necessary.

(18) In the first and fifth embodiments, the LEDs are arranged to be opposed to the two long-side edge surfaces of the light guide plate. However, the LEDs may be arranged to be opposed to two short-side edge surfaces of the light guide plate. In such a configuration, the two short-side edge surfaces of the light guide plate may be the first light entrance surface and the second light entrance surface, respectively, and the first support members and the second members may be arranged to be opposed to the short-side edge surfaces, respectively.

(19) In the above embodiments, the LEDs are arranged to be opposed to a pair of edge surfaces or four edge surfaces of the light guide plate. However, the LEDs may be arranged to be opposed to any three edge surfaces of the light guide plate.

(20) In the above embodiments, the LED board including the first LEDs and the LED board including the second LEDs are same type of components. However, the LED board including the first LEDs and the LED board including the second LEDs may be different types of components.

(21) Other than the above embodiments, the number of LED boards, the specific number of LEDs mounted on the LED board, and the interval between the LEDs on the LED board may be altered as appropriate.

(22) Other than the above embodiments, the light reflection portion formed on the surface opposite to the light exit surface of the light guide plate may have a different arrangement configuration of the dot pattern as appropriate.

(23) In the above embodiments, the LED is used as alight source. However, a light source other than the LED, such as an organic EL, a cold cathode tube, or a hot cathode tube may be used.

(24) In the above embodiments, the color filter of the liquid crystal panel includes color portions in three colors, red, green, and blue. However, the color filter may include color portions in four or more colors.

(25) In the above embodiments, TFTs are used as switching components of the liquid crystal display device. However, the technology described above can be applied to liquid crystal display devices including switching components other than TFTs (e.g. thin film diode (TFD)). The technology can be applied to not only color liquid crystal display devices but also black-and-white liquid crystal display devices.

(26) In the above embodiments, the liquid crystal display device including the liquid crystal panel as a display panel is used. However, the technology can be applied to display devices including other types of display panels.

(27) In the above embodiments, the television device including the tuner is used. However, the technology can be applied to a display device without a tuner. Specifically, the technology can be applied to a liquid crystal display device used as an electronic blackboard.

EXPLANATION OF SYMBOLS 10, 410: liquid crystal display device (display device), 11, 411: liquid crystal panel (display panel), 12, 212, 412: backlight unit (lighting device), 16,116,216, 316, 416, 516: light guide plate, 16a, 116a: light exit surface, 16b, 216b, 416b: light entrance surface, 16bA, 116bA, 216bA, 416bA, 516bA: first light entrance surface, 16bB, 116bB, 216bB, 416bB, 516bB: second light entrance surface, 16E1, 416E1, 516E1: edge surface (first edge surface), 16E2, 416E2, 516E2: edge surface (second edge surface), 16E3, 16E4, 416E3,416E4: edge surface (adjacent edge surface), 17A, 117A, 217A, 317A, 417A, 517A: first LED (first light source), 17B, 117B, 217B, 317B, 417B, 517B: second LED (second light source), 28, 228, 328, 428, 528: first support member, 29, 229, 329, 429, 529: second support member, 30, 430: horizontal side second support member, 33, 333: third support member, 34, 334: fourth support member, 216bC: third light entrance surface, 216bD: fourth light entrance surface, 216E3: edge surface (third edge surface), 216E4: edge surface (fourth edge surface), 217C, 317C: third LED (third light source 9, 217D, 317D: fourth LED (fourth light source), A-D: distance, TV: television device

The invention claimed is:

1. A lighting device, comprising:
a light guide plate having an edge surface as a light entrance surface and one plate surface as a light exit surface;
a first light source opposed to a first light entrance surface that is a first edge surface of the light guide plate;
a second light source opposed to a second light entrance surface that is a second edge surface of the light guide plate, the second edge surface being opposite to the first edge surface, the second light source arranged to be away from the second light entrance surface with a distance relatively greater than a distance between the first light source and the first light entrance surface;
a first support member arranged on a same side as the first light source with respect to the light guide plate, the first support member being in contact with the first edge surface of the light guide plate to support the light guide plate from a first light source side; and
a second support member arranged on a same side as the second light source with respect to the light guide plate to be away from the light guide plate, the second support member to be in contact with the second edge surface according to thermal expansion of the light guide plate to support the light guide plate from a second light source side, and the second support member being made of an elastic material softer than a material of the first support member.

2. The lighting device according to claim 1, wherein
the first light source, the light guide plate, and the second light source are arranged in a vertical direction,
the first light source and the first support member are arranged on a lower side in the vertical direction with respect to the light guide plate, and
the second light source and the second support member are arranged on an upper side in the vertical direction with respect to the light guide plate.

3. The lighting device according to claim 2, further comprising a horizontal side second support member arranged to be away from the light guide plate in a horizontal direction that is perpendicular to the vertical direction, the horizontal second support member to be in contact with an edge surface of the light guide plate adjacent to the first edge surface and the second edge surface according to thermal expansion of the light guide plate along the horizontal direction to support the light guide plate from an outer side in the horizontal direction, and the horizontal side second support member being made of a material softer than the material of the first support member.

4. The lighting device according to claim 3, wherein
the second support member and the horizontal side second support member are made of a same elastic material.

5. The lighting device according to claim 1, wherein the first support member is made of a material having plasticity.

6. The lighting device according to claim 5, wherein
the first support member is made of the material having plasticity that is metal or a thermoplastic resin, and
the second support member is made of rubber.

7. The lighting device according to claim 1, wherein
the first edge surface that is the first light entrance surface and the second edge surface that is the second light entrance surface extend linearly over an entire length of the light guide plate.

8. The lighting device according to claim 1, wherein
the first support member includes first support members in a pair that are arranged on two end portions of the light guide plate, respectively, and the second support member includes second support members in a pair that are arranged on two end portions of the light guide plate, respectively.

9. The lighting device according to claim 1, wherein the first light source and the second light source are same type of parts.

10. The lighting device according to claim 1, wherein the first light source and the second light source represent a lambertian light intensity distribution.

11. The lighting device according to claim 1, wherein each of the first light source and the second light source includes LEDs that are mounted on a base board.

12. The lighting device according to claim 1, wherein the light guide plate is rectangular, and further comprising:
a third light source opposed to a third light entrance surface that is a third edge surface adjacent to the first edge surface and the second edge surface of the light guide plate;
a fourth light source opposed to a fourth light entrance surface that is a fourth edge surface of the light guide plate opposite to the third edge surface, the fourth light source being arranged to be away from the fourth light entrance surface with a distance that is relatively greater than a distance between the third light source and the third light entrance surface;
a third support member arranged on a same side as the third light source with respect to the light guide plate, the third support member being in contact with the third edge surface of the light guide plate to support the light guide plate from a third light source side; and
a fourth support member arranged on a same side as the fourth light source with respect to the light guide plate to be away from the light guide plate, the fourth support member to be in contact with the fourth edge surface according to thermal expansion of the light guide plate to support the light guide plate from a fourth light source side, and the fourth support member made of an elastic material softer than a material of the third support member.

13. A display device comprising:
the lighting device according to claim 1; and
a display panel configured to provide a display using light from the lighting device.

14. The display device according to claim 13, wherein the display panel is a liquid crystal display panel including a pair of substrates and liquid crystals enclosed between the substrates.

15. A television device comprising the display device according to claim 13.

* * * * *